US012681817B2

(12) United States Patent
Polimera et al.

(10) Patent No.: US 12,681,817 B2
(45) Date of Patent: *Jul. 14, 2026

(54) SNAPSHOT-BASED DISASTER RECOVERY ORCHESTRATION OF VIRTUAL MACHINE FAILOVER AND FAILBACK

(71) Applicant: Commvault Systems, Inc., Tinton Falls, NJ (US)

(72) Inventors: Rajesh Polimera, Freehold, NJ (US); Sarath Cheriyan Joseph, Marlboro, NJ (US); Kuldeep Kumar, Hyderabad (IN); Venkata Chalapathi Sucheth Ramgiri, Eatontown, NJ (US); Ashwin Gautamchand Sancheti, Pune (IN); Madhumitha Mani, Campbell, CA (US); Henry Wallace Dornemann, Eatontown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/918,981

(22) Filed: Oct. 17, 2024

(65) Prior Publication Data

US 2025/0036535 A1     Jan. 30, 2025

Related U.S. Application Data

(63) Continuation of application No. 18/135,639, filed on Apr. 17, 2023, now Pat. No. 12,235,744, which is a
(Continued)

(51) Int. Cl.
| | |
|---|---|
| *G06F 11/20* | (2006.01) |
| *G06F 9/455* | (2018.01) |
| *G06F 11/1446* | (2026.01) |

(52) U.S. Cl.
CPC ...... *G06F 11/2094* (2013.01); *G06F 9/45558* (2013.01); *G06F 11/1451* (2013.01);
(Continued)

(58) Field of Classification Search
CPC ............ G06F 11/1446; G06F 11/1448; G06F 11/1451; G06F 11/1469; G06F 11/2056;
(Continued)

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |

(Continued)

FOREIGN PATENT DOCUMENTS

| | | |
|---|---|---|
| AU | 2004227949 A1 | 10/2004 |
| CA | 2498174 A1 | 3/2004 |

(Continued)

OTHER PUBLICATIONS

Arneson, "Mass Storage Archiving in Network Environments," Digest of Papers, Ninth IEEE Symposium on Mass Storage Systems, Oct. 31, 1988Nov. 3, 1988, pp. 45-50, Monterey, CA.
(Continued)

*Primary Examiner* — Michael Maskulinski
(74) *Attorney, Agent, or Firm* — Commvault Systems, Inc.

(57)        ABSTRACT

Snapshot-based disaster recovery (DR) orchestration systems and methods for virtual machine (VM) failover and failback do not require that VMs or their corresponding datastores be actively operating at the DR site before a DR orchestration job is initiated, i.e., before failover. An illustrative data storage management system deploys proprietary components at source data center(s) and at DR site(s). The proprietary components (e.g., storage manager, data agents, media agents, backup nodes, etc.) interoperate with each
(Continued)

other and with the source and DR components to ensure that VMs will successfully failover and/or failback. DR orchestration jobs are suitable for testing VM failover scenarios ("clone testing"), for conducting planned VM failovers, and for unplanned VM failovers. DR orchestration jobs also handle failback and integration of DR-generated data into the failback site, including restoring VMs that never failed over to fully re-populate the source/failback site.

20 Claims, 24 Drawing Sheets

Related U.S. Application Data continuation of application No. 17/377,877, filed on Jul. 16, 2021, now Pat. No. 11,663,099, which is a continuation of application No. 16/831,562, filed on Mar. 26, 2020, now Pat. No. 11,099,956.

(52) U.S. Cl.
CPC ...... *G06F 11/1469* (2013.01); *G06F 11/2069* (2013.01); *G06F 2009/45583* (2013.01); *G06F 2201/815* (2013.01); *G06F 2201/82* (2013.01); *G06F 2201/84* (2013.01)

(58) Field of Classification Search
CPC ............. G06F 11/2069; G06F 11/2094; G06F 2201/815; G06F 2201/82; G06F 2201/84
See application file for complete search history.

(56) References Cited

U.S. PATENT DOCUMENTS

| | | | |
|---|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole |
| 5,005,122 A | 4/1991 | Griffin |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,481,694 A | 1/1996 | Chao et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,544,359 A | 8/1996 | Tada et al. |
| 5,548,750 A | 8/1996 | Larsson et al. |
| 5,559,957 A | 9/1996 | Balk |
| 5,559,991 A | 9/1996 | Kanfi |
| 5,594,901 A | 1/1997 | Andoh |
| 5,619,644 A | 4/1997 | Crockett et al. |
| 5,638,509 A | 6/1997 | Dunphy et al. |
| 5,640,561 A | 6/1997 | Satoh et al. |
| 5,642,496 A | 6/1997 | Kanfi |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,793,867 A | 8/1998 | Cordery et al. |
| 5,812,398 A | 9/1998 | Nielsen et al. |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,930,831 A | 7/1999 | Marsh et al. |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,078,932 A | 6/2000 | Haye et al. |
| 6,094,416 A | 7/2000 | Ying |
| 6,101,585 A | 8/2000 | Brown et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,175,904 B1 | 1/2001 | Gunderson |
| 6,185,474 B1 | 2/2001 | Nakamura et al. |
| 6,199,074 B1 | 3/2001 | Kern et al. |
| 6,212,512 B1 | 4/2001 | Barney et al. |
| 6,230,166 B1 | 5/2001 | Velamuri et al. |
| 6,260,069 B1 | 7/2001 | Anglin |
| 6,269,431 B1 | 7/2001 | Dunham |
| 6,272,631 B1 | 8/2001 | Thomlinson et al. |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,397,242 B1 | 5/2002 | Devine et al. |
| 6,415,323 B1 | 7/2002 | McCanne et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,516,327 B1 | 2/2003 | Zondervan et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,581,076 B1 | 6/2003 | Ching et al. |
| 6,658,436 B2 | 12/2003 | Oshinsky et al. |
| 6,658,526 B2 | 12/2003 | Nguyen et al. |
| 6,704,839 B2 | 3/2004 | Butterworth et al. |
| 6,704,885 B1 | 3/2004 | Salas-Meza et al. |
| 6,721,767 B2 | 4/2004 | DeMeno et al. |
| 6,732,124 B1 | 5/2004 | Koseki et al. |
| 6,760,723 B2 | 7/2004 | Oshinsky et al. |
| 6,769,003 B2 | 7/2004 | Park et al. |
| 6,772,290 B1 | 8/2004 | Bromley et al. |
| 6,795,904 B1 | 9/2004 | Kamvysselis |
| 6,820,214 B1 | 11/2004 | Cabrera et al. |
| 6,836,830 B1 | 12/2004 | Yamagami et al. |
| 6,839,747 B1 | 1/2005 | Blumenau et al. |
| 6,880,101 B2 | 4/2005 | Golasky et al. |

(56)                 References Cited

U.S. PATENT DOCUMENTS

| | | | |
|---|---|---|---|
| 7,003,641 | B2 | 2/2006 | Prahlad |
| 7,035,880 | B1 | 4/2006 | Crescenti |
| 7,065,537 | B2 | 6/2006 | Cha et al. |
| 7,076,270 | B2 | 7/2006 | Jaggers et al. |
| 7,082,464 | B2 | 7/2006 | Hasan et al. |
| 7,100,007 | B2 | 8/2006 | Saika |
| 7,103,432 | B2 | 9/2006 | Drader et al. |
| 7,107,298 | B2 | 9/2006 | Prahlad |
| 7,130,970 | B2 | 10/2006 | Devassy |
| 7,143,121 | B2 | 11/2006 | Mendonca et al. |
| 7,162,496 | B2 | 1/2007 | Amarendran et al. |
| 7,174,433 | B2 | 2/2007 | Kottomtharayil et al. |
| 7,178,059 | B2 | 2/2007 | Greenspan et al. |
| 7,209,972 | B1 | 4/2007 | Ignatius |
| 7,213,246 | B1 * | 5/2007 | van Rietsc .......... G06F 9/45558 718/1 |
| 7,219,162 | B2 | 5/2007 | Donker et al. |
| 7,234,073 | B1 | 6/2007 | Roytman et al. |
| 7,246,207 | B2 | 7/2007 | Kottomtharayil |
| 7,249,150 | B1 | 7/2007 | Watanabe et al. |
| 7,315,923 | B2 | 1/2008 | Retnamma |
| 7,315,924 | B2 | 1/2008 | Prahlad et al. |
| 7,318,134 | B1 | 1/2008 | Oliveira et al. |
| 7,324,543 | B2 | 1/2008 | Wassew et al. |
| 7,343,356 | B2 | 3/2008 | Prahlad |
| 7,343,453 | B2 | 3/2008 | Prahlad |
| 7,346,623 | B2 | 3/2008 | Prahlad |
| 7,346,751 | B2 | 3/2008 | Prahlad |
| 7,376,895 | B2 | 5/2008 | Tsao |
| 7,380,072 | B2 | 5/2008 | Kottomtharayil et al. |
| 7,380,155 | B2 | 5/2008 | Fung et al. |
| 7,383,293 | B2 | 6/2008 | Gupta et al. |
| 7,386,744 | B2 | 6/2008 | Barr |
| 7,389,311 | B1 | 6/2008 | Crescenti et al. |
| 7,395,282 | B1 | 7/2008 | Crescenti |
| 7,401,154 | B2 | 7/2008 | Ignatius |
| 7,409,509 | B2 | 8/2008 | Devassy et al. |
| 7,424,519 | B2 | 9/2008 | Hoshino et al. |
| 7,437,388 | B1 | 10/2008 | DeVos |
| 7,440,982 | B2 | 10/2008 | Lu |
| 7,447,692 | B2 | 11/2008 | Oshinsky et al. |
| 7,448,079 | B2 | 11/2008 | Tremain |
| 7,454,569 | B2 | 11/2008 | Kavuri |
| 7,475,282 | B2 | 1/2009 | Tormasov et al. |
| 7,484,054 | B2 | 1/2009 | Kottomtharayil et al. |
| 7,484,208 | B1 | 1/2009 | Nelson |
| 7,490,207 | B2 | 2/2009 | Amarendran et al. |
| 7,500,053 | B1 | 3/2009 | Kavuri |
| 7,502,820 | B2 | 3/2009 | Manders |
| 7,512,595 | B1 | 3/2009 | McBride et al. |
| 7,529,782 | B2 | 5/2009 | Prahlad |
| 7,536,291 | B1 | 5/2009 | Vijayan Retnamma et al. |
| 7,539,707 | B2 | 5/2009 | Prahlad |
| 7,543,125 | B2 | 6/2009 | Gokhale |
| 7,546,324 | B2 | 6/2009 | Prahlad et al. |
| 7,546,484 | B2 | 6/2009 | Sen et al. |
| 7,552,279 | B1 | 6/2009 | Gandler |
| 7,568,080 | B2 | 7/2009 | Prahlad |
| 7,581,077 | B2 | 8/2009 | Ignatius |
| 7,594,138 | B2 | 9/2009 | Abdulvahid |
| 7,596,721 | B1 | 9/2009 | Flake et al. |
| 7,600,125 | B1 | 10/2009 | Stringham |
| 7,603,386 | B2 | 10/2009 | Amarendran et al. |
| 7,606,844 | B2 | 10/2009 | Kottomtharayil |
| 7,613,748 | B2 | 11/2009 | Brockway |
| 7,613,752 | B2 | 11/2009 | Prahlad |
| 7,617,253 | B2 | 11/2009 | Prahlad et al. |
| 7,617,262 | B2 | 11/2009 | Prahlad |
| 7,617,307 | B2 | 11/2009 | Childress et al. |
| 7,620,710 | B2 | 11/2009 | Kottomtharayil |
| 7,631,351 | B2 | 12/2009 | Erofeev |
| 7,636,743 | B2 | 12/2009 | Erofeev |
| 7,640,406 | B1 | 12/2009 | Hagerstrom |
| 7,651,593 | B2 | 1/2010 | Prahlad |
| 7,657,550 | B2 | 2/2010 | Prahlad |
| 7,660,807 | B2 | 2/2010 | Prahlad |
| 7,661,028 | B2 | 2/2010 | Erofeev |
| 7,668,884 | B2 | 2/2010 | Prahlad |
| 7,685,177 | B1 | 3/2010 | Hagerstrom |
| 7,694,070 | B2 | 4/2010 | Mogi |
| 7,702,782 | B1 | 4/2010 | Pai |
| 7,707,184 | B1 | 4/2010 | Zhang et al. |
| 7,707,190 | B2 | 4/2010 | Yu et al. |
| 7,721,138 | B1 | 5/2010 | Lyadvinsky et al. |
| 7,725,893 | B2 | 5/2010 | Jaeckel et al. |
| 7,730,035 | B2 | 6/2010 | Berger et al. |
| 7,734,578 | B2 | 6/2010 | Prahlad et al. |
| 7,734,669 | B2 | 6/2010 | Kottomtharayil |
| 7,739,459 | B2 | 6/2010 | Kottomtharayil et al. |
| 7,747,579 | B2 | 6/2010 | Prahlad |
| 7,756,835 | B2 | 7/2010 | Pugh |
| 7,756,964 | B2 | 7/2010 | Madison, Jr. et al. |
| 7,757,043 | B2 | 7/2010 | Kavuri et al. |
| 7,765,167 | B2 | 7/2010 | Prahlad |
| 7,769,961 | B2 | 8/2010 | Kottomtharayil et al. |
| 7,778,984 | B2 | 8/2010 | Zhang |
| 7,792,789 | B2 | 9/2010 | Prahlad |
| 7,793,307 | B2 | 9/2010 | Gokhale et al. |
| 7,797,281 | B1 | 9/2010 | Greene et al. |
| 7,801,864 | B2 | 9/2010 | Prahlad |
| 7,802,067 | B2 | 9/2010 | Prahlad et al. |
| 7,809,914 | B2 | 10/2010 | Kottomtharayil |
| 7,822,717 | B2 | 10/2010 | Kapoor et al. |
| 7,822,939 | B1 | 10/2010 | Veprinsky et al. |
| 7,822,967 | B2 | 10/2010 | Fung |
| 7,840,537 | B2 | 11/2010 | Gokhale |
| 7,861,234 | B1 | 12/2010 | Lobo et al. |
| 7,882,077 | B2 | 2/2011 | Gokhale |
| 7,890,467 | B2 | 2/2011 | Watanabe |
| 7,899,788 | B2 | 3/2011 | Chandhok |
| 7,917,617 | B1 | 3/2011 | Ponnapur |
| 7,937,421 | B2 | 5/2011 | Mikesell |
| 7,937,612 | B1 | 5/2011 | Lyadvinsky et al. |
| 8,001,277 | B2 | 8/2011 | Mega |
| 8,037,028 | B2 | 10/2011 | Prahlad |
| 8,037,032 | B2 | 10/2011 | Pershin et al. |
| 8,046,550 | B2 | 10/2011 | Feathergill |
| 8,051,473 | B2 | 11/2011 | Szucs |
| 8,055,745 | B2 | 11/2011 | Atluri |
| 8,060,476 | B1 | 11/2011 | Afonso et al. |
| 8,069,271 | B2 | 11/2011 | Brunet et al. |
| 8,099,391 | B1 | 1/2012 | Monckton |
| 8,108,638 | B2 | 1/2012 | Kishi |
| 8,108,640 | B1 | 1/2012 | Holl, II |
| 8,117,492 | B1 | 2/2012 | Searls et al. |
| 8,131,681 | B1 | 3/2012 | Hangud et al. |
| 8,135,930 | B1 | 3/2012 | Mattox et al. |
| 8,140,786 | B2 | 3/2012 | Bunte |
| 8,156,086 | B2 | 4/2012 | Lu et al. |
| 8,156,301 | B1 | 4/2012 | Khandelwal et al. |
| 8,170,995 | B2 | 5/2012 | Prahlad |
| 8,185,777 | B2 | 5/2012 | Davies et al. |
| 8,185,893 | B2 | 5/2012 | Hyser et al. |
| 8,195,623 | B2 | 6/2012 | Prahlad et al. |
| 8,199,911 | B1 | 6/2012 | Tsaur et al. |
| 8,200,637 | B1 | 6/2012 | Stringham |
| 8,204,859 | B2 | 6/2012 | Ngo |
| 8,219,524 | B2 | 7/2012 | Gokhale |
| 8,219,653 | B1 | 7/2012 | Keagy et al. |
| 8,219,769 | B1 | 7/2012 | Wilk |
| 8,225,133 | B1 | 7/2012 | Lyadvinsky et al. |
| 8,229,896 | B1 | 7/2012 | Narayanan |
| 8,229,954 | B2 | 7/2012 | Kottomtharayil |
| 8,230,195 | B2 | 7/2012 | Amarendran |
| 8,230,256 | B1 | 7/2012 | Raut |
| 8,271,443 | B1 | 9/2012 | Swift et al. |
| 8,285,681 | B2 | 10/2012 | Prahlad |
| 8,291,170 | B1 | 10/2012 | Zhang et al. |
| 8,291,407 | B2 | 10/2012 | Greenwood et al. |
| 8,307,177 | B2 | 11/2012 | Prahlad |
| 8,307,187 | B2 | 11/2012 | Chawla et al. |
| 8,315,992 | B1 | 11/2012 | Gipp et al. |
| 8,336,040 | B2 | 12/2012 | Davidson et al. |
| 8,364,652 | B2 | 1/2013 | Vijayan |

(56) References Cited

U.S. PATENT DOCUMENTS

| | | |
|---|---|---|
| 8,370,542 B2 | 2/2013 | Lu et al. |
| 8,396,838 B2 | 3/2013 | Brockway |
| 8,407,190 B2 | 3/2013 | Prahlad |
| 8,433,679 B2 | 4/2013 | Crescenti |
| 8,433,682 B2 | 4/2013 | Ngo |
| 8,434,131 B2 | 4/2013 | Varadharajan |
| 8,438,347 B1 | 5/2013 | Tawri et al. |
| 8,453,145 B1 | 5/2013 | Naik |
| 8,473,594 B2 | 6/2013 | Astete et al. |
| 8,479,304 B1 | 7/2013 | Clifford |
| 8,489,676 B1 | 7/2013 | Chaplin et al. |
| 8,504,526 B2 | 8/2013 | Gokhale et al. |
| 8,560,788 B1 | 10/2013 | Sreedharan et al. |
| 8,577,845 B2 | 11/2013 | Nguyen et al. |
| 8,578,120 B2 | 11/2013 | Attarde |
| 8,578,126 B1 | 11/2013 | Gaonkar et al. |
| 8,595,191 B2 | 11/2013 | Prahlad et al. |
| 8,620,870 B2 | 12/2013 | Dwarampudi |
| 8,650,389 B1 | 2/2014 | Thornewell et al. |
| 8,667,171 B2 | 3/2014 | Guo et al. |
| 8,706,867 B2 | 4/2014 | Vijayan |
| 8,751,857 B2 | 6/2014 | Frenkel et al. |
| 8,776,043 B1 | 7/2014 | Thimsen et al. |
| 8,793,222 B1 | 7/2014 | Stringham |
| 8,799,431 B2 | 8/2014 | Pabari |
| 8,825,720 B1 | 9/2014 | Xie et al. |
| 8,831,202 B1 | 9/2014 | Abidogun et al. |
| 8,850,146 B1 | 9/2014 | Majumdar |
| 8,868,726 B1 | 10/2014 | Tu et al. |
| 8,904,081 B1 | 12/2014 | Kulkarni |
| 8,909,980 B1 | 12/2014 | Lewis et al. |
| 8,924,967 B2 | 12/2014 | Nelson |
| 8,930,496 B2 | 1/2015 | Gokhale |
| 8,930,543 B2 | 1/2015 | Ashok et al. |
| 8,938,481 B2 | 1/2015 | Kumarasamy et al. |
| 8,938,643 B1 | 1/2015 | Karmarkar et al. |
| 8,954,446 B2 | 2/2015 | Vijayan Retnamma et al. |
| 8,954,796 B1 | 2/2015 | Cohen et al. |
| 8,959,217 B2 | 2/2015 | Mayo et al. |
| 8,959,299 B2 | 2/2015 | Ngo |
| 8,966,318 B1 | 2/2015 | Shah |
| 9,020,895 B1 | 4/2015 | Rajashekar |
| 9,020,900 B2 | 4/2015 | Vijayan Retnamma et al. |
| 9,020,987 B1 | 4/2015 | Nanda et al. |
| 9,021,459 B1 | 4/2015 | Qu |
| 9,026,497 B2 | 5/2015 | Gokhale et al. |
| 9,026,498 B2 | 5/2015 | Kumarasamy |
| 9,069,587 B2 | 6/2015 | Agarwal et al. |
| 9,098,457 B2 | 8/2015 | Towstopiat et al. |
| 9,098,495 B2 | 8/2015 | Gokhale |
| 9,116,633 B2 | 8/2015 | Sancheti |
| 9,124,633 B1 | 9/2015 | Eizadi et al. |
| 9,141,529 B2 | 9/2015 | Klein et al. |
| 9,146,755 B2 | 9/2015 | Lassonde et al. |
| 9,201,736 B1 | 12/2015 | Moore |
| 9,213,706 B2 | 12/2015 | Long et al. |
| 9,223,597 B2 | 12/2015 | Deshpande et al. |
| 9,235,474 B1 | 1/2016 | Petri et al. |
| 9,235,582 B1 | 1/2016 | Madiraju Varadaraju |
| 9,239,687 B2 | 1/2016 | Vijayan |
| 9,239,762 B1 | 1/2016 | Gunda et al. |
| 9,244,777 B2 | 1/2016 | Boullery et al. |
| 9,246,996 B1 | 1/2016 | Brooker |
| 9,268,602 B2 | 2/2016 | Prahlad et al. |
| 9,280,378 B2 | 3/2016 | Shah |
| 9,280,430 B2 | 3/2016 | Sarfare et al. |
| 9,286,086 B2 | 3/2016 | Deshpande et al. |
| 9,286,110 B2 | 3/2016 | Mitkar |
| 9,292,350 B1 | 3/2016 | Pendharkar et al. |
| 9,298,386 B2 | 3/2016 | Baldwin et al. |
| 9,298,715 B2 | 3/2016 | Kumarasamy et al. |
| 9,311,121 B2 | 4/2016 | Deshpande et al. |
| 9,311,248 B2 | 4/2016 | Wagner |
| 9,336,076 B2 | 5/2016 | Baldwin et al. |
| 9,342,537 B2 | 5/2016 | Kumarasamy |
| 9,372,827 B2 | 6/2016 | Kumarasamy et al. |
| 9,378,035 B2 | 6/2016 | Kripalani |
| 9,397,944 B1 | 7/2016 | Hobbs et al. |
| 9,405,763 B2 | 8/2016 | Prahlad et al. |
| 9,417,968 B2 | 8/2016 | Dornemann et al. |
| 9,424,136 B1 | 8/2016 | Teater et al. |
| 9,436,555 B2 | 9/2016 | Dornemann |
| 9,444,811 B2 | 9/2016 | Nara |
| 9,448,731 B2 | 9/2016 | Nallathambi |
| 9,451,023 B2 | 9/2016 | Sancheti |
| 9,461,881 B2 | 10/2016 | Kumarasamy |
| 9,471,441 B1 | 10/2016 | Lyadvinsky |
| 9,477,683 B2 | 10/2016 | Ghosh |
| 9,483,361 B2 | 11/2016 | Gokhale et al. |
| 9,483,362 B2 | 11/2016 | Gokhale et al. |
| 9,483,363 B2 | 11/2016 | Gokhale et al. |
| 9,483,364 B2 | 11/2016 | Gokhale et al. |
| 9,489,244 B2 | 11/2016 | Mitkar et al. |
| 9,495,251 B2 | 11/2016 | Kottomtharayil |
| 9,495,370 B1 | 11/2016 | Chatterjee et al. |
| 9,495,404 B2 | 11/2016 | Kumarasamy et al. |
| 9,563,518 B2 | 2/2017 | Klose |
| 9,575,789 B1 | 2/2017 | Rangari et al. |
| 9,575,991 B2 | 2/2017 | Ghosh |
| 9,588,847 B1 | 3/2017 | Natanzon et al. |
| 9,588,972 B2 | 3/2017 | Dwarampudi et al. |
| 9,594,636 B2 | 3/2017 | Mortensen et al. |
| 9,606,745 B2 | 3/2017 | Satoyama et al. |
| 9,612,966 B2 | 4/2017 | Joshi et al. |
| 9,632,882 B2 | 4/2017 | Kumarasamy et al. |
| 9,633,033 B2 | 4/2017 | Vijayan |
| 9,639,274 B2 | 5/2017 | Maranna |
| 9,639,426 B2 | 5/2017 | Pawar et al. |
| 9,652,283 B2 | 5/2017 | Mitkar et al. |
| 9,684,535 B2 | 6/2017 | Deshpande et al. |
| 9,684,567 B2 | 6/2017 | Derk et al. |
| 9,703,584 B2 | 7/2017 | Kottomtharayil |
| 9,710,465 B2 | 7/2017 | Dornemann et al. |
| 9,740,702 B2 | 8/2017 | Pawar et al. |
| 9,760,398 B1 | 9/2017 | Pai |
| 9,760,448 B1 | 9/2017 | Per et al. |
| 9,766,825 B2 | 9/2017 | Bhagi |
| 9,766,989 B2 | 9/2017 | Mitkar et al. |
| 9,811,427 B2 | 11/2017 | Klose |
| 9,823,977 B2 | 11/2017 | Dornemann et al. |
| 9,852,026 B2 | 12/2017 | Mitkar et al. |
| 9,886,346 B2 | 2/2018 | Kumarasamy et al. |
| 9,892,276 B2 | 2/2018 | Bell et al. |
| 9,898,213 B2 | 2/2018 | Joshi et al. |
| 9,928,001 B2 | 3/2018 | Dornemann et al. |
| 9,939,981 B2 | 4/2018 | Varadharajan et al. |
| 9,965,306 B1 | 5/2018 | Natanzon |
| 9,965,316 B2 | 5/2018 | Deshpande et al. |
| 9,977,687 B2 | 5/2018 | Kottomtharayil et al. |
| 9,983,936 B2 | 5/2018 | Dornemann et al. |
| 9,990,253 B1 | 6/2018 | Rajimwale et al. |
| 9,996,287 B2 | 6/2018 | Dornemann et al. |
| 9,996,534 B2 | 6/2018 | Dornemann et al. |
| 10,001,935 B2 | 6/2018 | Gokhale et al. |
| 10,013,314 B2 | 7/2018 | Klose |
| 10,048,889 B2 | 8/2018 | Dornemann et al. |
| 10,061,658 B2 | 8/2018 | Long et al. |
| 10,061,663 B2 | 8/2018 | Vijayan et al. |
| 10,073,649 B2 | 9/2018 | DeJong et al. |
| 10,084,873 B2 | 9/2018 | Dornemann |
| 10,108,502 B1 | 10/2018 | Gopinath |
| 10,108,652 B2 | 10/2018 | Kumarasamy et al. |
| 10,146,643 B2 | 12/2018 | Fang et al. |
| 10,152,251 B2 | 12/2018 | Sancheti et al. |
| 10,162,528 B2 | 12/2018 | Sancheti |
| 10,162,873 B2 | 12/2018 | Bonzini |
| 10,191,816 B2 | 1/2019 | Vijayan et al. |
| 10,228,962 B2 | 3/2019 | Dornemann et al. |
| 10,229,133 B2 | 3/2019 | Vijayan et al. |
| 10,255,143 B2 | 4/2019 | Vijayan et al. |
| 10,365,839 B2 | 7/2019 | Gokhale et al. |
| 10,379,892 B2 | 8/2019 | Kripalani |
| 10,380,072 B2 | 8/2019 | Attarde et al. |
| 10,387,073 B2 | 8/2019 | Bhagi et al. |

(56) References Cited

U.S. PATENT DOCUMENTS

| | | |
|---|---|---|
| 10,387,269 B2 | 8/2019 | Muller et al. |
| 10,417,102 B2 | 9/2019 | Sanakkayala et al. |
| 10,437,505 B2 | 10/2019 | Dornemann et al. |
| 10,452,303 B2 | 10/2019 | Dornemann et al. |
| 10,474,483 B2 | 11/2019 | Kottomtharayil et al. |
| 10,474,542 B2 | 11/2019 | Mitkar et al. |
| 10,474,548 B2 | 11/2019 | Sanakkayala et al. |
| 10,474,638 B2 | 11/2019 | Mitkar et al. |
| 10,481,826 B2 | 11/2019 | Vijayan et al. |
| 10,481,984 B1 | 11/2019 | Semyonov et al. |
| 10,496,547 B1 | 12/2019 | Naenko |
| 10,503,619 B2 | 12/2019 | Kremane |
| 10,503,753 B2 | 12/2019 | Mitkar et al. |
| 10,534,672 B2 | 1/2020 | Klose |
| 10,534,673 B2 | 1/2020 | Gokhale et al. |
| 10,540,327 B2 | 1/2020 | Ngo et al. |
| 10,565,067 B2 | 2/2020 | Dornemann |
| 10,572,468 B2 | 2/2020 | Dornemann et al. |
| 10,592,145 B2 | 3/2020 | Bedadala et al. |
| 10,592,350 B2 | 3/2020 | Dornemann |
| 10,592,357 B2 | 3/2020 | Vijayan et al. |
| 10,628,267 B2 | 4/2020 | Pradhan et al. |
| 10,650,057 B2 | 5/2020 | Pawar et al. |
| 10,673,943 B2 | 6/2020 | Pradhan et al. |
| 10,678,758 B2 | 6/2020 | Dornemann |
| 10,684,883 B2 | 6/2020 | Deshpande et al. |
| 10,684,924 B2 | 6/2020 | Kilaru et al. |
| 10,732,885 B2 | 8/2020 | Gutta et al. |
| 10,733,143 B2 | 8/2020 | Pawar et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 10,838,824 B2 | 11/2020 | Klose |
| 10,853,195 B2 | 12/2020 | Ashraf |
| 10,877,928 B2 | 12/2020 | Nagrale et al. |
| 10,884,635 B2 | 1/2021 | Gokhale et al. |
| 10,896,104 B2 | 1/2021 | Sanakkayala et al. |
| 10,990,484 B2 | 4/2021 | Gokhale et al. |
| 11,016,696 B2 | 5/2021 | Ankireddypalle et al. |
| 11,099,943 B2 | 8/2021 | Gokhale et al. |
| 11,099,956 B1 | 8/2021 | Polimera |
| 11,200,124 B2 | 12/2021 | Rathi et al. |
| 11,321,189 B2 | 5/2022 | Klose |
| 11,449,394 B2 | 9/2022 | Bedadala et al. |
| 11,663,099 B2 | 5/2023 | Polimera |
| 2001/0044910 A1 | 11/2001 | Ricart et al. |
| 2002/0069369 A1 | 6/2002 | Tremain |
| 2002/0095609 A1 | 7/2002 | Tokunaga |
| 2002/0178143 A1 | 11/2002 | Fujimoto |
| 2002/0194511 A1 | 12/2002 | Swoboda |
| 2003/0021223 A1 | 1/2003 | Kashyap |
| 2003/0031127 A1 | 2/2003 | Saleh et al. |
| 2003/0056142 A1 | 3/2003 | Hashemi |
| 2003/0074600 A1 | 4/2003 | Tamatsu |
| 2003/0084076 A1 | 5/2003 | Sekiguchi et al. |
| 2003/0126494 A1 | 7/2003 | Strasser |
| 2003/0149750 A1 | 8/2003 | Franzenburg |
| 2003/0163495 A1 | 8/2003 | Lanzatella et al. |
| 2003/0182301 A1 | 9/2003 | Patterson et al. |
| 2003/0182329 A1 | 9/2003 | Sato |
| 2003/0204597 A1 | 10/2003 | Arakawa et al. |
| 2003/0236956 A1 | 12/2003 | Grubbs et al. |
| 2004/0019892 A1 | 1/2004 | E. et al. |
| 2004/0030668 A1 | 2/2004 | Pawlowski et al. |
| 2004/0030822 A1 | 2/2004 | Rajan et al. |
| 2004/0044642 A1 | 3/2004 | Fujii et al. |
| 2004/0078654 A1 | 4/2004 | Holland et al. |
| 2004/0128442 A1 | 7/2004 | Hinshaw et al. |
| 2004/0139127 A1 | 7/2004 | Pofelski |
| 2004/0153823 A1 | 8/2004 | Ansari |
| 2004/0230899 A1 | 11/2004 | Pagnano et al. |
| 2004/0250033 A1 | 12/2004 | Prahlad |
| 2004/0267838 A1 | 12/2004 | Curran et al. |
| 2004/0268175 A1 | 12/2004 | Koch et al. |
| 2005/0039069 A1 | 2/2005 | Prahlad |
| 2005/0044114 A1 | 2/2005 | Kottomtharayil et al. |
| 2005/0060356 A1 | 3/2005 | Saika |
| 2005/0080970 A1 | 4/2005 | Jeyasingh et al. |
| 2005/0131996 A1 | 6/2005 | Mastrianni et al. |
| 2005/0138461 A1 | 6/2005 | Allen et al. |
| 2005/0172161 A1 | 8/2005 | Cruz et al. |
| 2005/0183072 A1 | 8/2005 | Horning et al. |
| 2005/0187891 A1 | 8/2005 | Johnson et al. |
| 2005/0198303 A1 | 9/2005 | Knauerhase et al. |
| 2005/0216788 A1 | 9/2005 | Mani-Meitav et al. |
| 2005/0235286 A1 | 10/2005 | Ballew et al. |
| 2005/0257062 A1 | 11/2005 | Ignatius et al. |
| 2005/0262033 A1 | 11/2005 | Yamashita |
| 2005/0262097 A1 | 11/2005 | Sim-Tang |
| 2005/0262316 A1 | 11/2005 | Obayashi et al. |
| 2005/0268156 A1 | 12/2005 | Mashayekhi et al. |
| 2005/0278397 A1 | 12/2005 | Clark |
| 2006/0005048 A1 | 1/2006 | Osaki |
| 2006/0010227 A1 | 1/2006 | Atluri |
| 2006/0026452 A1 | 2/2006 | Suzuki et al. |
| 2006/0036658 A1 | 2/2006 | Henrickson |
| 2006/0047626 A1 | 3/2006 | Raheem |
| 2006/0058994 A1 | 3/2006 | Ravi |
| 2006/0085672 A1 | 4/2006 | Watanabe et al. |
| 2006/0101189 A1 | 5/2006 | Chandrasekaran et al. |
| 2006/0155594 A1 | 7/2006 | Almeida et al. |
| 2006/0155712 A1 | 7/2006 | Prahlad et al. |
| 2006/0184935 A1 | 8/2006 | Abels et al. |
| 2006/0195715 A1 | 8/2006 | Herington |
| 2006/0206547 A1 | 9/2006 | Kulkarni |
| 2006/0224846 A1 | 10/2006 | Amarendran et al. |
| 2006/0225065 A1 | 10/2006 | Chandhok et al. |
| 2006/0230136 A1 | 10/2006 | Ma |
| 2006/0236054 A1 | 10/2006 | Kitamura et al. |
| 2007/0027999 A1 | 2/2007 | Allen et al. |
| 2007/0043870 A1 | 2/2007 | Ninose |
| 2007/0050526 A1 | 3/2007 | Abe et al. |
| 2007/0074068 A1 | 3/2007 | Hsieh |
| 2007/0094467 A1 | 4/2007 | Yamasaki |
| 2007/0094533 A1 | 4/2007 | Coombs et al. |
| 2007/0100792 A1 | 5/2007 | Lent et al. |
| 2007/0150499 A1 | 6/2007 | D'Souza et al. |
| 2007/0156793 A1 | 7/2007 | D'Souza et al. |
| 2007/0185922 A1 | 8/2007 | Kapoor et al. |
| 2007/0185938 A1 | 8/2007 | Prahlad |
| 2007/0186068 A1 | 8/2007 | Agrawal |
| 2007/0198802 A1 | 8/2007 | Kavuri |
| 2007/0203938 A1 | 8/2007 | Prahlad |
| 2007/0208918 A1 | 9/2007 | Harbin et al. |
| 2007/0220319 A1 | 9/2007 | Desai et al. |
| 2007/0226535 A1 | 9/2007 | Gokhale |
| 2007/0234108 A1 | 10/2007 | Cox et al. |
| 2007/0234302 A1 | 10/2007 | Suzuki |
| 2007/0239804 A1 | 10/2007 | Armstrong et al. |
| 2007/0250365 A1 | 10/2007 | Chakrabarti et al. |
| 2007/0266056 A1 | 11/2007 | Stacey et al. |
| 2007/0271471 A1 | 11/2007 | Merzlikine et al. |
| 2007/0282921 A1 | 12/2007 | Atluri et al. |
| 2007/0283355 A1 | 12/2007 | Misono et al. |
| 2007/0299930 A1 | 12/2007 | Wendelrup et al. |
| 2008/0022058 A1 | 1/2008 | Nadathur et al. |
| 2008/0059704 A1 | 3/2008 | Kavuri |
| 2008/0071841 A1 | 3/2008 | Okada et al. |
| 2008/0091655 A1 | 4/2008 | Gokhale |
| 2008/0098049 A1 | 4/2008 | Pillai et al. |
| 2008/0126833 A1 | 5/2008 | Callaway et al. |
| 2008/0134177 A1 | 6/2008 | Fitzgerald et al. |
| 2008/0147754 A1 | 6/2008 | Littlefield |
| 2008/0162840 A1 | 7/2008 | Augenstein |
| 2008/0189468 A1 | 8/2008 | Schmidt et al. |
| 2008/0195639 A1 | 8/2008 | Freeman et al. |
| 2008/0201600 A1 | 8/2008 | Lu |
| 2008/0228771 A1 | 9/2008 | Prahlad |
| 2008/0228833 A1 | 9/2008 | Kano |
| 2008/0229037 A1 | 9/2008 | Bunte |
| 2008/0235479 A1 | 9/2008 | Scales et al. |
| 2008/0243855 A1 | 10/2008 | Prahlad |
| 2008/0243947 A1 | 10/2008 | Kaneda |
| 2008/0244068 A1 | 10/2008 | Iyoda et al. |

(56) References Cited

U.S. PATENT DOCUMENTS

| | | |
|---|---|---|
| 2008/0244177 A1 | 10/2008 | Crescenti |
| 2008/0244204 A1 | 10/2008 | Cremelie et al. |
| 2008/0250407 A1 | 10/2008 | Dadhia et al. |
| 2008/0253283 A1 | 10/2008 | Douglis et al. |
| 2008/0270488 A1 | 10/2008 | Ozawa et al. |
| 2008/0270564 A1 | 10/2008 | Rangegowda et al. |
| 2008/0275924 A1 | 11/2008 | Fries |
| 2008/0282253 A1 | 11/2008 | Huizenga |
| 2008/0307020 A1 | 12/2008 | Ko et al. |
| 2008/0313371 A1 | 12/2008 | Kedem et al. |
| 2008/0320319 A1 | 12/2008 | Muller |
| 2009/0006733 A1 | 1/2009 | Gold et al. |
| 2009/0013258 A1 | 1/2009 | Hintermeister et al. |
| 2009/0037680 A1 | 2/2009 | Colbert et al. |
| 2009/0037763 A1 | 2/2009 | Adhya et al. |
| 2009/0055507 A1 | 2/2009 | Oeda |
| 2009/0077557 A1 | 3/2009 | Ichikawa et al. |
| 2009/0113109 A1 | 4/2009 | Nelson et al. |
| 2009/0144416 A1 | 6/2009 | Chatley |
| 2009/0157882 A1 | 6/2009 | Kashyap |
| 2009/0183145 A1 | 7/2009 | Hu et al. |
| 2009/0204649 A1 | 8/2009 | Wong et al. |
| 2009/0210427 A1 | 8/2009 | Eidler et al. |
| 2009/0210458 A1 | 8/2009 | Glover et al. |
| 2009/0216816 A1 | 8/2009 | Basler et al. |
| 2009/0222496 A1 | 9/2009 | Liu et al. |
| 2009/0228669 A1 | 9/2009 | Siesarev et al. |
| 2009/0240904 A1 | 9/2009 | Austruy et al. |
| 2009/0243846 A1 | 10/2009 | Yuuki |
| 2009/0248762 A1 | 10/2009 | Prahlad et al. |
| 2009/0249005 A1 | 10/2009 | Bender et al. |
| 2009/0282404 A1 | 11/2009 | Khandekar |
| 2009/0287665 A1 | 11/2009 | Prahlad |
| 2009/0300023 A1 | 12/2009 | Vaghani |
| 2009/0300057 A1 | 12/2009 | Friedman |
| 2009/0307166 A1 | 12/2009 | Routray et al. |
| 2009/0313260 A1 | 12/2009 | Mimatsu |
| 2009/0313447 A1 | 12/2009 | Nguyen et al. |
| 2009/0313503 A1 | 12/2009 | Atluri et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320137 A1 | 12/2009 | White et al. |
| 2009/0327477 A1 | 12/2009 | Madison, Jr |
| 2010/0011178 A1 | 1/2010 | Feathergill |
| 2010/0017444 A1 | 1/2010 | Chatterjee et al. |
| 2010/0017647 A1 | 1/2010 | Callaway et al. |
| 2010/0030984 A1 | 2/2010 | Erickson |
| 2010/0031086 A1 | 2/2010 | Leppard |
| 2010/0042790 A1 | 2/2010 | Mondal et al. |
| 2010/0049929 A1 | 2/2010 | Nagarkar et al. |
| 2010/0049930 A1 | 2/2010 | Pershin |
| 2010/0070466 A1 | 3/2010 | Prahlad |
| 2010/0070474 A1 | 3/2010 | Lad |
| 2010/0070478 A1 | 3/2010 | Anglin |
| 2010/0070725 A1 | 3/2010 | Prahlad |
| 2010/0070726 A1 | 3/2010 | Ngo et al. |
| 2010/0077161 A1 | 3/2010 | Stoakes et al. |
| 2010/0082672 A1 | 4/2010 | Kottomtharayil |
| 2010/0094948 A1 | 4/2010 | Ganesh et al. |
| 2010/0094981 A1 | 4/2010 | Cordray |
| 2010/0101300 A1 | 4/2010 | Rigby et al. |
| 2010/0106691 A1 | 4/2010 | Preslan et al. |
| 2010/0107158 A1 | 4/2010 | Chen et al. |
| 2010/0107172 A1 | 4/2010 | Calinescu et al. |
| 2010/0161919 A1 | 6/2010 | Dodgson et al. |
| 2010/0162037 A1 | 6/2010 | Maule et al. |
| 2010/0186014 A1 | 7/2010 | Vaghani et al. |
| 2010/0211829 A1 | 8/2010 | Ziskind et al. |
| 2010/0223495 A1 | 9/2010 | Leppard |
| 2010/0228913 A1 | 9/2010 | Czezatke et al. |
| 2010/0242096 A1 | 9/2010 | Varadharajan et al. |
| 2010/0250549 A1 | 9/2010 | Muller |
| 2010/0257523 A1 | 10/2010 | Frank |
| 2010/0262586 A1 | 10/2010 | Rosikiewicz et al. |
| 2010/0262794 A1 | 10/2010 | De Beer et al. |
| 2010/0280999 A1 | 11/2010 | Atluri et al. |
| 2010/0281458 A1 | 11/2010 | Paladino et al. |
| 2010/0293439 A1 | 11/2010 | Flynn et al. |
| 2010/0299309 A1 | 11/2010 | Maki et al. |
| 2010/0299490 A1 | 11/2010 | Attarde |
| 2010/0299666 A1 | 11/2010 | Agbaria et al. |
| 2010/0306173 A1 | 12/2010 | Frank |
| 2010/0306486 A1 | 12/2010 | Balasubramanian et al. |
| 2010/0325471 A1 | 12/2010 | Mishra et al. |
| 2010/0325727 A1 | 12/2010 | Neystad et al. |
| 2010/0332401 A1 | 12/2010 | Prahlad |
| 2010/0332454 A1 | 12/2010 | Prahlad |
| 2010/0332456 A1 | 12/2010 | Prahlad |
| 2010/0332479 A1 | 12/2010 | Prahlad |
| 2010/0332629 A1 | 12/2010 | Cotugno et al. |
| 2010/0332818 A1 | 12/2010 | Prahlad |
| 2010/0333100 A1 | 12/2010 | Miyazaki et al. |
| 2010/0333116 A1 | 12/2010 | Prahlad |
| 2011/0004586 A1 | 1/2011 | Cherryholmes et al. |
| 2011/0010515 A1 | 1/2011 | Ranade |
| 2011/0016467 A1 | 1/2011 | Kane |
| 2011/0022811 A1 | 1/2011 | Kirihata et al. |
| 2011/0023114 A1 | 1/2011 | Diab et al. |
| 2011/0035620 A1 | 2/2011 | Elyashev et al. |
| 2011/0047541 A1 | 2/2011 | Yamaguchi et al. |
| 2011/0061045 A1 | 3/2011 | Phillips |
| 2011/0072430 A1 | 3/2011 | Mani |
| 2011/0087632 A1 | 4/2011 | Subramanian et al. |
| 2011/0107025 A1 | 5/2011 | Urkude |
| 2011/0107331 A1 | 5/2011 | Evans et al. |
| 2011/0153570 A1 | 6/2011 | Kim et al. |
| 2011/0154109 A1 | 6/2011 | Levine |
| 2011/0161299 A1 | 6/2011 | Prahlad |
| 2011/0179414 A1 | 7/2011 | Goggin et al. |
| 2011/0185355 A1 | 7/2011 | Chawla |
| 2011/0191559 A1 | 8/2011 | Li et al. |
| 2011/0202728 A1 | 8/2011 | Nichols et al. |
| 2011/0202734 A1 | 8/2011 | Dhakras et al. |
| 2011/0208928 A1 | 8/2011 | Chandra et al. |
| 2011/0213754 A1 | 9/2011 | Bindal |
| 2011/0218967 A1 | 9/2011 | Sliger et al. |
| 2011/0219144 A1 | 9/2011 | Amit et al. |
| 2011/0225277 A1 | 9/2011 | Freimuth et al. |
| 2011/0234583 A1 | 9/2011 | Bakalash |
| 2011/0239013 A1 | 9/2011 | Muller |
| 2011/0246430 A1 | 10/2011 | Prahlad et al. |
| 2011/0252208 A1 | 10/2011 | Ali et al. |
| 2011/0264786 A1 | 10/2011 | Kedem et al. |
| 2011/0289281 A1 | 11/2011 | Spackman |
| 2012/0016840 A1 | 1/2012 | Lin et al. |
| 2012/0017027 A1 | 1/2012 | Baskakov et al. |
| 2012/0017043 A1 | 1/2012 | Aizman et al. |
| 2012/0017114 A1 | 1/2012 | Timashev et al. |
| 2012/0054736 A1 | 3/2012 | Arcese et al. |
| 2012/0072685 A1 | 3/2012 | Otani |
| 2012/0078881 A1 | 3/2012 | Crump et al. |
| 2012/0079221 A1 | 3/2012 | Sivasubramanian |
| 2012/0084262 A1 | 4/2012 | Dwarampudi et al. |
| 2012/0084272 A1 | 4/2012 | Garces-Erice et al. |
| 2012/0084769 A1 | 4/2012 | Adi et al. |
| 2012/0096149 A1 | 4/2012 | Sunkara et al. |
| 2012/0101999 A1 | 4/2012 | Scherzinger et al. |
| 2012/0110328 A1 | 5/2012 | Pate |
| 2012/0131295 A1 | 5/2012 | Nakajima |
| 2012/0131578 A1 | 5/2012 | Ciano et al. |
| 2012/0136832 A1 | 5/2012 | Sadhwani |
| 2012/0150815 A1 | 6/2012 | Parfumi |
| 2012/0150818 A1 | 6/2012 | Vijayan Retnamma et al. |
| 2012/0150826 A1 | 6/2012 | Vijayan Retnamma et al. |
| 2012/0150949 A1 | 6/2012 | Vijayan Retnamma et al. |
| 2012/0151084 A1 | 6/2012 | Stathopoulos et al. |
| 2012/0159232 A1 | 6/2012 | Shimada et al. |
| 2012/0167083 A1 | 6/2012 | Suit |
| 2012/0209812 A1 | 8/2012 | Bezbaruah |
| 2012/0221843 A1 | 8/2012 | Bak et al. |
| 2012/0233285 A1 | 9/2012 | Suzuki |
| 2012/0254119 A1 | 10/2012 | Kumarasamy et al. |
| 2012/0254364 A1 | 10/2012 | Vijayan |

(56)  References Cited

U.S. PATENT DOCUMENTS

| | | |
|---|---|---|
| 2012/0254824 A1 | 10/2012 | Bansod |
| 2012/0278287 A1 | 11/2012 | Wilk |
| 2012/0278571 A1 | 11/2012 | Fleming et al. |
| 2012/0278799 A1 | 11/2012 | Starks et al. |
| 2012/0290802 A1 | 11/2012 | Wade et al. |
| 2012/0324183 A1 | 12/2012 | Chiruvolu et al. |
| 2012/0331248 A1 | 12/2012 | Kono et al. |
| 2013/0024641 A1 | 1/2013 | Talagala et al. |
| 2013/0024722 A1 | 1/2013 | Kotagiri |
| 2013/0036418 A1 | 2/2013 | Yadappanavar et al. |
| 2013/0042234 A1 | 2/2013 | Deluca et al. |
| 2013/0054533 A1 | 2/2013 | Hao et al. |
| 2013/0061014 A1 | 3/2013 | Prahlad |
| 2013/0074181 A1 | 3/2013 | Singh |
| 2013/0080841 A1 | 3/2013 | Reddy et al. |
| 2013/0086580 A1 | 4/2013 | Simonsen et al. |
| 2013/0117744 A1 | 5/2013 | Klein et al. |
| 2013/0138880 A1 | 5/2013 | Murata |
| 2013/0173771 A1 | 7/2013 | Ditto et al. |
| 2013/0204849 A1 | 8/2013 | Chacko |
| 2013/0227558 A1 | 8/2013 | Du et al. |
| 2013/0232215 A1 | 9/2013 | Gupta et al. |
| 2013/0232480 A1 | 9/2013 | Winterfeldt et al. |
| 2013/0238562 A1 | 9/2013 | Kumarasamy |
| 2013/0238572 A1 | 9/2013 | Prahlad et al. |
| 2013/0262390 A1 | 10/2013 | Kumarasamy |
| 2013/0262396 A1 | 10/2013 | Kripalani |
| 2013/0262638 A1 | 10/2013 | Kumarasamy et al. |
| 2013/0262801 A1 | 10/2013 | Sancheti |
| 2013/0268931 A1 | 10/2013 | O'Hare et al. |
| 2013/0290267 A1 | 10/2013 | Dwarampudi et al. |
| 2013/0297772 A1 | 11/2013 | Ashok et al. |
| 2013/0311429 A1 | 11/2013 | Agetsuma |
| 2013/0326260 A1 | 12/2013 | Wei et al. |
| 2014/0006858 A1 | 1/2014 | Helfman et al. |
| 2014/0007097 A1 | 1/2014 | Chin et al. |
| 2014/0007181 A1 | 1/2014 | Sarin et al. |
| 2014/0052892 A1 | 2/2014 | Klein et al. |
| 2014/0059380 A1 | 2/2014 | Krishnan |
| 2014/0075440 A1 | 3/2014 | Prahlad et al. |
| 2014/0082128 A1 | 3/2014 | Beard |
| 2014/0089266 A1 | 3/2014 | Une et al. |
| 2014/0095816 A1 | 4/2014 | Hsu et al. |
| 2014/0101300 A1 | 4/2014 | Rosensweig et al. |
| 2014/0115285 A1 | 4/2014 | Arcese et al. |
| 2014/0115287 A1 | 4/2014 | Schnapp et al. |
| 2014/0136803 A1 | 5/2014 | Qin |
| 2014/0143636 A1 | 5/2014 | Frost et al. |
| 2014/0156684 A1 | 6/2014 | Zaslavsky et al. |
| 2014/0181038 A1 | 6/2014 | Pawar et al. |
| 2014/0181044 A1 | 6/2014 | Pawar et al. |
| 2014/0181046 A1 | 6/2014 | Pawar et al. |
| 2014/0188803 A1 | 7/2014 | James et al. |
| 2014/0195749 A1 | 7/2014 | Colgrove et al. |
| 2014/0196037 A1 | 7/2014 | Gopalan et al. |
| 2014/0196038 A1 | 7/2014 | Kottomtharavil et al. |
| 2014/0196039 A1 | 7/2014 | Kottomtharayil et al. |
| 2014/0201142 A1 | 7/2014 | Varadharajan |
| 2014/0201151 A1 | 7/2014 | Kumarasamy |
| 2014/0201153 A1 | 7/2014 | Vijayan et al. |
| 2014/0201157 A1 | 7/2014 | Pawar et al. |
| 2014/0201162 A1 | 7/2014 | Kumarasamy |
| 2014/0201170 A1 | 7/2014 | Vijayan et al. |
| 2014/0201365 A1 | 7/2014 | Ashok et al. |
| 2014/0229451 A1 | 8/2014 | Venkatesh et al. |
| 2014/0237537 A1 | 8/2014 | Manmohan et al. |
| 2014/0244610 A1 | 8/2014 | Raman et al. |
| 2014/0258245 A1 | 9/2014 | Estes |
| 2014/0259015 A1 | 9/2014 | Chigusa et al. |
| 2014/0278530 A1 | 9/2014 | Bruce et al. |
| 2014/0281758 A1 | 9/2014 | Klein et al. |
| 2014/0282514 A1 | 9/2014 | Carson et al. |
| 2014/0330874 A1 | 11/2014 | Novak et al. |
| 2014/0337285 A1 | 11/2014 | Gokhale et al. |
| 2014/0337295 A1 | 11/2014 | Haselton et al. |
| 2014/0344323 A1 | 11/2014 | Pelavin et al. |
| 2014/0372384 A1 | 12/2014 | Long et al. |
| 2014/0372788 A1 | 12/2014 | Vavrick et al. |
| 2015/0026508 A1 | 1/2015 | Jacobs et al. |
| 2015/0058382 A1 | 2/2015 | St. Laurent et al. |
| 2015/0067391 A1 | 3/2015 | Merchant et al. |
| 2015/0067393 A1 | 3/2015 | Madani et al. |
| 2015/0074536 A1 | 3/2015 | Varadharajan et al. |
| 2015/0088821 A1 | 3/2015 | Blea et al. |
| 2015/0089185 A1 | 3/2015 | Brandyberry et al. |
| 2015/0095908 A1 | 4/2015 | Jacobs et al. |
| 2015/0120928 A1 | 4/2015 | Gummaraju et al. |
| 2015/0121122 A1 | 4/2015 | Towstopiat et al. |
| 2015/0134607 A1 | 5/2015 | Magdon-Ismail et al. |
| 2015/0142745 A1 | 5/2015 | Tekade et al. |
| 2015/0149813 A1 | 5/2015 | Mizuno et al. |
| 2015/0160884 A1 | 6/2015 | Scales et al. |
| 2015/0161015 A1 | 6/2015 | Kumarasamy et al. |
| 2015/0163172 A1 | 6/2015 | Mudigonda et al. |
| 2015/0169417 A1 | 6/2015 | Brandwine et al. |
| 2015/0199238 A1 | 7/2015 | Badgley |
| 2015/0205682 A1 | 7/2015 | Gokhale et al. |
| 2015/0227438 A1 | 8/2015 | Jaquette |
| 2015/0227602 A1 | 8/2015 | Ramu |
| 2015/0242283 A1 | 8/2015 | Simoncelli et al. |
| 2015/0248333 A1 | 9/2015 | Aravot |
| 2015/0268876 A1 | 9/2015 | Ahn et al. |
| 2015/0278046 A1 | 10/2015 | Zellermayer et al. |
| 2015/0293817 A1 | 10/2015 | Subramanian et al. |
| 2015/0317216 A1 | 11/2015 | Hsu et al. |
| 2015/0347165 A1 | 12/2015 | Lipchuk et al. |
| 2015/0347306 A1 | 12/2015 | Gschwind |
| 2015/0347430 A1 | 12/2015 | Ghosh |
| 2015/0350027 A1 | 12/2015 | Raissinia et al. |
| 2015/0363254 A1 | 12/2015 | Satoyama et al. |
| 2015/0363413 A1 | 12/2015 | Ghosh |
| 2015/0370652 A1 | 12/2015 | He et al. |
| 2015/0370668 A1 | 12/2015 | Nazari et al. |
| 2015/0378758 A1 | 12/2015 | Duggan et al. |
| 2015/0378771 A1 | 12/2015 | Tarasuk-Levin |
| 2015/0378833 A1 | 12/2015 | Misra et al. |
| 2015/0378849 A1 | 12/2015 | Liu et al. |
| 2015/0378857 A1 | 12/2015 | Sevigny et al. |
| 2015/0381711 A1 | 12/2015 | Singh et al. |
| 2016/0019317 A1 | 1/2016 | Pawar et al. |
| 2016/0026405 A1 | 1/2016 | Dhuse |
| 2016/0070623 A1 | 3/2016 | Derk |
| 2016/0085606 A1 | 3/2016 | Panasko et al. |
| 2016/0092467 A1 | 3/2016 | Lee et al. |
| 2016/0132400 A1 | 5/2016 | Pawar et al. |
| 2016/0154709 A1 | 6/2016 | MItkar et al. |
| 2016/0170844 A1 | 6/2016 | Long et al. |
| 2016/0188413 A1 | 6/2016 | Abali et al. |
| 2016/0202916 A1 | 7/2016 | Cui et al. |
| 2016/0203060 A1 | 7/2016 | Singh |
| 2016/0210064 A1 | 7/2016 | Dornemann et al. |
| 2016/0226966 A1 | 8/2016 | Lin |
| 2016/0283335 A1 | 9/2016 | Yao et al. |
| 2016/0299818 A1 | 10/2016 | Vijayan et al. |
| 2016/0306706 A1 | 10/2016 | Pawar et al. |
| 2016/0308722 A1 | 10/2016 | Kumarasamy et al. |
| 2016/0335007 A1 | 11/2016 | Ryu et al. |
| 2016/0350391 A1 | 12/2016 | Vijayan et al. |
| 2016/0371127 A1 | 12/2016 | Antony |
| 2017/0031768 A1 | 2/2017 | Sarab |
| 2017/0054720 A1 | 2/2017 | Geng et al. |
| 2017/0090972 A1 | 3/2017 | Ryu et al. |
| 2017/0123939 A1 | 5/2017 | Maheshwari et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan |
| 2017/0192868 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0249220 A1 | 8/2017 | Kumarasamy et al. |
| 2017/0262204 A1 | 9/2017 | Dornemann et al. |
| 2017/0262347 A1 | 9/2017 | Dornemann |
| 2017/0262350 A1 | 9/2017 | Dornemann et al. |

(56)　　　　　References Cited

U.S. PATENT DOCUMENTS

| 2017/0264589 A1 | 9/2017 | Hunt et al. |
| 2017/0286230 A1 | 10/2017 | Zamir |
| 2017/0300394 A1 | 10/2017 | Raut |
| 2017/0315876 A1 | 11/2017 | Dornquast et al. |
| 2017/0371547 A1 | 12/2017 | Fruchtman et al. |
| 2018/0011885 A1 | 1/2018 | Prahlad et al. |
| 2018/0060104 A1 | 3/2018 | Tarasuk-Levin et al. |
| 2018/0067955 A1 | 3/2018 | Pawar et al. |
| 2018/0075166 A1 | 3/2018 | Pawar et al. |
| 2018/0089031 A1 | 3/2018 | Mitkar et al. |
| 2018/0095846 A1 | 4/2018 | Sanakkayala et al. |
| 2018/0095851 A1 | 4/2018 | Zhang |
| 2018/0113623 A1 | 4/2018 | Sancheti |
| 2018/0143879 A1 | 5/2018 | Dornemann |
| 2018/0143880 A1 | 5/2018 | Dornemann |
| 2018/0173454 A1 | 6/2018 | Dornemann et al. |
| 2018/0181598 A1 | 6/2018 | Pawar et al. |
| 2018/0217756 A1 | 8/2018 | Liu |
| 2018/0253192 A1 | 9/2018 | Varadharajan et al. |
| 2018/0260157 A1 | 9/2018 | Dornemann et al. |
| 2018/0267861 A1 | 9/2018 | Iyer et al. |
| 2018/0275913 A1 | 9/2018 | Mitkar et al. |
| 2018/0276022 A1 | 9/2018 | Mitkar et al. |
| 2018/0276083 A1 | 9/2018 | Mitkar et al. |
| 2018/0276084 A1 | 9/2018 | Mitkar et al. |
| 2018/0276085 A1 | 9/2018 | Mitkar et al. |
| 2018/0284986 A1 | 10/2018 | Bhagi et al. |
| 2018/0285202 A1 | 10/2018 | Bhagi et al. |
| 2018/0285209 A1 | 10/2018 | Liu et al. |
| 2018/0285215 A1 | 10/2018 | Ashraf et al. |
| 2018/0285353 A1 | 10/2018 | Ramohalli Gopala Rao et al. |
| 2018/0300168 A1 | 10/2018 | Deshpande et al. |
| 2018/0307510 A1 | 10/2018 | Kottomtharayil et al. |
| 2018/0314694 A1 | 11/2018 | Dornemann et al. |
| 2018/0329636 A1 | 11/2018 | Dornemann et al. |
| 2018/0373597 A1 | 12/2018 | Rana |
| 2019/0012339 A1 | 1/2019 | Kumarasamy et al. |
| 2019/0026187 A1 | 1/2019 | Gulam et al. |
| 2019/0065069 A1 | 2/2019 | Sancheti et al. |
| 2019/0090305 A1 | 3/2019 | Hunter et al. |
| 2019/0108341 A1 | 4/2019 | Bedhapudi et al. |
| 2019/0196916 A1 | 6/2019 | Kumarasamy et al. |
| 2019/0272220 A1 | 9/2019 | Vijayan et al. |
| 2019/0272221 A1 | 9/2019 | Vijayan et al. |
| 2019/0278662 A1 | 9/2019 | Nagrale et al. |
| 2019/0324791 A1 | 10/2019 | Kripalani |
| 2019/0347120 A1 | 11/2019 | Kottomtharayil et al. |
| 2019/0369901 A1 | 12/2019 | Dornemann et al. |
| 2019/0370107 A1 | 12/2019 | Subburasu et al. |
| 2019/0391742 A1 | 12/2019 | Bhagi et al. |
| 2020/0034252 A1 | 1/2020 | Mitkar et al. |
| 2020/0142612 A1 | 5/2020 | Dornemann et al. |
| 2020/0142782 A1 | 5/2020 | Dornemann |
| 2020/0142783 A1 | 5/2020 | Dornemann |
| 2020/0159627 A1 | 5/2020 | Bedadala et al. |
| 2020/0174894 A1 | 6/2020 | Dornemann |
| 2020/0174895 A1 | 6/2020 | Dornemann |
| 2020/0183728 A1 | 6/2020 | Deshpande et al. |
| 2020/0183802 A1 | 6/2020 | Rathi et al. |
| 2020/0241907 A1 | 7/2020 | Dornemann et al. |
| 2020/0241908 A1 | 7/2020 | Dornemann et al. |
| 2020/0265024 A1 | 8/2020 | Pawar et al. |
| 2020/0301891 A1 | 9/2020 | Dornemann |
| 2020/0327163 A1 | 10/2020 | Pawar et al. |
| 2020/0334201 A1 | 10/2020 | Pawar et al. |
| 2020/0334221 A1 | 10/2020 | Prahlad et al. |
| 2021/0334002 A1 | 10/2021 | Ankireddypalle et al. |
| 2021/0342237 A1 | 11/2021 | Polimera et al. |
| 2022/0012135 A1 | 1/2022 | Gokhale et al. |
| 2022/0043727 A1 | 2/2022 | Rathi et al. |

FOREIGN PATENT DOCUMENTS

| DE | 69415115 T2 | 8/1999 |
| DE | 60020978 T2 | 4/2006 |
| EP | 0259912 A1 | 3/1988 |
| EP | 0405926 A2 | 1/1991 |
| EP | 0467546 A2 | 1/1992 |
| EP | 0541281 A2 | 5/1993 |
| EP | 0645709 A2 | 3/1995 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |
| EP | 1393181 A2 | 1/2001 |
| EP | 1204922 A1 | 5/2002 |
| EP | 1209569 A1 | 5/2002 |
| EP | 1384135 A2 | 1/2004 |
| EP | 1387269 A1 | 2/2004 |
| EP | 1533701 A1 | 5/2005 |
| EP | 1938192 B1 | 11/2009 |
| GB | 2447361 A | 9/2008 |
| JP | 4198050 B2 | 12/2008 |
| JP | 4267443 B2 | 5/2009 |
| WO | 1995013580 A1 | 5/1995 |
| WO | 1999012098 A1 | 3/1999 |
| WO | 2004023317 A1 | 3/2004 |
| WO | 2005050449 A1 | 6/2005 |
| WO | 2005086032 A1 | 9/2005 |
| WO | 2005103955 A1 | 11/2005 |
| WO | 2006052872 A2 | 5/2006 |
| WO | 2007021678 A2 | 2/2007 |
| WO | 2010140264 A1 | 12/2010 |

OTHER PUBLICATIONS

Bonvin, Nicolas, Thanasis G. Papaioannou, and Karl Aberer. "Dynamic cost-efficient replication in data clouds." Proceedings of the 1st Workshop on Automated Control for Datacenters and Clouds. 2009. pp. 49-56 (Year: 2009).

Granger, et al., "Survivable Storage Systems", 2001, pp. 184-195.

Gulati et al. "Cloud scale resource management: Challenges and techniques.", 3rd USENIX Workshop on Hot Topics in Cloud Computing (HotCloud 11), 2011, pp. 1-6.

Haselhorst, et al., "Efficient Storage Synchronization for Live Migration in Cloud Infrastructures", 2011, pp. 511-518.

Jander, "Launching Storage-Area Net," Data Communications, US, McGraw Hill, NY, vol. 27, No. 4 (Mar. 21, 1998), pp. 64-72.

Li et al., "Research on the Backup Mechanism of Oracle Database" International Conference on Environmental Science and Information Application Technology, Jul. 2009, pp. 423-426.

Lu et al.. "Virtual Machine Memory Access Tracing with Hypervisor Exclusive Cache", Usenix Annual Technical Conference, 2007, pp. 29-43.

Mao, et al., "Read-Performance Optimization for Deduplication-Based Storage Systems in the Cloud", 2014, pp. 1-22.

Reingold, B. et al., "Cloud Computing: The Intersection of Massive Scalability, Data Security and Privacy (Part I)," LegalWorks, 2009, 5 pages.

Tanenbaum, Andrew S., Structured Computer Organization, Third Edition, 1990, Prentice-Hall, Inc., pp. 11-13.

Tran, et al., "Efficient Cooperative Backup with Decentralized Trust Management", 2012, pp. 1-25.

VMware, Inc., "The Open Virtual Machine Format Whitepaper for OVF Specification, version 0.9," White Paper, <http://www.vmware.com>, 2007, 16 pages.

VMware, Inc., "VMware Solution Exchange (VSX)" <http://www.vmware.com/appliances/learn/ovf.html>, 2014, 3 pages.

Vrable, et al., "Cumulus: Filesystem Backup to the Cloud", 2009, pp. 1-28.

Wikipedia, "File Allocation Table," <http://en.wikipedia.org/wiki/File.sub.--Allocation.sub.--Table>, internet accessed on Jul. 25, 2008, 19 pages.

Adjeroh, Donald A., and Kingsley C. Nwosu. "Multimedia database management-requirements and issues." IEEE multimedia 4.3 (1997): pp. 24-33. (Year: 1997).

Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.

(56)            References Cited

OTHER PUBLICATIONS

Celesti et al., "Improving Virtual Machine Migration in Federated Cloud Environments", 2010, pp. 61-67.
Chan, et al., "An Approach to High Availability for Cloud Servers with Snapshot Mechanism," 2012, pp. 1-6.
Chervenak, et al., "Protecting File Systems—A Survey of Backup Techniques," 1998, pp. 17-31.
CommVault Systems, Inc., "Enhanced Protection and Manageability of Virtual Servers," Partner Solution Brief, 2008, 6 pages.
Data Protection for Large Vmware and Vblock Environments Using EMC Avamar Applied Technology, Nov. 2010, EMC Corporation, 26 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, 7 pages.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.
Davis, D., "VMware Versions Compared," Petri IT Knowledgebase, <http://www.petri.co.il/virtual_vmware_versions_compared.htm>, internet accessed on Apr. 28, 2008, 6 pages.
Eitel, "Backup and Storage Management in Distributed Heterogeneous Environments," IEEE, Jun. 12-16, 1994, pp. 124-126.
Eldos Callback File System product information from https://www.eldos.com/clients/104-345.php retrieved on Dec. 30, 2016 in 2 pages.
Eldos Usermode filesystem for your Windows applications—Callback File System® (CBFS®)—Create and manage virtual filesystems and disks from your Windows applications retrieved from https://eldos.com/cbfs on Dec. 30, 2016 in 4 pages.
Fraser et al., "Safe Hardware Access With the Xen Virtual Machine Monitor", 1st Workshop on Operating System and Architectural Support for the demand IT InfraStructure (OASIS), 2004, pp. 1-10.
Gorton, Ian, and John Klein. "Distribution, data, deployment: Software architecture convergence in big data systems." IEEE Software 32.3 (2014): pp. 78-85. (Year: 2014).
Hirofuchi, Takahiro et al. "A Live Storage Migration Mechanism Over WAN for Relocatable Virtual Machine Services on Clouds." Proceedings of the 2009 9th IEEE/ACM International Symposium on Cluster Computing and the Grib. IEEE Computer Society, 2009, 7 pages.
Hu, et al., "Virtual Machine based Hot-spare Fault-tolerant System," 2009, pp. 429-432.
Hu, Wenjin et al., "A Quantitative Study of Virtual Machine Live Migration," 2013, pp. 1-10.
International Search Report and Written Opinion for PCT/US2011/054374, dated May 2, 2012, in 7 pages.
Ismail et al., "Architecture of Scalable Backup Service For Private Cloud", IEEE Conference on Open Systems (ICOS), 2013, pp. 174-179.
Javaraiah, et al., "Backup for Cloud and Disaster Recovery for Consumers and SMBs," 2008, pp. 1-3.
Jhawar et al., "Fault Tolerance Management in Cloud Computing: A System-Level Perspective", IEEE Systems Journal, vol. 7, No. 2, 2013, pp. 288-297.
Kim, et al., "Availability Modeling and Analysis of a Virtualized System," 2009, pp. 365-371.
Kuo, et al., "A Hybrid Cloud Storage Architecture for Service Operational High Availability", 2013, pp. 487-492.
Li et al. "Comparing Containers versus Virtual Machines for Achieving High Availability" 2015 IEEE, pp. 353-358.
Liang, et al., "A virtual disk environment for providing file system recovery", 2006, pp. 589-599.
Microsoft Corporation, "How NTFS Works," Windows Server TechCenter, <http://technet2.mircrosoft.com/windowsserver/en/ library/8cc5891d-bf8e-4164-862d-dac5418c5948 . . . >, updated Mar. 28, 2003, internet accessed Mar. 26, 2008, 26 pages.
Retrieved Aug. 12, 2014; 2 pages.
Sanbarrow.com, "Files Used by a VM," <http://sanbarrow.com/vmx/vmx-files-used-by-a-vm.html>, internet accessed on Jul. 22, 2008, 2 pages.
Somasundaram et al., Information Storage and Management. 2009, pp. 251-281.
Terry, Douglas B., et al. "Managing update conflicts in Bayou, a weakly connected replicated storage system." ACM SIGOPS Operating Systems Review 29.5 (1995): pp. 172-182. (Year: 1995).
Travostino, et al., "Seamless live migration of virtual machines over the MAN/WAN", 2006, pp. 901-907.
Vaghani, "Virtual Machine File System", 2010, pp. 57-70.
VMware, Inc., "Understanding VMware Consolidated Backup," White Paper, <http://www.vmware.com>, accessed Apr. 30, 2014, 11 pages.
VMware, Inc., "Virtual Disk Format 1.1," VMware Technical Note, <http://www.vmware.com>, Revision 20071113, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks.sub.--types.sub.--gsx.ht- ml>, internet accessed on Mar. 25, 2008, 2 pages.
VMware, Inc., "VMware Workstation 5.0, Snapshots in a Process Tree," <http://www.vmware.com/support/ws5/doc/ws.sub.--preserve.sub.--sshot.s- ub.--tree.html>, internet accessed on Mar. 25, 2008, 1 page.
VMware, Inc., "VMware Workstation 5.5, What Files Make Up a Virtual Machine?" <http://www.vmware.com/support/ws55/doc/ws.sub.--learning.su- b.--files.sub.--in.sub.--a.sub.--vm.html>, internet accessed on Mar. 25, 2008, 2 pages.
Weil, Sage A., et al. "CRUSH: Controlled, scalable, decentralized placement of replicated data." SC'06: Proceedings of the 2006 ACM/IEEE Conference on Supercomputing. IEEE, 2006.pp. 1-12 (Year: 2006).
Wikipedia, "Cloud computing," <http://en.wikipedia.org/wiki/Cloud—computing>, 2009, 11 pages.
Wikipedia, "Logical Volume Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http://en.wikipedia.org/wikiNirtualization>, internet accessed Mar. 18, 2008, 7 pages.
Yang, et al., "Toward Reliable Data Delivery for Highly Dynamic Mobile Ad Hoc Networks," 2012, pp. 111-124.
Yoshida et al., "Orthros: A High-Reliability Operating System with Transmigration of Processes," 2013, pp. 318-327.
Zhao, et al., "Adaptive Distributed Load Balancing Algorithm based on Live Migration of Virtual Machines in Cloud", 2009, pp. 170-175.
Armstead et al., "Implementation of a Campus-wide Distributed Mass Storage Service: The Dream vs. Reality," IEEE, Sep. 11-14, 1995, pp. 190-199.
Bhagwat et al., "Extreme Binning: Scalable, Parallel Deduplication for Chunk-based File Backup", IEEE International Symposium on Modeling, Analysis & Simulation of Computer and Telecommunication Systems, Sep. 2009, pp. 1-9.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95,

(56)         References Cited

OTHER PUBLICATIONS

Proceedings of the 40th IEEE Computer Society International Conference, Mar. 5, 1995-Mar. 9, 1995, pp. 420-427, San Francisco, CA.

Chen et al., "When Virtual Is Better Than Real", IEEE 2001, pp. 133-138.

Chiappetta, Marco, "ESA Enthusiast System Architecture," <http://hothardware.com/Articles/NVIDIA_ESA_Enthusiast_System_Architecture/>, Nov. 5, 2007, 2 pages.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, accessed Apr. 30, 2014, 1 page.

Cully, et al., "Remus: High Availability via Asynchronous Virtual Machine Replication", 2008, pp. 161-174.

Deng, et al., "Fast Saving and Restoring Virtual Machines with Page Compression", 2011, pp. 150-157.

Diallo, Ousmane, et al. "Distributed database management techniques for wireless sensor networks." IEEE Transactions on Parallel and Distributed Systems 26.2 (2013): pp. 604-620. (Year: 2013).

Elamir et al., "Framework and Architecture for Programming Education Environment as a Cloud Computing Service", Procedia Technology, vol. 11, 2013, pp. 1299-1308.

Fu et al., "Fine Grained Transaction Log for Data Recovery in Database Systems", Third Asia-Pacific Trusted Infrastructure Technologies Conference, IEEE, 2008, pp. 123-131.

Galan et al. "Service Specification in Cloud Environments Based on Extension to Oper Standards" COMSWARE Jun. 16-19, 09 Dublin, Ireland ACM, 12 Pages.

Gibson, et al., "Implementing Preinstallation Environment Media for Use in User Support," 2007, pp. 129-130.

Gupta, et al., "GPFS-SNC: An enterprise storage framework for virtual-machine clouds", 2011, pp. 1-10.

Hirofuchi, et al., "Enabling Instantaneous Relocation of Virtual Machines with a Lightweight VMM Extension", 2010, pp. 73-83.

Huff, KL, "Data Set Usage Sequence Number," IBM Technical Disclosure Bulletin, vol. 24, No. 5, Oct. 1981 New York, US, pp. 2404-2406.

IBM Technical Disclosure Bulletin, vol. 24, No. 5, Oct. 1981 New York, US, pp. 2404-2406, K.L. Huff, "Data Set Usage Sequence Number".

Ibrahim, Shadi et al., "Cloudlet: Towards MapReduce Implementation on Virtual Machines," 2009, pp. 65-66.

International Preliminary Report on Patentability and Written Opinion for PCT/US2011/054374, dated Apr. 11, 2013, 6 pages.

Jo, et al., "Efficient Live Migration of Virtual Machines Using Shared Storage", 2013, pp. 1-10.

Kashyap "RLC—A Reliable approach to Fast and Efficient Live Migration of Virtual Machines in the Clouds" IEEE 2014 IEEE Computer Society, pp. 360-367.

Levy et al., "Log-Driven Backups: A Recovery Scheme for Large Memory Database Systems", IEEE 1990, pp. 99-109.

Migrate a Virtual Machine with Storage vMotion in the vSphere Client. http://pubs.vmware.com/vsphere-51/advanced/print/jsp?topic=/com.vmware.vsphere.vcent . . . Retrieved Aug. 12, 2014; 2 pages.

Nance et al., "Virtual Machine Introspection: Observation or Interference?", 2008 IEEE, pp. 32-37.

Ng, Chun-Ho et al., "Live Deduplication Storage of Virtual Machine Images in an Open-Source Cloud," 2011, pp. 80-99.

Nicolae, Bogdan et al., "A Hybrid Local Storage Transfer Scheme for Live Migration of 1/0 Intensive Workloads," 2012, pp. 85-96.

Reingold, B. et al., "Cloud Computing: Industry and Government Developments (Part II)," LegalWorks, Sep. 2009, 5 pages.

Reingold, B. et al., "Cloud Computing: Whose Law Governs the Cloud? (Part III)," LegalWorks, Jan.-Feb. 2010, 6 pages.

Rosenblum et al., "The Design and Implementation of a Log-Structure File System," Operating Systems Review SIGOPS, vol. 25, No. 5, May 1991, New York, US, pp. 1-14.

Sanbarrow.com, "Disktype-table," <http://sanbarrow.com/vmdk/disktypes.html>, internet accessed on Jul. 22, 2008, 4 pages.

Sanbarrow.com, "Monolithic Versus Split Disks," <http://sanbarrow.com/vmdk/monolithicversusspllit.html>, internet accessed on Jul. 14, 2008, 2 pages.

Tudoran, Radu et al., "Adaptive File Management for Scientific Workflows on the Azure Cloud," 2013, pp. 273-281.

VMware Storage VMotion—Non-Disruptive Live Migration for Virtual Machine Storage Disk Files. Copyright 2009 VMware, Inc.; 2 pages.

VMware, Inc., "OVF, Open Virtual Machine Format Specification, version 0.9," White Paper, <http://www.vmware.com>, 2007, 50 pages.

VMware, Inc., "Using VMware Infrastructure for Backup and Restore," Best Practices, <http://www.vmware.com>, accessed Apr. 30, 2014, 2006, 20 pages.

VMware, Inc., "Virtual Disk API Programming Guide," <http://www.vmware.com>, Revision 20080411, 2008, 44 pages.

VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.

VMware, Inc., "VMware Consolidated Backup, Improvements in Version 3.5," Information Guide, <http://www.vmware.com>, 2007, 11 pages.

VMware, Inc., "VMware Consolidated Backup," Product Datasheet, <http://www.vmware.com>, 2007, 2 pages.

VMware, Inc., "VMware OVF Tool," Technical Note, <http://www.vmware.com>, 2007, 4 pages.

VMware, Inc., "VMware Workstation 5.0, Snapshots in a Linear Process," <http:/www.vmware.com/support/ws5/doc/ws.sub.--preserve.sub.--sshot.su- b.--linear.html>, internet accessed on Mar. 25, 2008, 1 page.

VSphere Storage vMotion: Storage Management & Virtual Machine Migration. http://www.vmware.com/products /vsphere/features/storage-vmotion. Retrieved Aug. 12, 2014; 6 pages.

Wikipedia, "Cluster (file system)," <http://en.wikipedia.org/wiki/Cluster.sub.--%,28file.sub.--system%29>- ; , internet accessed Jul. 25, 2008, 1 page.

Wikipedia, "Cylinder-head-sector," <http://en.wikipedia.org/wiki/Cylinder-head-sector>, Jan. 4, 2009, 6 pages.

Wikipedia, "Logical Disk Manager," <http://en.wikipedia.org/wiki/Logical_Disk_Manager>, internet accessed Mar. 26, 2008, 3 pages.

Wood, et al., "Disaster Recovery as a Cloud Service: Economic Benefits & Deployment Challenges", 2010, pp. 1-7.

Yang, et al., "TRAP-Array: A Disk Array Architecture Providing Timely Recovery to Any Point-in-time," 2006, pp. 1-12.

Zhao, et al., "Supporting Application-Tailored Grid File System Sessions with WSRF-Based Services", Advanced Computing and Information Systems Laboratory (ACIS), 2005, pp. 24-33.

* cited by examiner

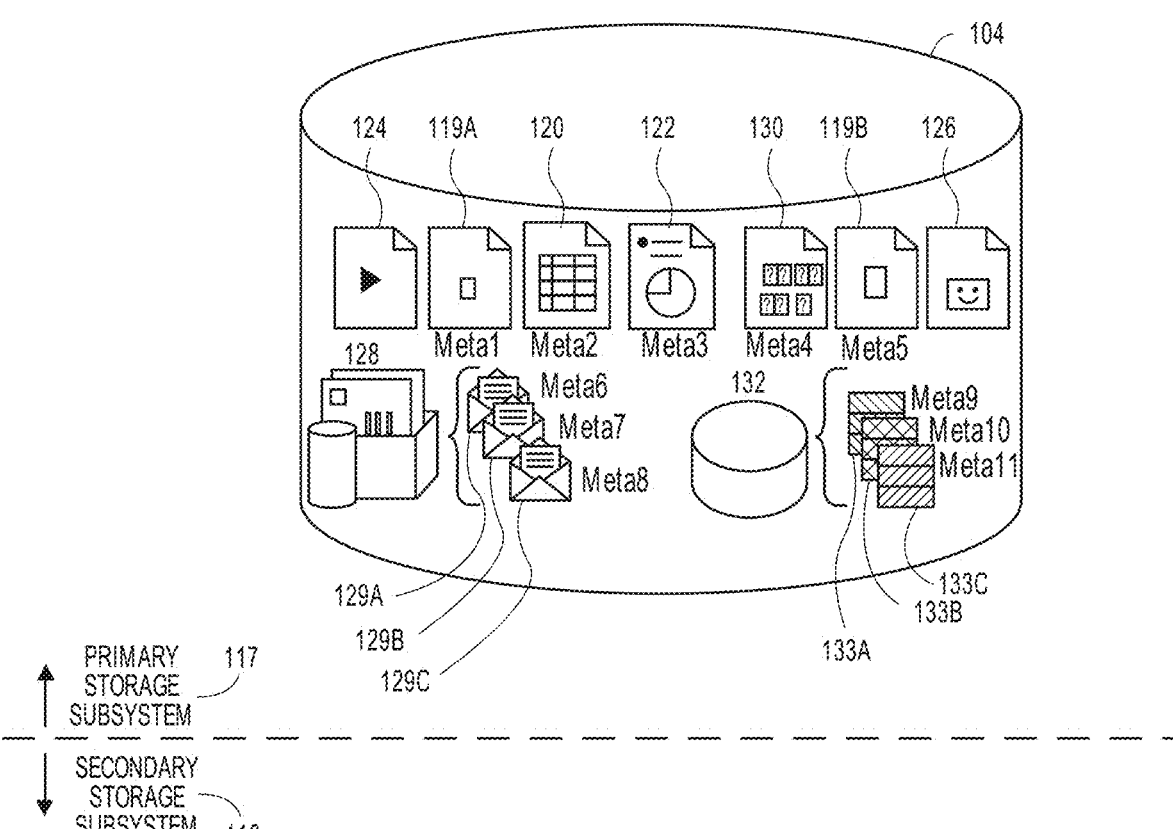
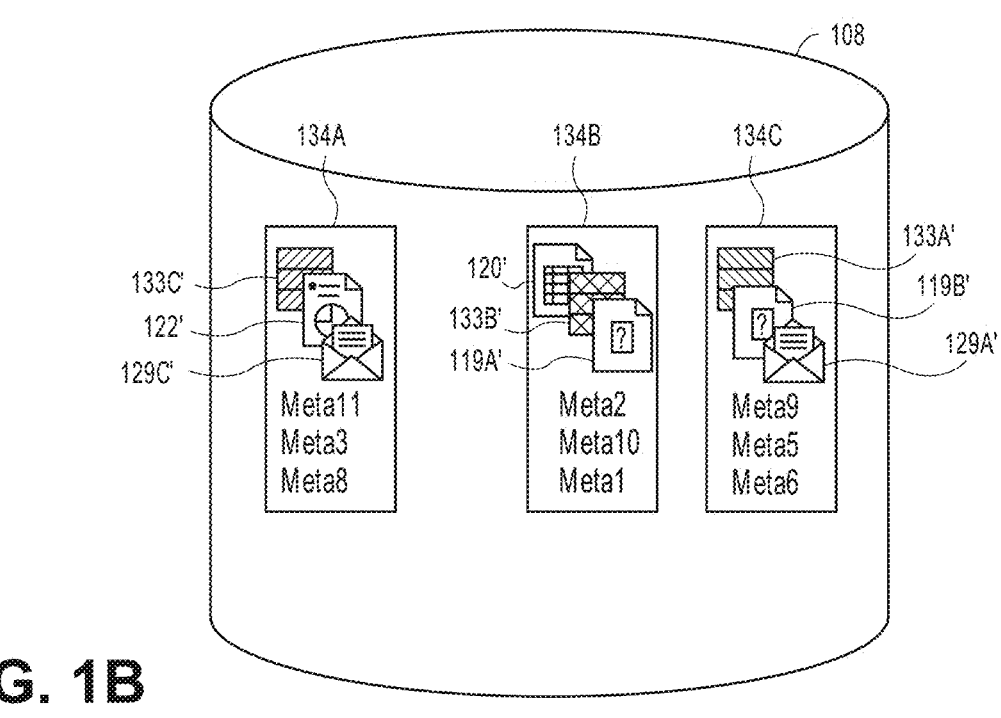
FIG. 1B

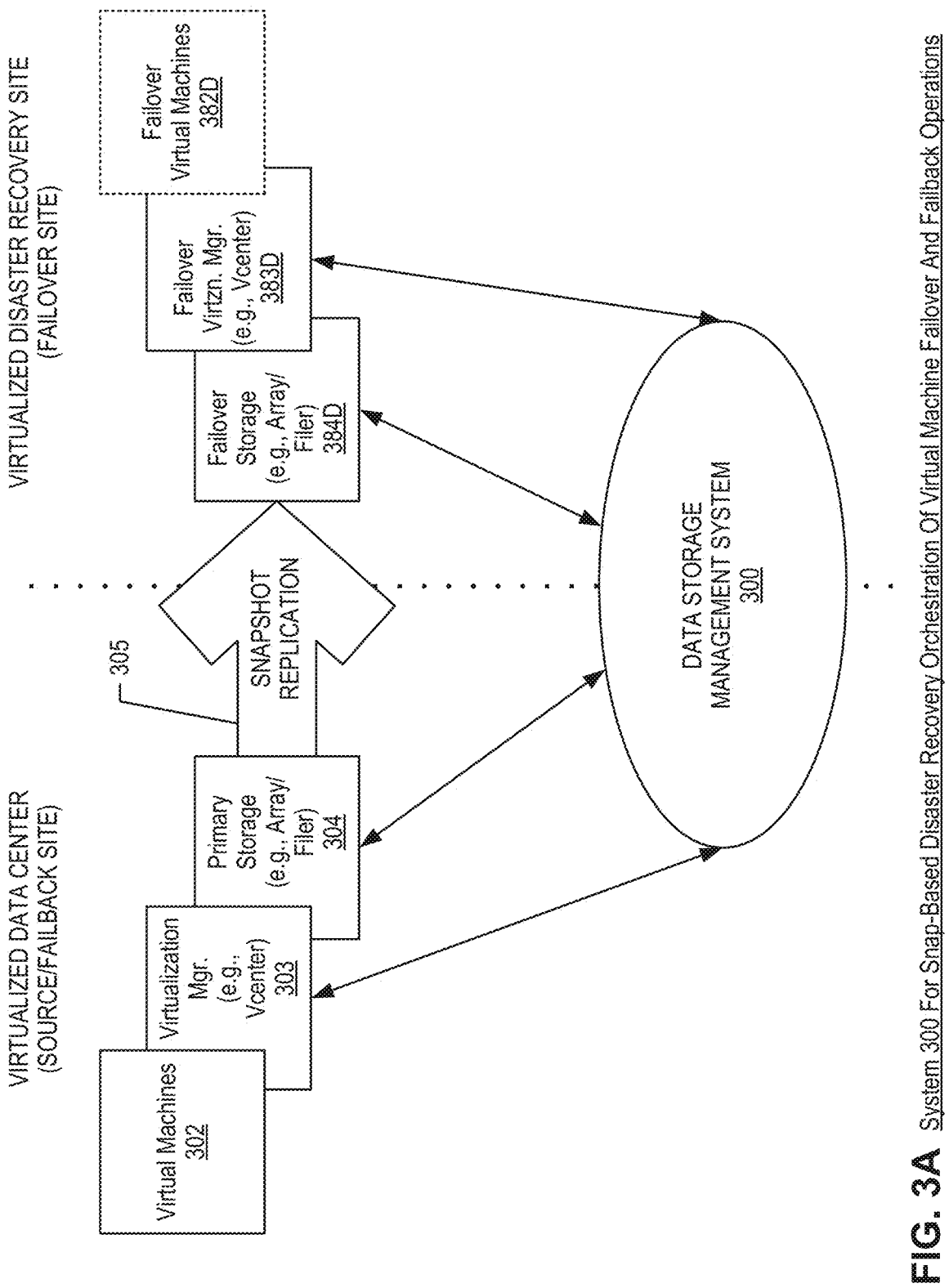
FIG. 3A   System 300 For Snap-Based Disaster Recovery Orchestration Of Virtual Machine Failover And Failback Operations

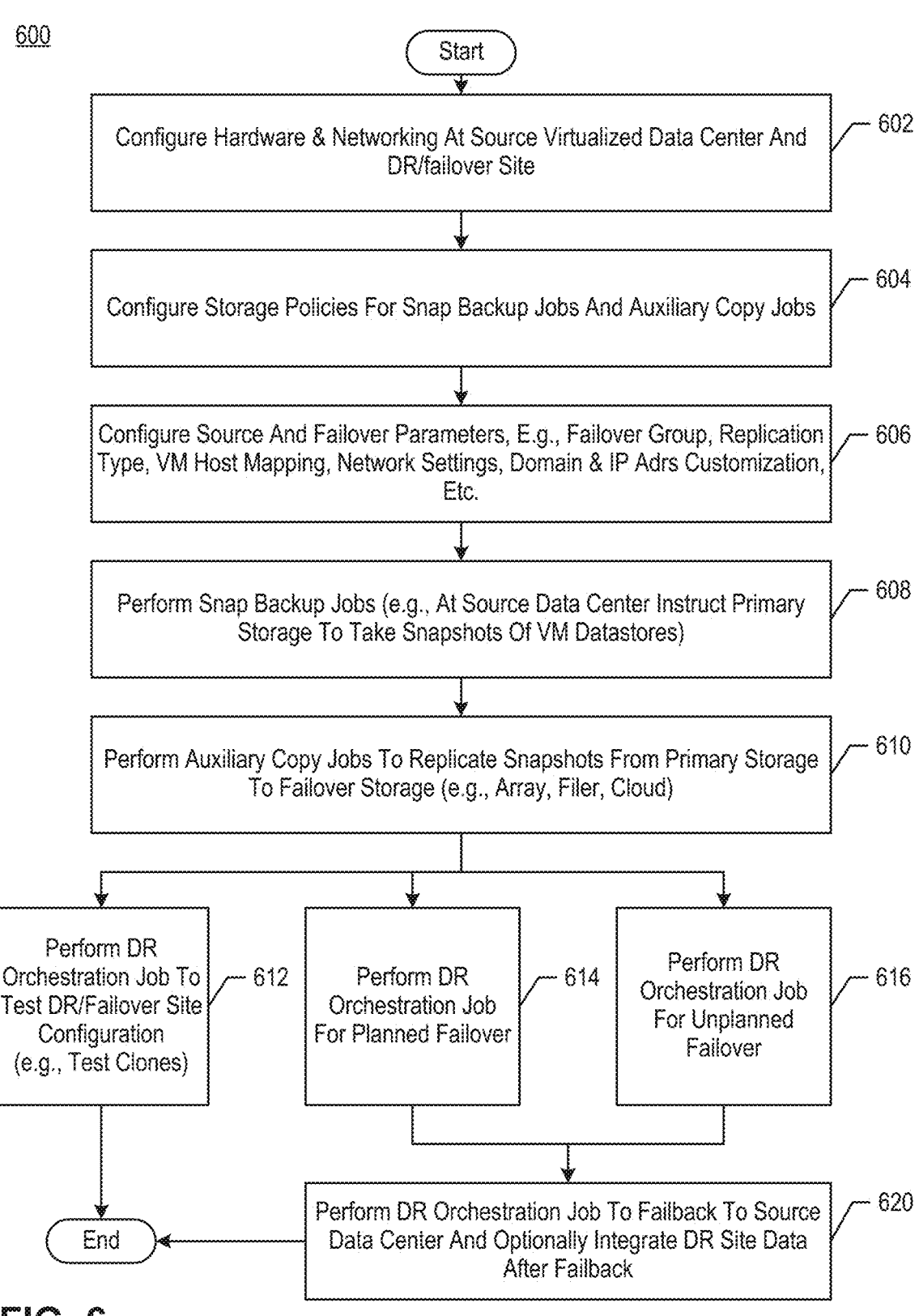

600

Start

Configure Hardware & Networking At Source Virtualized Data Center And DR/failover Site — 602

Configure Storage Policies For Snap Backup Jobs And Auxiliary Copy Jobs — 604

Configure Source And Failover Parameters, E.g., Failover Group, Replication Type, VM Host Mapping, Network Settings, Domain & IP Adrs Customization, Etc. — 606

Perform Snap Backup Jobs (e.g., At Source Data Center Instruct Primary Storage To Take Snapshots Of VM Datastores) — 608

Perform Auxiliary Copy Jobs To Replicate Snapshots From Primary Storage To Failover Storage (e.g., Array, Filer, Cloud) — 610

Perform DR Orchestration Job To Test DR/Failover Site Configuration (e.g., Test Clones) — 612

Perform DR Orchestration Job For Planned Failover — 614

Perform DR Orchestration Job For Unplanned Failover — 616

Perform DR Orchestration Job To Failback To Source Data Center And Optionally Integrate DR Site Data After Failback — 620

End

FIG. 6

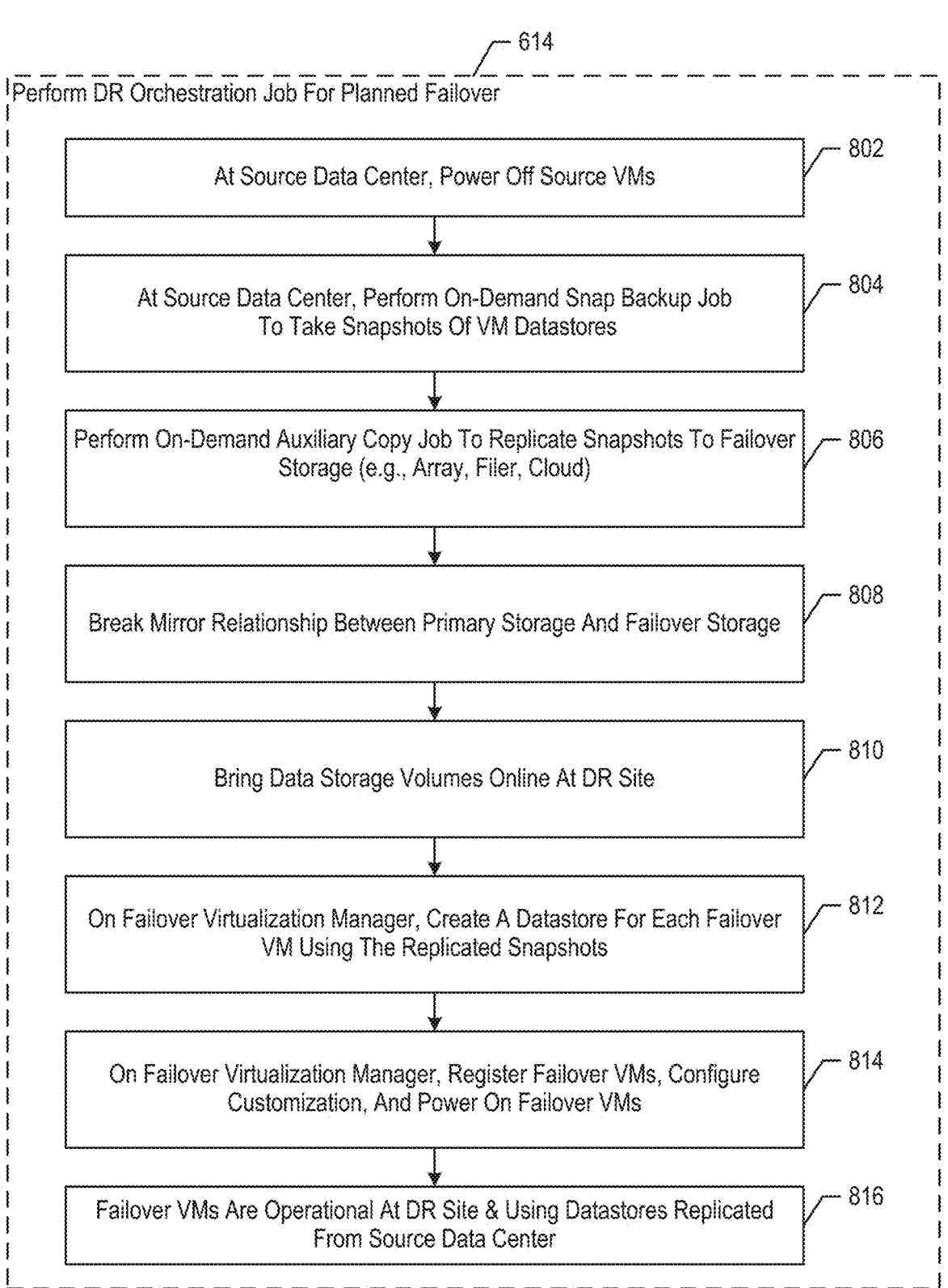

614

Perform DR Orchestration Job For Planned Failover

At Source Data Center, Power Off Source VMs — 802

At Source Data Center, Perform On-Demand Snap Backup Job To Take Snapshots Of VM Datastores — 804

Perform On-Demand Auxiliary Copy Job To Replicate Snapshots To Failover Storage (e.g., Array, Filer, Cloud) — 806

Break Mirror Relationship Between Primary Storage And Failover Storage — 808

Bring Data Storage Volumes Online At DR Site — 810

On Failover Virtualization Manager, Create A Datastore For Each Failover VM Using The Replicated Snapshots — 812

On Failover Virtualization Manager, Register Failover VMs, Configure Customization, And Power On Failover VMs — 814

Failover VMs Are Operational At DR Site & Using Datastores Replicated From Source Data Center — 816

FIG. 8

Add failover group  o    ✕

Name    ⤺ 1102

Type    ◯ Live sync ◉ Array based replication

Source hypervisor    ▾

Data stores    ▾

Destination hypervisor

VMs    Add

| Source VM | Destination VM | Priority | Actions |
|-----------|----------------|----------|---------|
| Source VM 1 | Destination VM 1 | 1 | ⊖ |

Network settings    ⌃

Add

| Source | Destination | Actions |
|--------|-------------|---------|
| Any Network | VM Network | ⊖ |

Advanced options    ⌃

Delay between different
priority machines (in mins)    8

Approval required for failover
and fallback    ⬤

User for approval    ▾

Cancel    Save

SNAPSHOT-BASED DISASTER RECOVERY ORCHESTRATION OF VIRTUAL MACHINE FAILOVER AND FAILBACK

INCORPORATION BY REFERENCE TO ANY PRIORITY APPLICATIONS

This application is a Continuation of U.S. patent application Ser. No. 18/135,639 filed on Apr. 17, 2023, which is a Continuation of U.S. patent application Ser. No. 17/377,877 filed on Jul. 16, 2021 (now U.S. Pat. No. 11,663,099), which a Continuation of U.S. patent application Ser. No. 16/831,562 (now U.S. Pat. No. 11,099,956) filed on Mar. 26, 2020. Any and all applications for which a foreign or domestic priority claim is identified in the Application Data Sheet of the present application are hereby incorporated by reference in their entireties under 37 CFR 1.57.

COPYRIGHT NOTICE

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a maintenance program. Given the rapidly expanding volume of data under management, companies also continue to seek innovative and robust techniques for ensuring disaster recovery will operate smoothly and reliably.

SUMMARY

The present inventors devised a scheme for disaster recovery (DR) orchestration of virtual machine (VM) failover and failback operations. An illustrative data storage management system deploys proprietary components at source data center(s) and at DR site(s). The proprietary components (e.g., storage manager, data agents, media agents, backup nodes, etc.) interoperate with each other and with the source and DR components to ensure that VMs will successfully failover and/or failback using so-called "DR orchestration jobs." DR orchestration jobs are suitable for testing VM failover scenarios ("clone testing"), for conducting planned VM failovers, and for unplanned VM failovers. DR orchestration jobs also handle failback and integration of DR-generated data into the failback site. As a shorthand, the illustrative approach is referred to herein as "snap-based DR orchestration."

The illustrative system exploits snapshot replication techniques. The system implements "snap backup jobs" that capture VM datastores at a source data center, in which so-called "hardware snapshots" are taken by the datastore's host storage device (e.g., a storage array, filer, and/or cloud storage resources). The system implements "auxiliary copy jobs" to replicate the snapshots to the DR site. Collectively, these jobs ensure that hardware snapshots regularly capture VM datastores at the source and that the DR site regularly receives snapshotted datastore data.

One of the advantages of the disclosed DR orchestration job is that it does not require that VMs or their corresponding datastores be actively operating at the DR site before the DR orchestration job is initiated, i.e., before failover. This approach is distinguishable from an alternative proprietary approach known as "Live Sync," which relies on ongoing repetitive cycles of incremental backups at the source followed by restores at the DR site to maintain the DR site in a "warm" readiness state that can take over with minimal start-up effort. (See, e.g., U.S. Pat. No. 10,228,962, which is incorporated by reference herein; see also FIG. 2A herein). Live Sync requires VMs and their datastores to be actively operating (powered up) at the DR site in order to sustain the ongoing restore operations. With Live Sync, the DR site is operational after the first restore in a "warm" standby state. However, Live Sync can be relatively costly to operate and maintain as compared to the illustrative snap-based DR orchestration approach disclosed herein, because the Live Sync DR site must maintain actively operating VMs and datastores as well as data restoration infrastructure. In cloud computing environments, maintaining powered up VMs and data storage resources indefinitely can be very costly. Thus the "warm" readiness of Live Sync is counter-balanced by relatively high costs of operation and maintenance of DR components and infrastructure.

In contrast to Live Sync, the illustrative snap-based DR orchestration takes a different approach that exploits snapshot techniques and other kinds of backup operations (e.g., auxiliary copy jobs) to feed data from source to DR site, and does not rely on Live Sync's ongoing cycles of backup and restore to maintain the DR site. In contrast to Live Sync, the illustrative snap-based DR orchestration requires only minimal active resources at the DR site until such time as the DR orchestration job initiates a failover to the DR site. Accordingly, VMs are kept powered off at the DR site until failover. Even though data storage is configured at the DR site to receive snapshots replicated from the source, no active connections are maintained to VM hosts and/or VM server management resources and thus no datastores are established until failover. In cloud-based data centers, backup nodes that provide backup/restore infrastructure for completing the DR orchestration job execute on DR site VMs that are powered up on demand at failover in certain embodiments.

Thus, the illustrative snap-based DR orchestration approach requires minimal active resources at the DR site until failover. The cost and effort of maintaining active components at a "warm" DR site are also avoided by snap-based DR orchestration. Instead, the illustrative snap-based DR orchestration approach relies on DR orchestration jobs to activate connections, establish datastores, and power up VMs as needed at the DR site, and to tear down appropriately after failback completes.

To implement DR orchestration jobs, the illustrative data storage management system is specially configured to track certain administrative information at source and DR sites, coordinate operations between the sites, and manage a number of operations at the DR site to ensure a successful failover, and conversely to ensure successful failbacks to the source. According to the illustrative snap-based DR orchestration approach, source or DR site or both can be a virtualized on-premises data center or a cloud computing environment, without limitation. Thus, although many of the depicted scenarios illustrate a virtualized data center as a source production environment and a cloud computing environment as a failover/DR site, the embodiments are not so limited.

BRIEF DESCRIPTION OF THE DRAWINGS

FIG. 1B is a detailed view of a primary storage device, a secondary storage device, and some examples of primary data and secondary copy data.

FIG. 3A is a block diagram illustrating system 300 for snap-based disaster recovery orchestration of virtual machine failover and failback operations, according to an illustrative embodiment.

FIG. 6 is a flow chart that depicts some salient operations of a method 600 according to an illustrative embodiment.

FIG. 8 depicts some salient operations of block 614 in method 600

FIG. 11 depicts an illustrative screenshot of an administrative screen in system 300 for adding a failover group.

FIG. 13 depicts an illustrative screenshot of an administration screen for defining how snapshot copies are to be replicated, showing a mirror copy option and an alternative vault copy option.

DETAILED DESCRIPTION

Detailed descriptions and examples of systems and methods according to one or more illustrative embodiments of the present invention may be found in the section entitled SNAPSHOT-BASED DISASTER RECOVERY ORCHESTRATION OF VIRTUAL MACHINE FAILOVER AND FAILBACK OPERATIONS, as well as in the section entitled Example Embodiments, and also in FIGS. 3A-13 herein. Furthermore, components and functionality for snap-based DR orchestration may be configured and/or incorporated into information management systems such as those described herein in FIGS. 1A-1H and 2A-2C.

Various embodiments described herein are intimately tied to, enabled by, and would not exist except for, computer technology. For example, taking snapshots, replicating snapshots, activating VMs, orchestrating failbacks, orchestrating and integrating failbacks, etc. described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
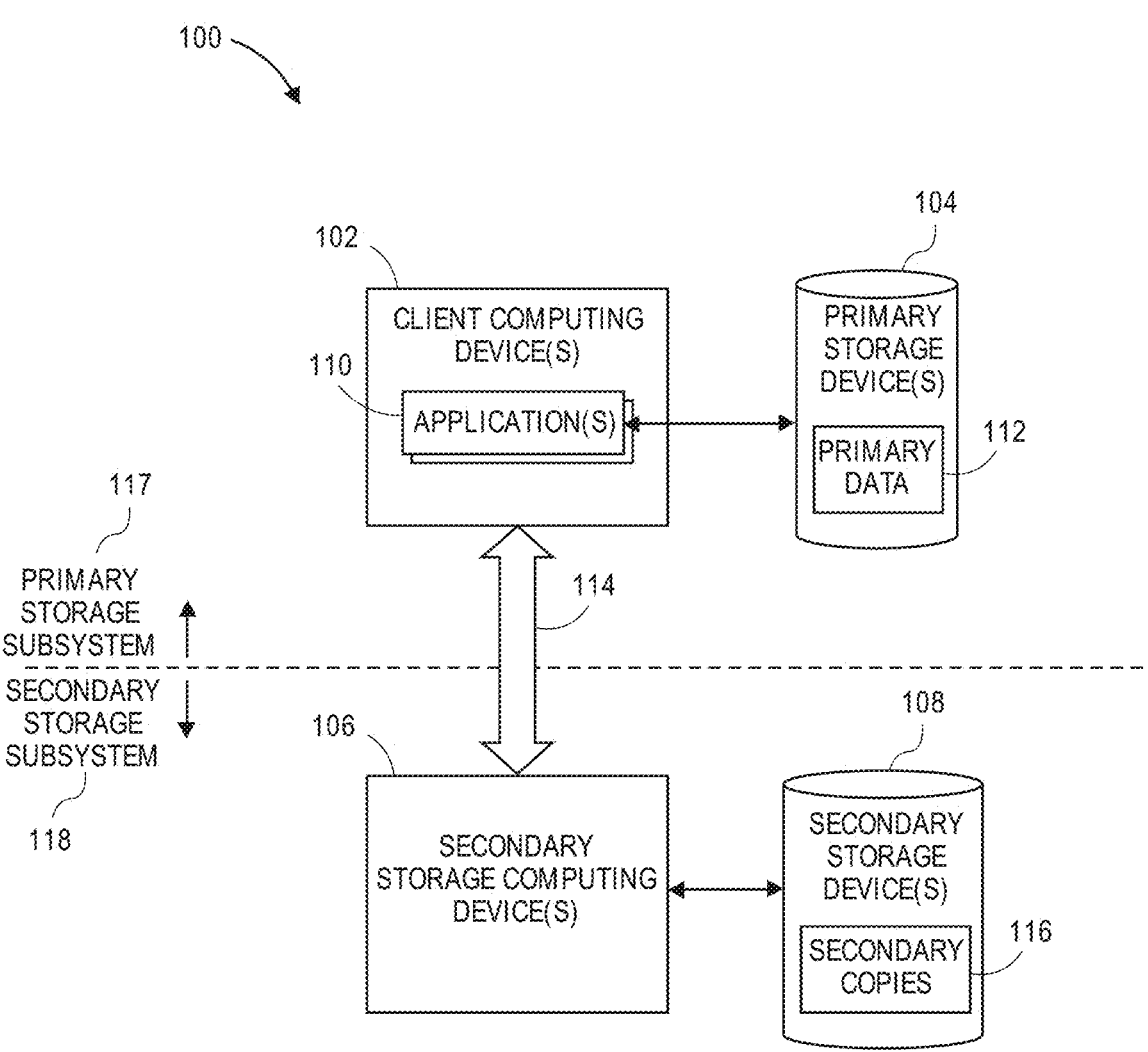
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. No. 9,633,033, entitled "High Availability Distributed Deduplicated Storage System";

U.S. Pat. Pub. No. 2006/0224846, entitled "System and Method to Support Single Instance Storage Operations";

U.S. Pat. Pub. No. 2016-0350391, entitled "Replication Using Deduplicated Secondary Copy Data";

U.S. Pat. Pub. No. 2017-0168903 A1, entitled "Live Synchronization and Management of Virtual Machines across Computing and Virtualization Platforms and Using Live Synchronization to Support Disaster Recovery";

U.S. Pat. Pub. No. 2017-0185488 A1, entitled "Application-Level Live Synchronization Across Computing Platforms Including Synchronizing Co-Resident Applications To Disparate Standby Destinations And Selectively Synchronizing Some Applications And Not Others";

U.S. Pat. Pub. No. 2017-0192866 A1, entitled "System For Redirecting Requests After A Secondary Storage Computing Device Failure";

U.S. Pat. Pub. No. 2017-0235647 A1, entitled "Data Protection Operations Based on Network Path Information"; and U.S. Pat. Pub. No. 2017-0242871 A1, entitled "Data Restoration Operations Based on Network Path Information".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, California; Microsoft Virtual Server and Microsoft Windows Server Hyper-V, both by Microsoft Corporation of Redmond, Washington; Sun xVM by Oracle America Inc. of Santa Clara, California; and Xen by Citrix Systems, Santa Clara, California. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
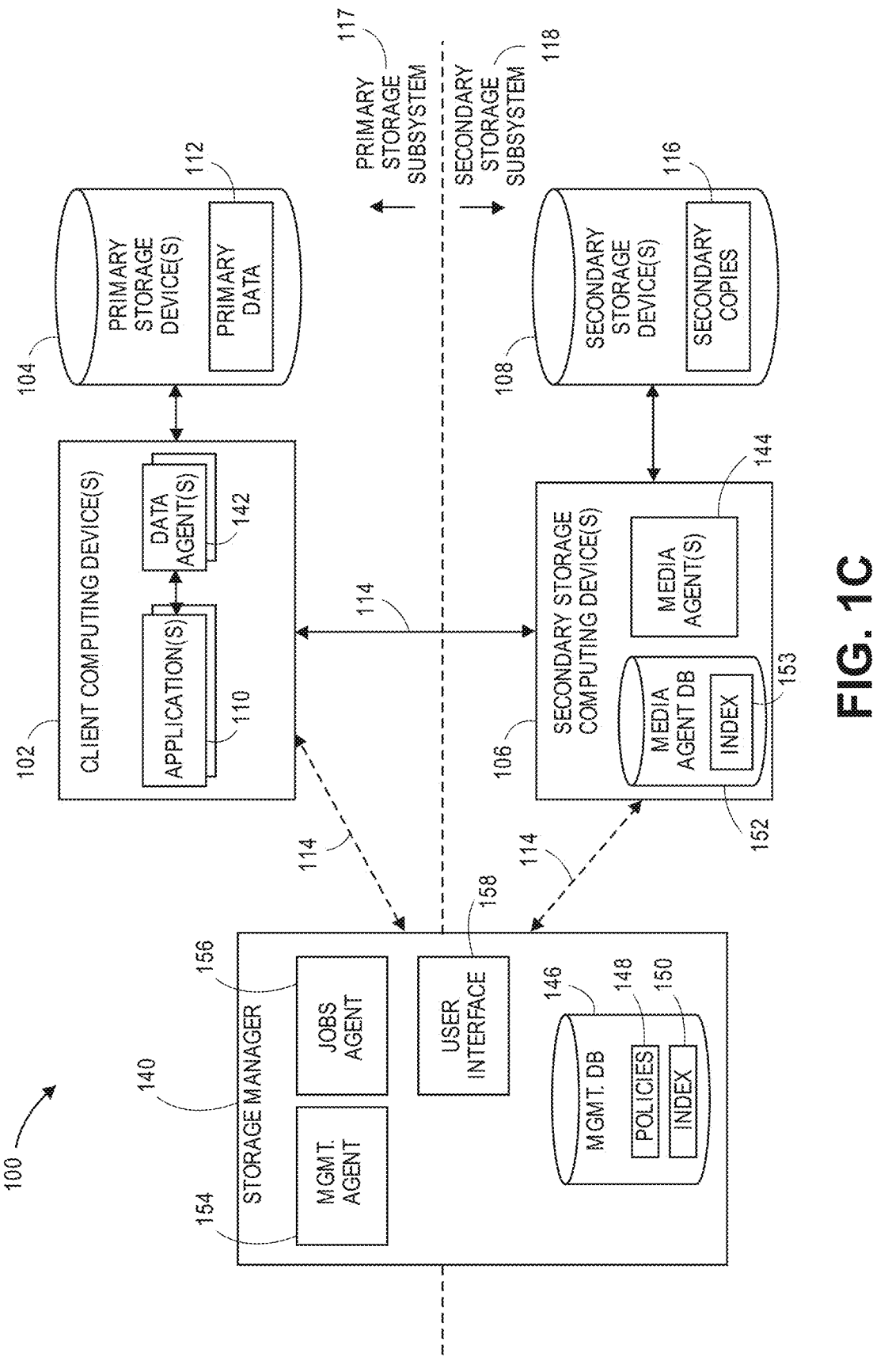
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.
Client Computing Devices, Clients, and Subclients Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only one application. A file manager application, e.g., Microsoft Windows Explorer, may be considered an application 110 and may be accompanied by its own data agent 142. Client computing devices 102 can have at least one operating system (e.g., Microsoft Windows, Mac OS X, IOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies-Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as inter-mediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componen-try and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage comput-ing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation docu-ments 122, video files 124, image files 126, email mailboxes

128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respec-tively). Moreover, as indicated by the prime mark ('), secondary storage computing devices 106 or other compo-nents in secondary storage subsystem 118 may process the data received from primary storage subsystem 117 and store a secondary copy including a transformed and/or supple-mented representation of a primary data object and/or meta-data that is different from the original format, e.g., in a compressed, encrypted, deduplicated, or other modified for-mat. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respec-tively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hard-ware and software components, which can in turn be orga-nized with respect to one another in many different configu-rations, depending on the embodiment. There are critical design choices involved in specifying the functional respon-sibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary stor-age devices 108.

Storage Manager

Storage manager 140 is a centralized storage and/or information manager that is configured to perform certain control functions and also to store certain critical informa-tion about system 100—hence storage manager 140 is said to manage system 100. As noted, the number of components in system 100 and the amount of data under management can be large. Managing the components and data is therefore a significant task, which can grow unpredictably as the num-ber of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;

initiating execution of information management operations;

initiating restore and recovery operations;

managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
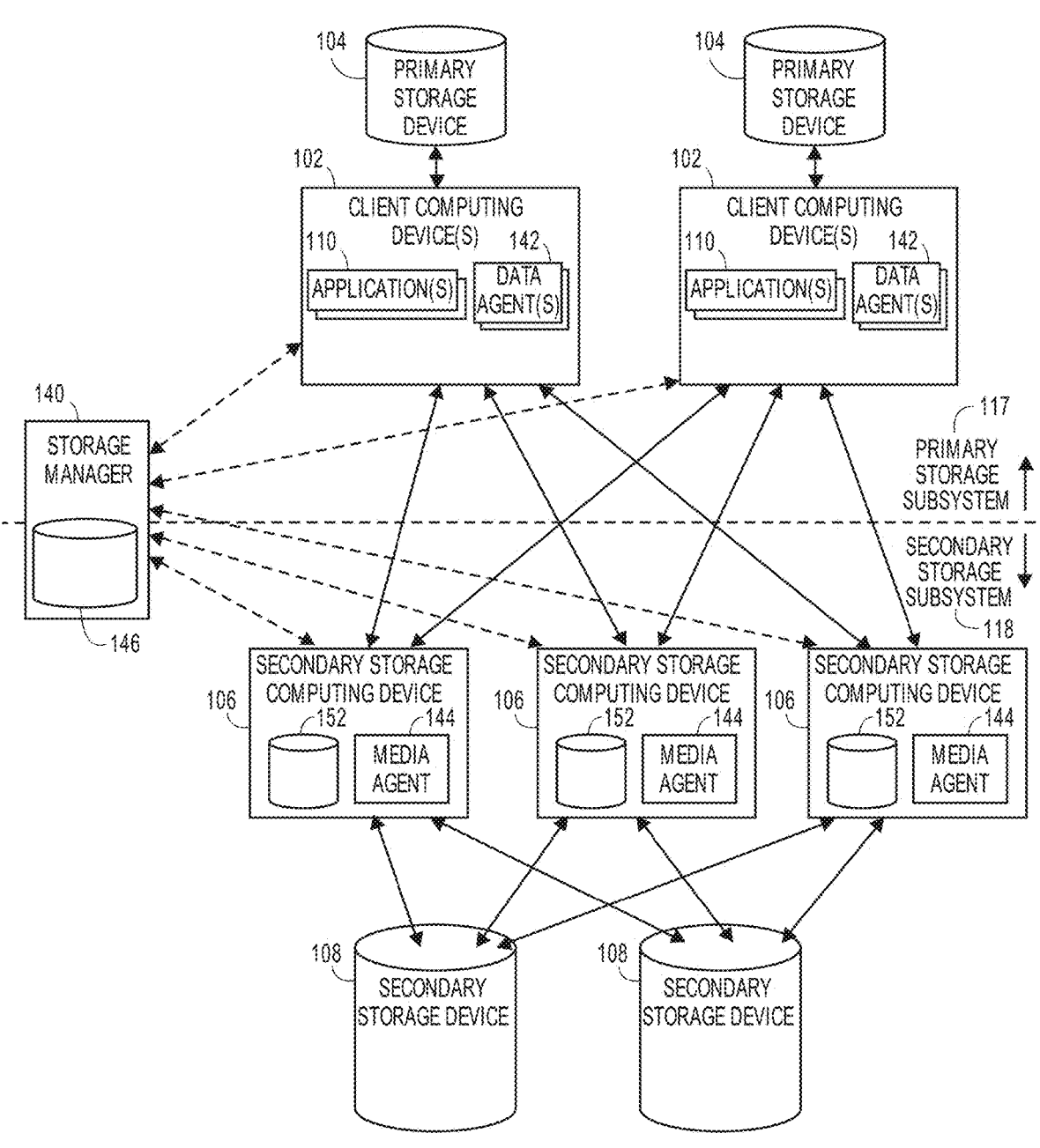
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management
Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy (ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and.

retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
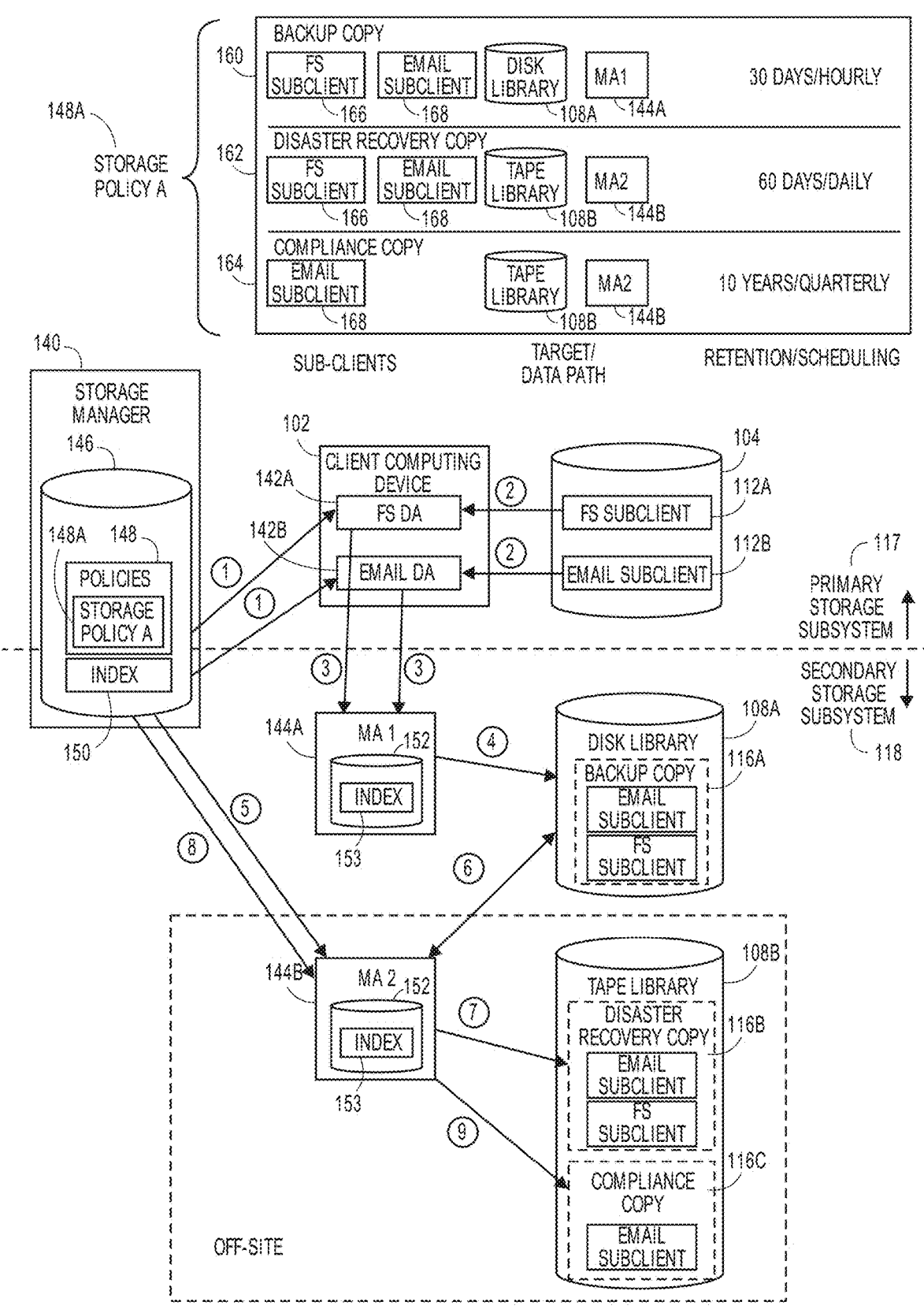
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies-Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.
Restore Operations from Secondary Copies While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578, 120.

Figures 1F, 1G:
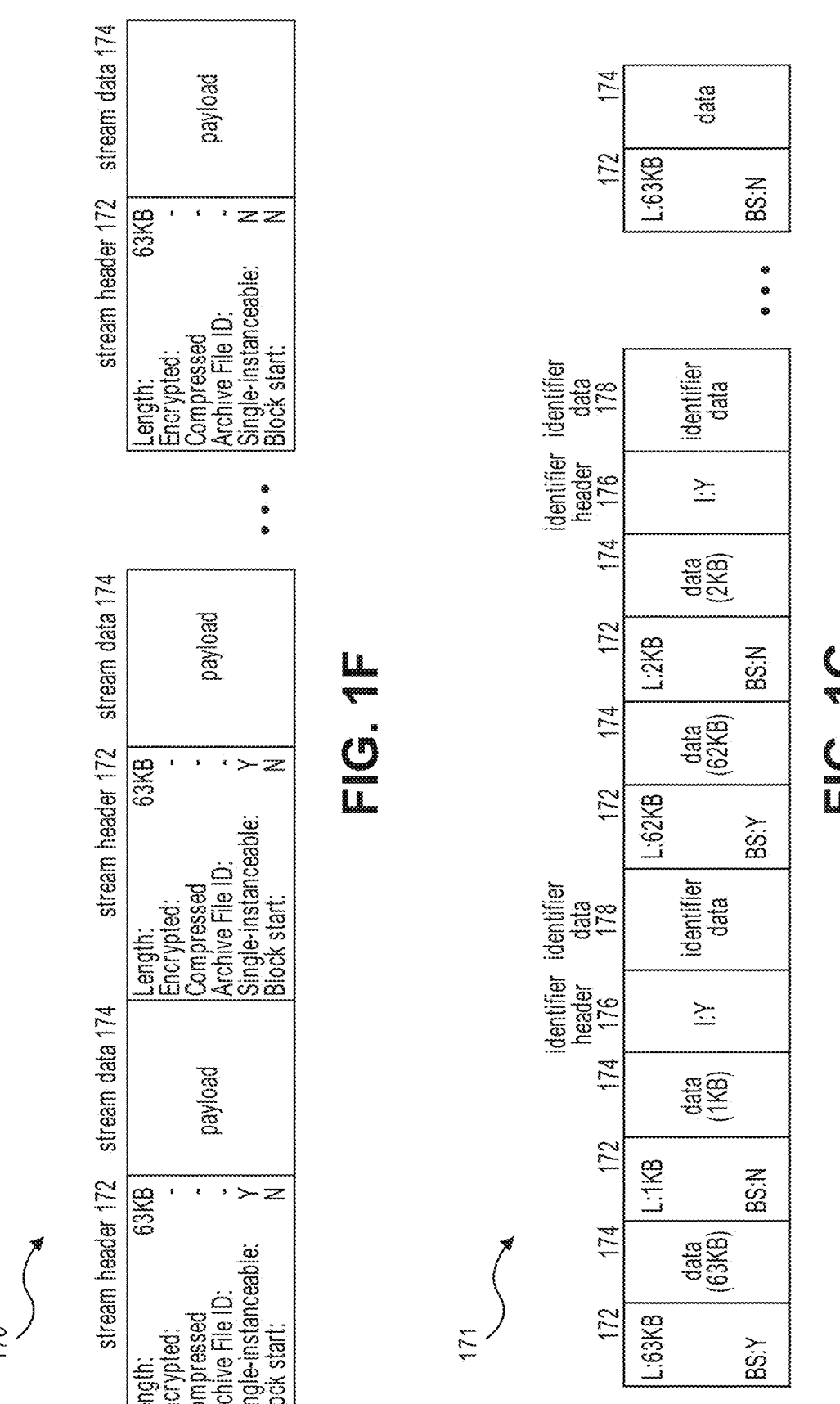
FIGS. 1F-1H are block diagrams illustrating suitable data structures that may be employed by the information management system.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
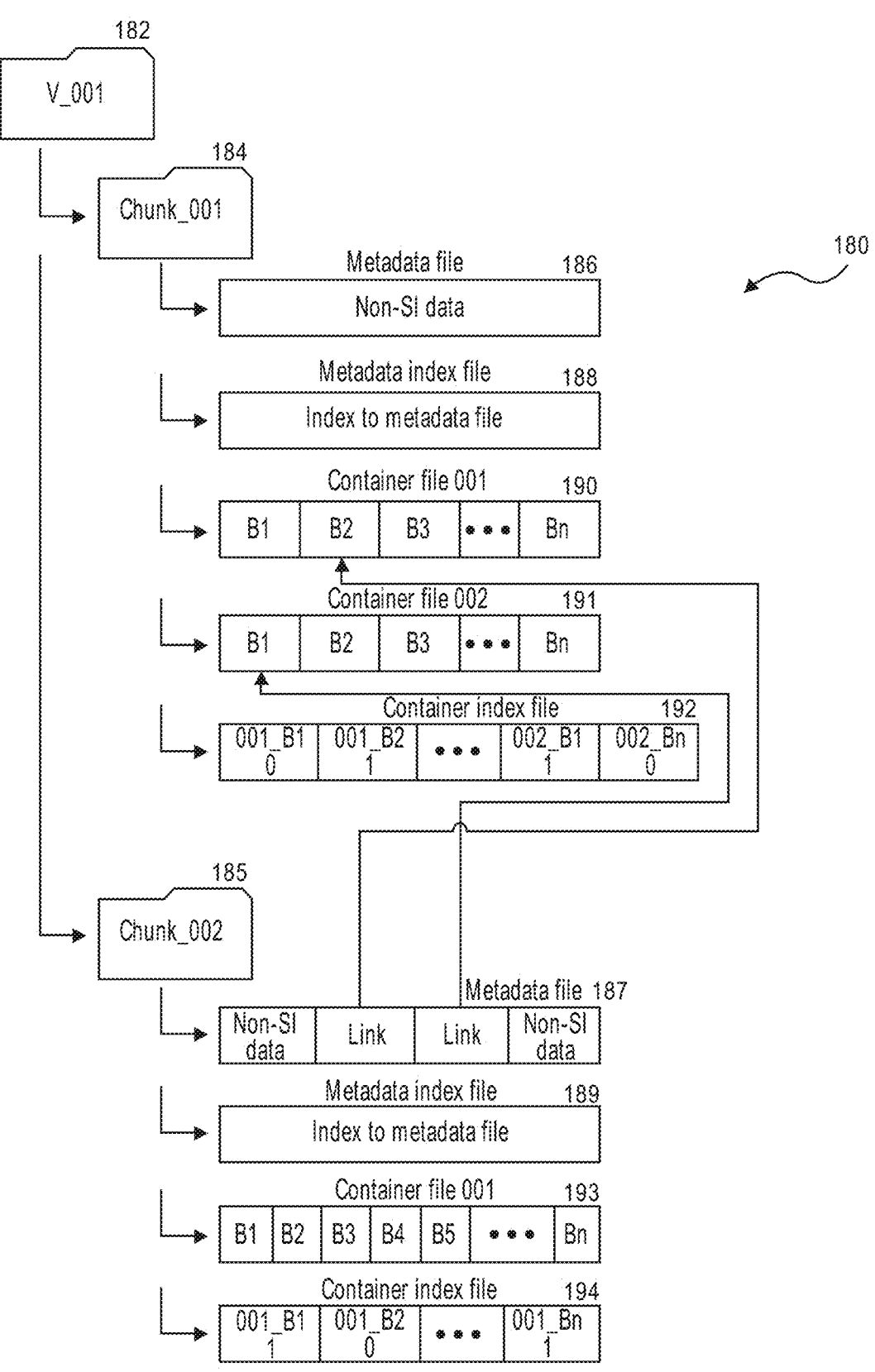

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
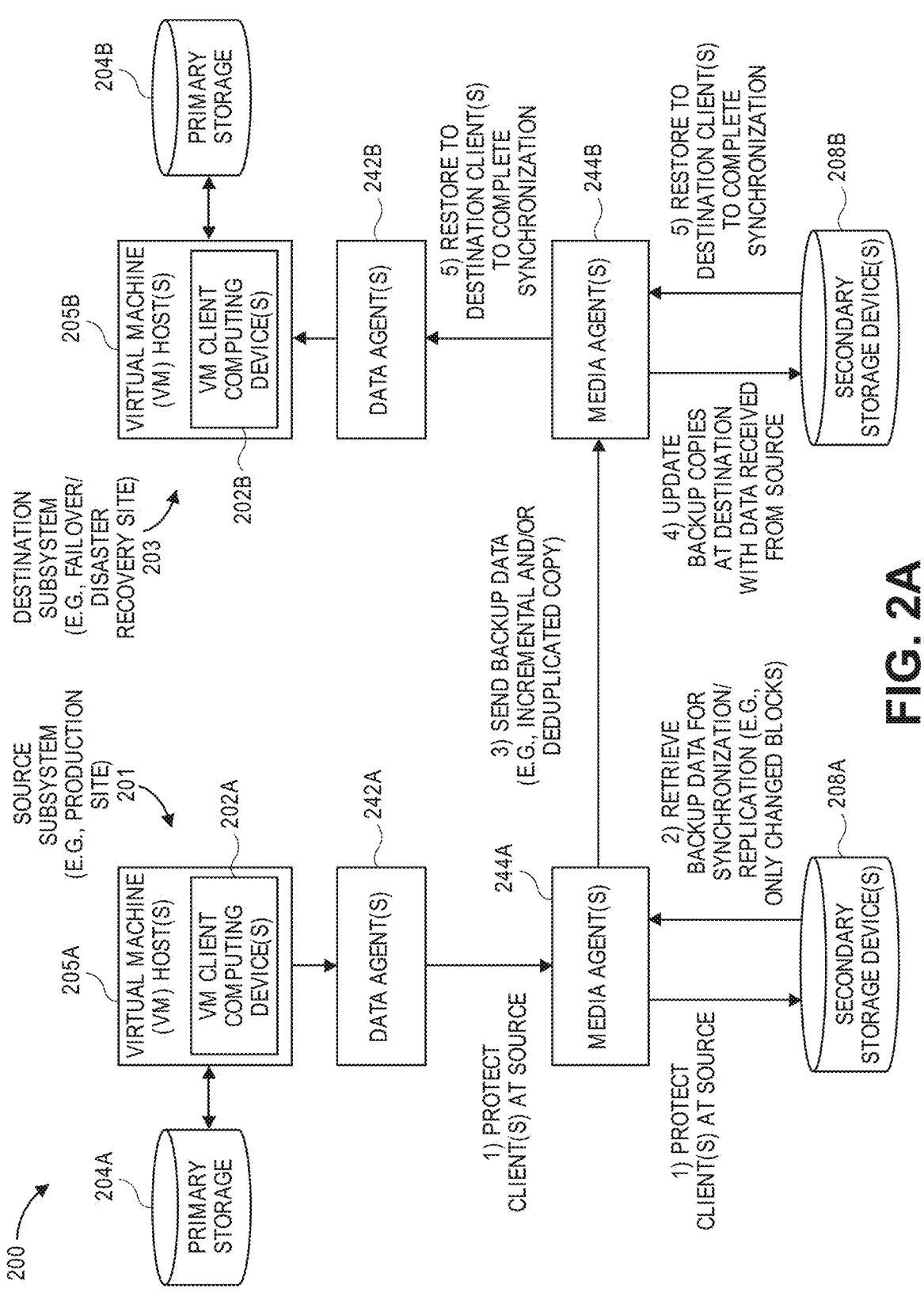
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-todate data, to a destination site 203, such as a cloud-based failover site. The destination site 203 can later be reverse synchronized back to the production site 201, such as after repairs have been implemented or after the failure has passed.

Integrating With the Cloud Using File System Protocols

Figure 2B:
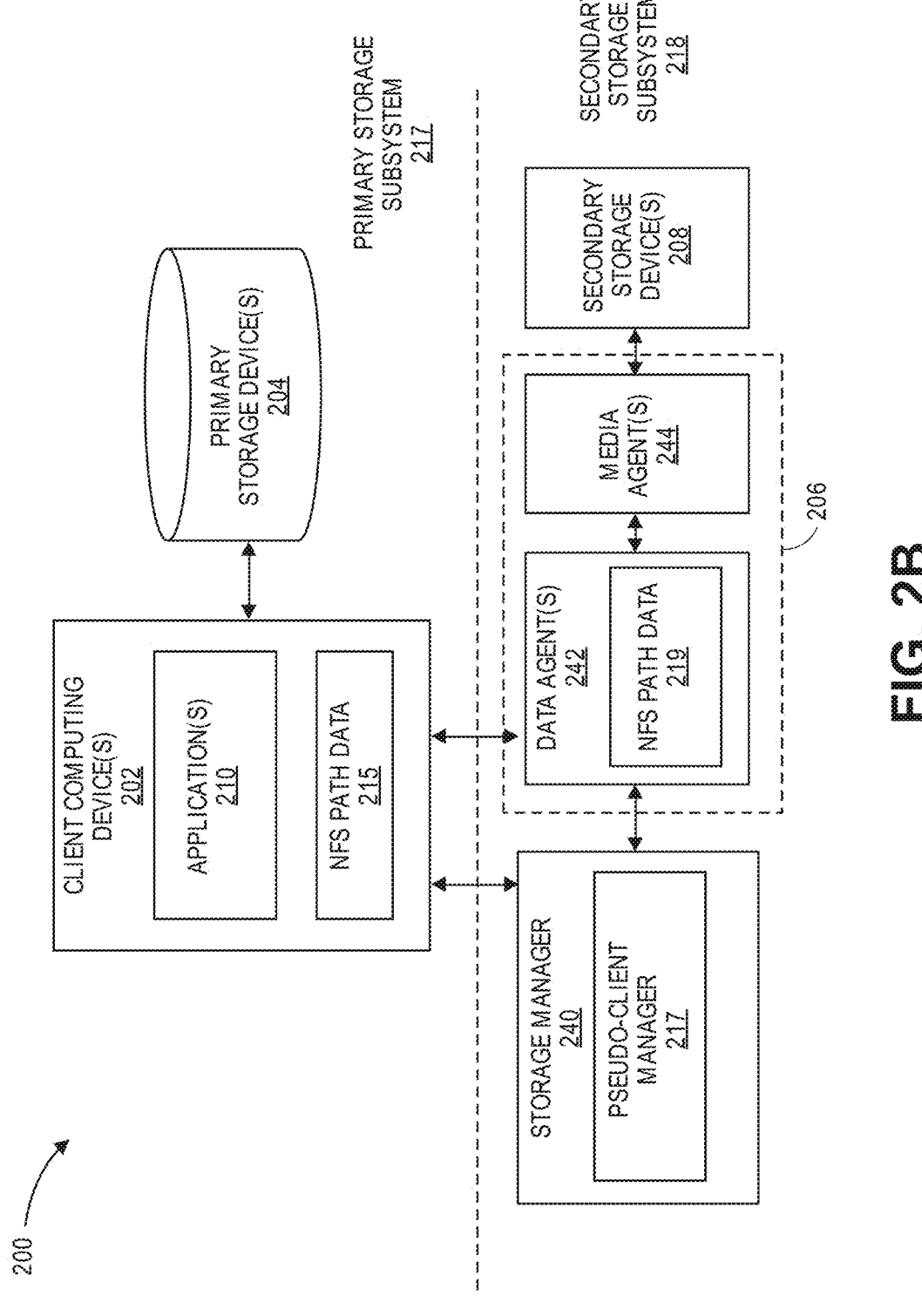
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
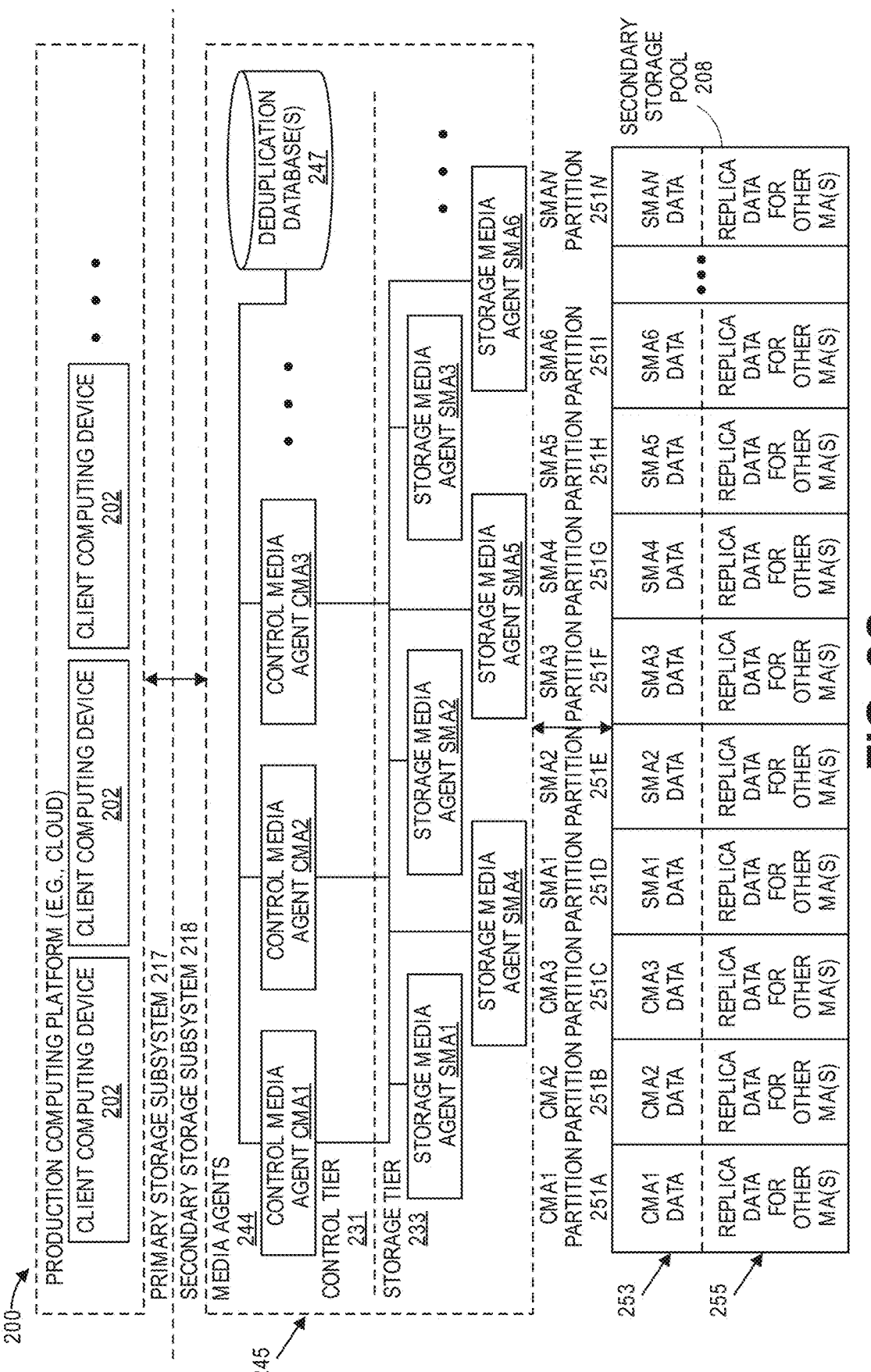
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/ 0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.
Snapshot-Based Disaster Recovery Orchestration of Virtual Machine Failover and Failback Operations FIG. 3A is a block diagram illustrating system 300 for snap-based disaster recovery orchestration of virtual machine failover and failback operations, according to an illustrative embodiment. FIG. 3A depicts logical views of connections, relationships, and/or operations associated with system 300; the connections and operations are supported by a physical networking and communications infrastructure that is well known in the art. FIG. 3A depicts: data storage management system 300 in communication with virtualization manager (e.g., vCenter VM server manager) 303 and primary storage resources (e.g., storage array/filer) 304 at a virtualized data center, which is a source for failover and a destination for failback; system 300 in further communication with failover virtualization manager 383D and failover storage resources 384D, which are configured at a virtualized DR site, which is a failover destination. FIG. 3A further depicts VMs 302, which are managed by manager 303; snapshot replication operation 305; and VMs 382D, which are managed by manager 383D.

Data storage management system 300 is a system analogous to system 100 and further comprising additional functionality for snap-based DR orchestration, such as administrative features for defining and configuring source and failover components, failover groups, customization of failover components, mapping between source and failover VMs, scheduling and tracking of snapshot generation and snapshot replication, etc. More details are given in FIGS. 4, 5A, and 5B.

VMs 302 are virtual machines that execute on one or more VM hosts (not shown in the present figure) and are managed by manager 303. VMs 302 are said to be sources of data, because they operate in a production environment. Each VM 302 has a datastore (e.g., VMDK, virtual disk, etc.) that comprises the VMs data and is configured in an associated primary data storage 304, such as the depicted storage array/filer or cloud storage resources (not shown here). There is no limit on how many VMs 302 can be failed over by system 300 using the illustrative snap-based DR orchestration techniques described herein. VMs 302 and their host computing devices are protected by but are not part of system 300.

Primary virtualization manager 303 (or "manager 303") is a computing device (e.g., a server) that provides a centralized platform for controlling any number of VM hosts and their VMs. One illustrative example is VMware vCenter Server from VMware, but the invention is not limited to VMware virtualization. As shown later, a specialized data agent component of system 300 (e.g., virtual server agent 442) interoperates with manager 303 to ensure that VMs 302 and their datastores are protected by system 300, e.g., making backup copies, replicating datastores, orchestrating failover, etc.

Primary data storage 304 are one or more data storage devices that are configured to store primary data for and generated by VMs 302, i.e., primary data storage 304 is where datastores 504 for VMs 302 reside. Examples of primary data storage 304 include SAN storage arrays, NAS filers/clusters, and/or cloud storage (not shown here). Primary data storage 304 are equipped with features for taking/making snapshots of their own data storage volumes, which are referred to herein as "hardware snapshots." Primary data storage 304 are further equipped to replicate snapshots to another storage resource, e.g., 384C, 384D, etc. NetApp data storage appliances are an example storage array/filer 304, but the invention is not limited to NetApp appliances or NetApp replication.

Snapshot replication 305 represents a number of operations performed by data storage resources 304/384 and managed by components of system 300 (e.g., storage manager 440, media agent 444, etc.). Primary data storage 304 are equipped with features for taking/making snapshots of their own data storage volumes, which are referred to herein as "hardware snapshots." Each hardware snapshot is stored at the storage resource (e.g., array) that took the snapshot, e.g., 304. System 300 manages the schedule for and initiates the creation of the snapshots by communicating instructions to primary data storage 304. Primary data storage 304 are further equipped with features for replicating the snapshots to other like (or compatible) storage resources, e.g., 384C, 384D, etc. The source and destination storage resources sometimes maintain a so-called "mirror relationship" that ensures that snapshots at the destination are read-only in order to be available for DR as needed.

In some embodiments, these replication operations are referred to as "array-to-array" replication, because the arrays/filers communicate with each other to structure and transmit each snapshot, even though the operation is scheduled and initiated by system 300 (e.g., using an auxiliary copy job). Of course, similar and equivalent techniques are used between arrays and cloud storage resources, or cloud-to-cloud. Some embodiments that use NetApp arrays use so-called "vault copy" features to replicate snapshots from source to DR site. Other embodiments that use NetApp arrays use so-called "mirror copy" features to replicate snapshots from source to destination. The embodiments are not limited to NetApp arrays or to these techniques for replicating snapshots.

An auxiliary copy job as managed by system 300 comprises snapshot replication operation 305 ("array-to-array" replication or equivalent to/from/between cloud storage resources). Alternatively, the illustrative DR orchestration job as managed by system 300 comprises snapshot replication operation 305 (array-to-array or equivalent to/from/ between cloud storage resources).

VMs 382D are VMs at a virtualized data center acting as a DR site. These VMs are managed by manager 383D at the DR site. VMs 382D are shown here in a dotted outline, because according to the illustrative snap-based DR orchestration approach, they are not active until failover. Each VM 382D is pre-administered in system 300 to correspond (or map) to a source VM 302. Thus, each source VM 302 maps to a DR VM382D (or 382C in the next figure).

Failover virtualization manager 383D (or "manager 383D") is analogous to manager 303 and operates at the DR site. Manager 383D manages VMs 382D and as noted above does not activate (power up) these VMs until failover. Likewise, manager 383D does not activate datastores for VMs 382D until failover.

Failover storage resources 384D are configured at a virtualized DR site, which is a failover destination. Failover storage 384D (e.g., storage array, filer, filer cluster, etc.) are analogous to primary data storage 304, but operate at the DR site. Failover storage 384C comprise a number of storage volumes (not shown here) for storing the replicated snapshot received from primary data storage 304. However, these data storage volumes do not become associated with VMs 382D until such time as manager 383D establishes for each failover VM 382D a corresponding datastore in one of the data storage volumes in failover storage resources 384D.

Figure 3B:
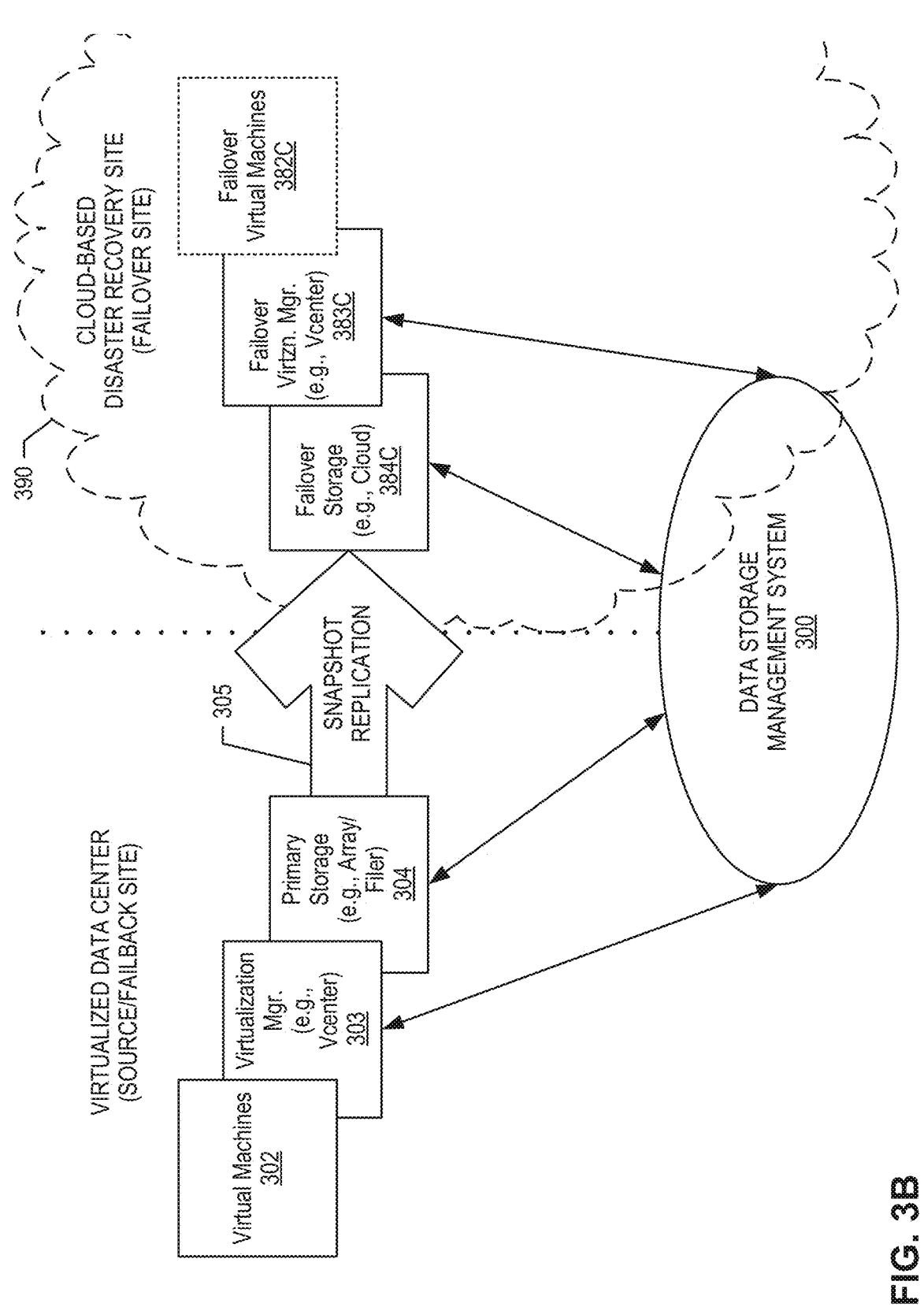
FIG. 3B is a block diagram illustrating the system 300, wherein the DR site is implemented in a cloud computing environment, according to an illustrative embodiment.

FIG. 3B is a block diagram illustrating the system 300, wherein the DR site is implemented in a cloud computing environment, according to an illustrative embodiment. FIG. 3B depicts logical views of connections, relationships, and/ or operations associated with system 300; the connections and operations are supported by a physical networking and communications infrastructure that is well known in the art. FIG. 3B depicts: data storage management system 300 in communication with primary virtualization manager (e.g., vCenter) 303 and primary storage (e.g., storage array/filer) 304 at a virtualized data center, which is a source for failover and a destination for failback; system 300 is in further communication with failover virtualization manager 383C and cloud-based failover storage resources 384C, which are configured at cloud computing environment 390, which is a failover destination. FIG. 3B further depicts VMs 302, which are managed by manager 303; snapshot replication operation 305; and VMs 382C, which are managed by manager 383C.

VMs 382C are analogous to VMs 382D and are instantiated in cloud computing environment 390. Collectively, VMs 382C or VMs 382D are referred to herein as "failover VMs 382" as a shorthand.

Manager 383C is functionally analogous to manager 383D and is instantiated in cloud computing environment 390. Managers 383C and/or 383D are referred to herein as "failover virtualization manager 383" as a shorthand.

Cloud-based failover storage resources 384C are functionally analogous to storage array/filer 384D and are instantiated in cloud computing environment 390. An illustrative example is Amazon AWS Elastic Block Store ("EBS"), which is well known in the art—but the invention is not so limited. Like array-based storage 384D, cloud-based failover storage 384C comprises data storage volumes (not shown here) that receive and store replicated snapshots from the source site. However, these data storage volumes do not become associated with failover VMs 382C until such time as failover virtualization manager 383C establishes for each failover VM 382C a corresponding datastore in one of the data storage volumes in failover storage resources 384C.

Any cloud-based storage technology may be used as failover storage resources 384C. Collectively, storage resources 384C and 384D at the DR site are referred to herein as "failover storage 384" as a shorthand.

Although not expressly depicted in FIGS. 3A and 3B, some alternative embodiments comprise a cloud computing environment at the source and a virtualized data center at the DR site; other alternative embodiments comprise a cloud computing environment at both source and DR site, whether the cloud computing environments are from the same cloud service provider or different ones. The latter scenario enables cloud-to-cloud failovers. Although not expressly depicted in FIGS. 3A and 3B, some alternative environments comprise more than one DR site, thus enabling a choice or DR sites for clone testing and planned failovers.

Figure 4:
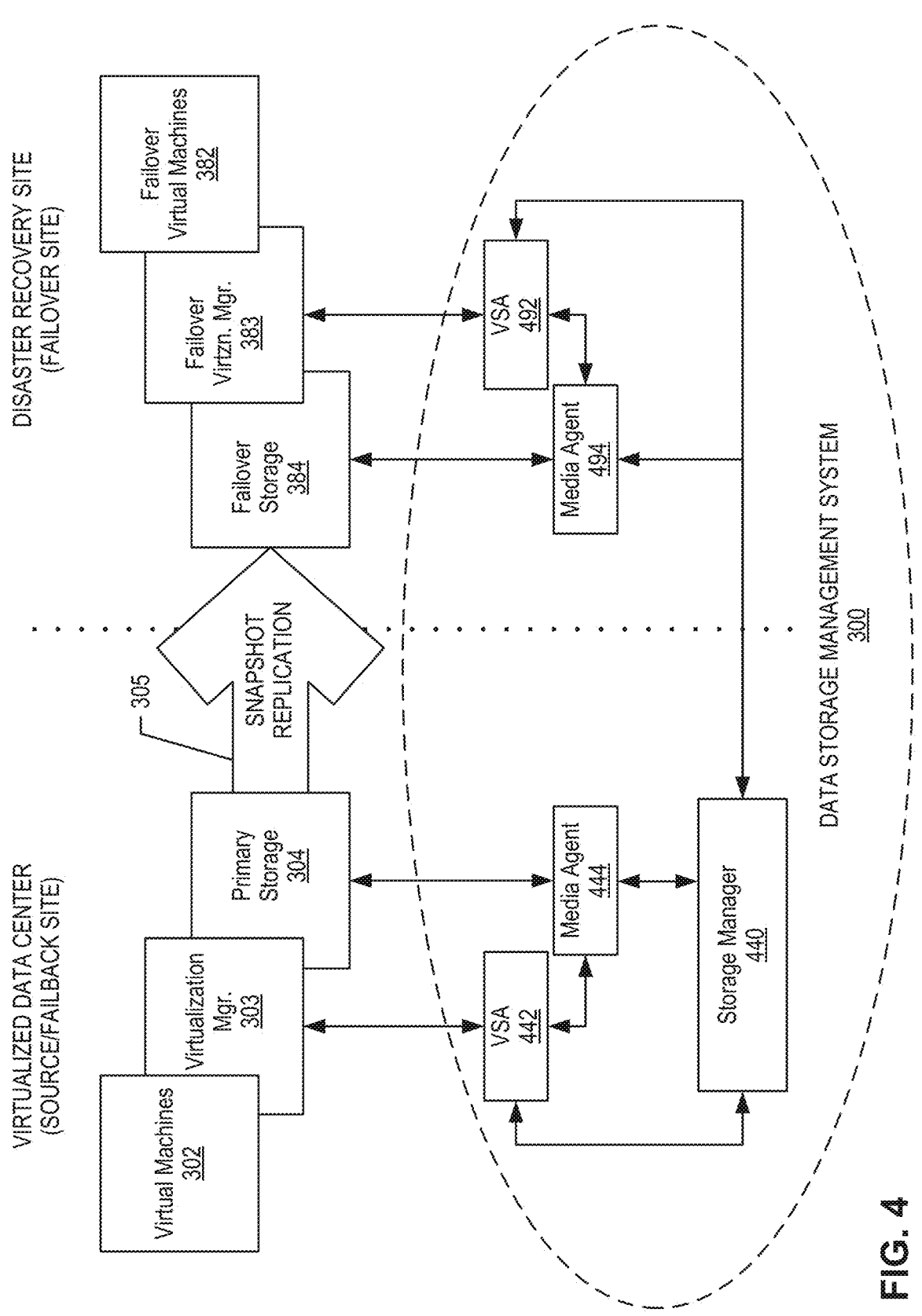
FIG. 4 is a block diagram illustrating some salient components of system 300, according to an illustrative embodiment.

FIG. 4 is a block diagram illustrating some salient components of system 300, according to an illustrative embodiment. FIG. 4 depicts VMs 302, manager 303, storage 304, snapshot replication 305, failover storage 384, failover virtualization manager 383, and failover VMs 382; and components of data storage management system 300 including: storage manager 440, virtual server agent 442, media agent 444, virtual server agent (VSA) 492, and media agent 494.

Storage manager 440 is analogous to storage manager 140 and further comprises additional features for operating in system 300, such as features for managing snap-based DR orchestration. More details are given in other figures.

Virtual server agent (VSA) 442 (or "VSA data agent 442") is a data agent analogous to data agent 142 and additionally comprising features for operating in system 300, such as interoperability with DR orchestration logic in storage manager 440. VSA data agent 442 is generally responsible for taking part in snap backup jobs, e.g., triggering manager 303 to quiesce one or more source VMs 302 so that storage 304 can take a snapshot of the volumes hosting the datastore(s) corresponding to the source VM(s) 302. VSA data agent 442 communicates with media agent 444 and with storage manager 440, which manages snap backup jobs, auxiliary copy jobs, and DR orchestration jobs. More details are given in other figures.

Media agent 444 is analogous to media agent 144 and additionally comprises features for operating in system 300, such as interoperability with DR orchestration logic in storage manager 440. Media agent 444 is generally responsible for instructing storage 304 to take a snapshot of the volumes hosting the datastore(s) corresponding to the source VM(s) 302 in a snap backup job, and is further responsible for instructing storage 304 to replicate snapshot(s) to failover storage 384 in an auxiliary copy job. Media agent 444 also maintains indexing information (e.g., in a media agent index 153) that tracks information about the snapshots generated and replicated by the snap backup jobs and auxiliary copy jobs. Media agent 444 communicates with VSA data agent 442 and with storage manager 440, which manages snap backup jobs, auxiliary copy jobs, and DR orchestration jobs. More details are given in other figures.

Virtual server agent (VSA) 492 is analogous to VSA data agent 442 and is associated with failover virtualization manager 383. Accordingly, in a DR orchestration job, VSA 492 instructs failover virtualization manager 383 when to create datastores for failover VMs 382, causes failover virtualization manager 383 to register failover VMs 382 and implement customized parameters, and cause the failover VMs 382 to be powered on at the DR site. VSA 492 communicates with media agent 494 and storage manager

440 during DR orchestration jobs to perform failovers to the DR site and/or failbacks therefrom. Media agent 494 is analogous to media agent 444 and is associated with failover storage 384. Accordingly, in a DR orchestration job, media agent 494 instructs failover storage 384 to bring online certain data storage volumes comprising replicated snapshots to be used in the failover. These data storage volumes will be configured as datastores for the failover VMs 382. Media agent 494 communicates with VSA 492 and with storage manager 440 during DR orchestration jobs to perform failovers to the DR site and/or failbacks therefrom.

System 300 is not limited to the depicted components shown in the present figure. One or more of the components shown in system 100 and 200 herein also can be present in system 300. Likewise, there is no limit to how many VSA data agent 442, VSA 492, media agents 444, and/or media agents 494 are configured in system 300.

Figure 5A:
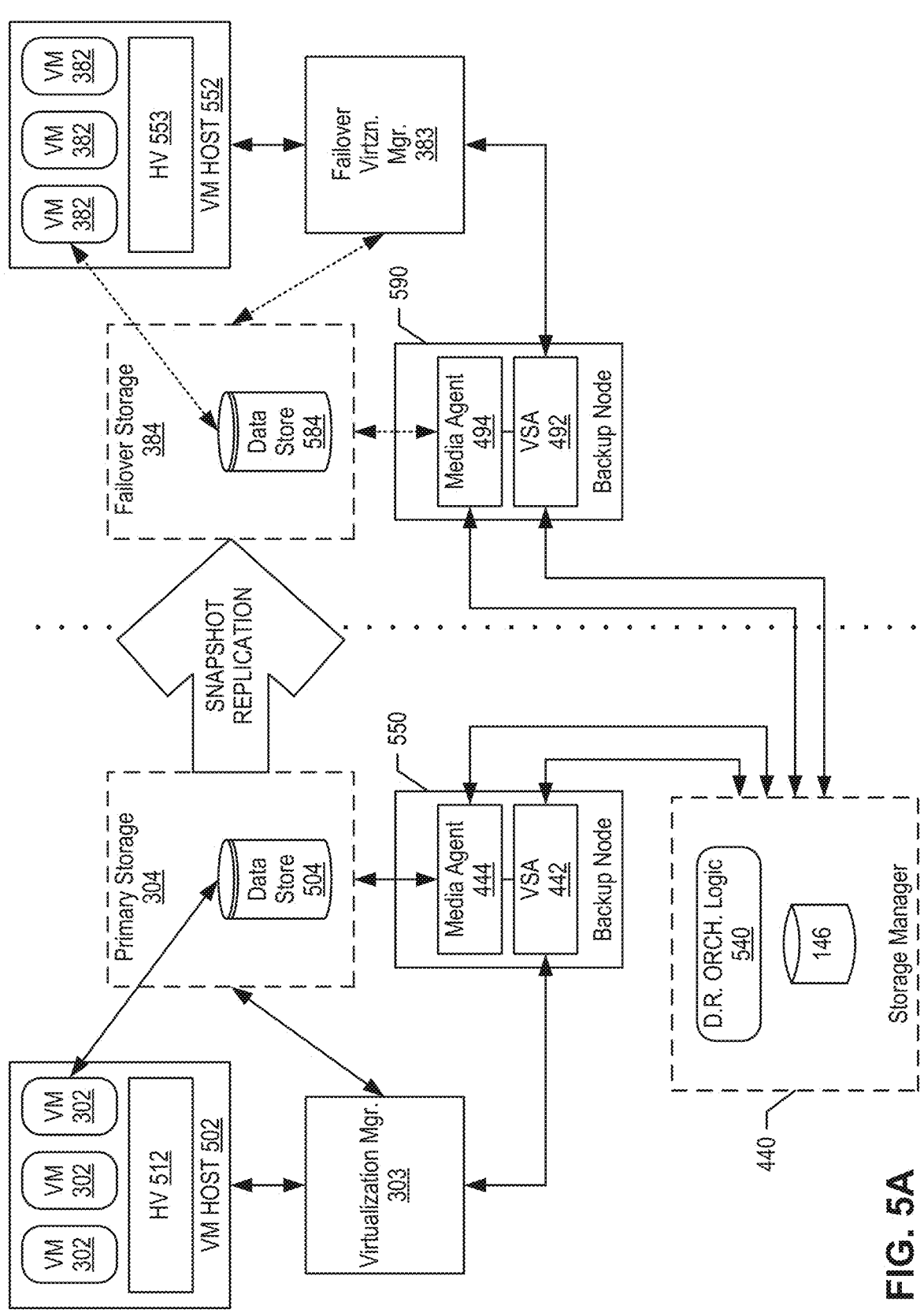
FIG. 5A is a block diagram illustrating some salient components of system 300, wherein the source site and DR site are virtualized data centers, according to an illustrative embodiment.

FIG. 5A is a block diagram illustrating some salient components of system 300, wherein the source site and DR site are virtualized data centers, according to an illustrative embodiment. The present figures depicts: virtualization manager 303; primary storage 304 comprising datastore 504; failover virtualization manager 383; failover storage 384 comprising datastore 584; storage manager 440 comprising management database 146 and DR orchestration logic 540; VM host 502 comprising VMs 302 managed by hypervisor 512; backup node 550 comprising VSA data agent 442 and media agent 444; VM host 552 comprising failover VMs 382 managed by hypervisor 553; and backup node 590 comprising VSA 492 and media agent 494. Storage manager 440, backup node 540, and backup node 590 are components of data storage management system 300. In alternative embodiments, the computing devices 540 and 590 hosting VSAs and media agents are not part of system 300, whereas VSAs, media agents, and storage manager 440 form a core portion of system 300.

Management database 146 is a logical components of storage manager 440 and comprises storage policies and schedules that govern snap backup copy jobs and auxiliary copy jobs, which may or may not be invoked by a DR orchestration job. In some scenarios (e.g., unplanned failovers, clone testing), the DR orchestration job uses snapshots that were previously generated and replicated in the ordinary course of snap backup jobs and auxiliary copy jobs, respectively. In other scenarios (e.g., planned failovers, clone testing), the DR orchestration invokes a snap backup job and an auxiliary copy job on demand to ensure that the planned failover/clone testing uses the latest data snapshotted from datastore(s) 504.

VM host 502 is a computing device comprising one or more hardware processors and computer memory and is configured for hosting virtual machines 302. The hosting is managed and controlled by hypervisor 512, which is any kind of hypervisor and is well known in the art.

Datastore 504 is a repository for storing data and/or metadata that is associated with, is used by, and is generated by a corresponding VM such as production VMs 302. Each VM 302 has a corresponding datastore 504; the relationship between datastore 504 and its corresponding VM 302 is established by virtualization manager 303. Each datastore 504 is configured in a data storage volume (physical volume or logical volume) 599 configured in a data storage resource such as primary storage 304. More details are given in FIG. 5C.

DR orchestration logic 540 is a functional component of storage manager 440. DR orchestration logic 540 is generally responsible for performing a number of operations, at the source and at the DR site, that collectively ensure a successful failover occurs. DR orchestration logic also manages failbacks. More details are given in regard to method 600.

Backup node 550 is a computing device that comprises one or more hardware processors and computer memory for executing or hosting one or more VSA data agent 442 data agents and one or more media agents 444. Backup node 540 is illustratively configured in the same data center as the source data in datastores 504 associated with source/production VMs 302.

VM host 552 is a computing device comprising one or more hardware processors and computer memory and is configured for hosting failover virtual machines 382. The hosting is managed and controlled by hypervisor 553, which is any kind of hypervisor and is well known in the art. Hypervisor 553 may be the same as hypervisor 512, but the invention is not so limited. Other compatible or like hypervisors also may be implemented without guaranteeing exact identity to hypervisor 512.

Datastore 584 is analogous to datastore 504. Each datastore 584 has a corresponding failover VM 382. The reason for the dotted arrow between datastore 584 and failover VM 382 is that this relationship is established at failover time, since failover VMs 382 and datastores 584 are not maintained in an active state prior to failover.

Backup node 590 is a computing device that comprises one or more hardware processors and computer memory for executing or hosting one or more VSA 492 data agents and one or more media agents 494. Backup node 590 is illustratively configured at the DR site. Co-location (physical or logical in the same cloud computing account) provides improved performance between backup node 590 and communicatively coupled components failover storage 384 and failover virtualization manager 383.

The dotted arrows shown between certain components at the DR site illustrate that failover VMs 382 and their corresponding datastores 584 are not maintained in an active state prior to failover. See method 600 in FIG. 6 for more details.

Figure 5B:
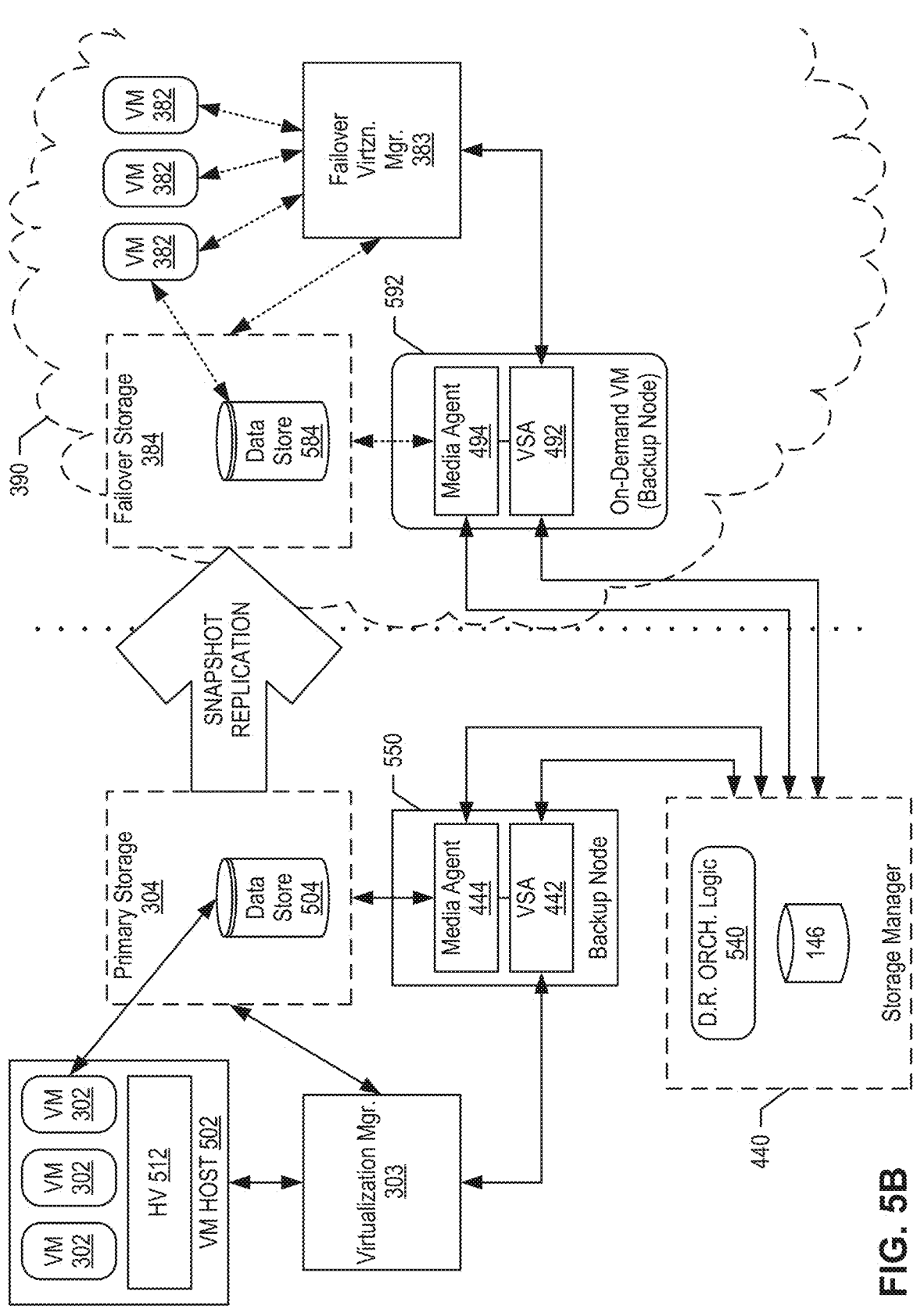
FIG. 5B is a block diagram illustrating some salient components of system 300, wherein the DR site is implemented in a cloud computing environment, according to an illustrative embodiment.

FIG. 5B is a block diagram illustrating some salient components of system 300, wherein the DR site is implemented in a cloud computing environment, according to an illustrative embodiment. Most of the components were shown and described in earlier figures. The present figure depicts a cloud computing environment 390 (e.g., a customer's cloud computing account) that hosts failover components such as failover storage 384, failover virtualization manager 383, and failover VMs 382. Cloud computing environment 390 also hosts one or more on-demand VMs that act as backup node(s) 592, each backup node 592 hosting a VSA 492 data agent and/or a media agent 494. Thus, the depicted DR site is hosted in a cloud service account that is fully equipped to act as a failover site using the illustrative snap-based DR orchestration approach. In some embodiments (not shown here), the source/failback site is also hosted by a cloud computing environment suitably equipped with all the depicted components. In such an embodiment, backup node 550 and storage manager 440 execute on VMs instantiated at the source/failback site. In some other embodiments, storage manager 440 is configured/instantiated at another, distinct data center or cloud service account, and need not be co-located (physically or logically) with the other components of system 300, such as VSA data agent 442, media agent 444, VSA 492, or media agent 494.

The dotted arrows shown between certain components at the DR site illustrate that failover VMs 382 and their corresponding datastores 584 are not maintained in an active state prior to failover. See method 600 in FIG. 6 for more details.

Figure 5C:
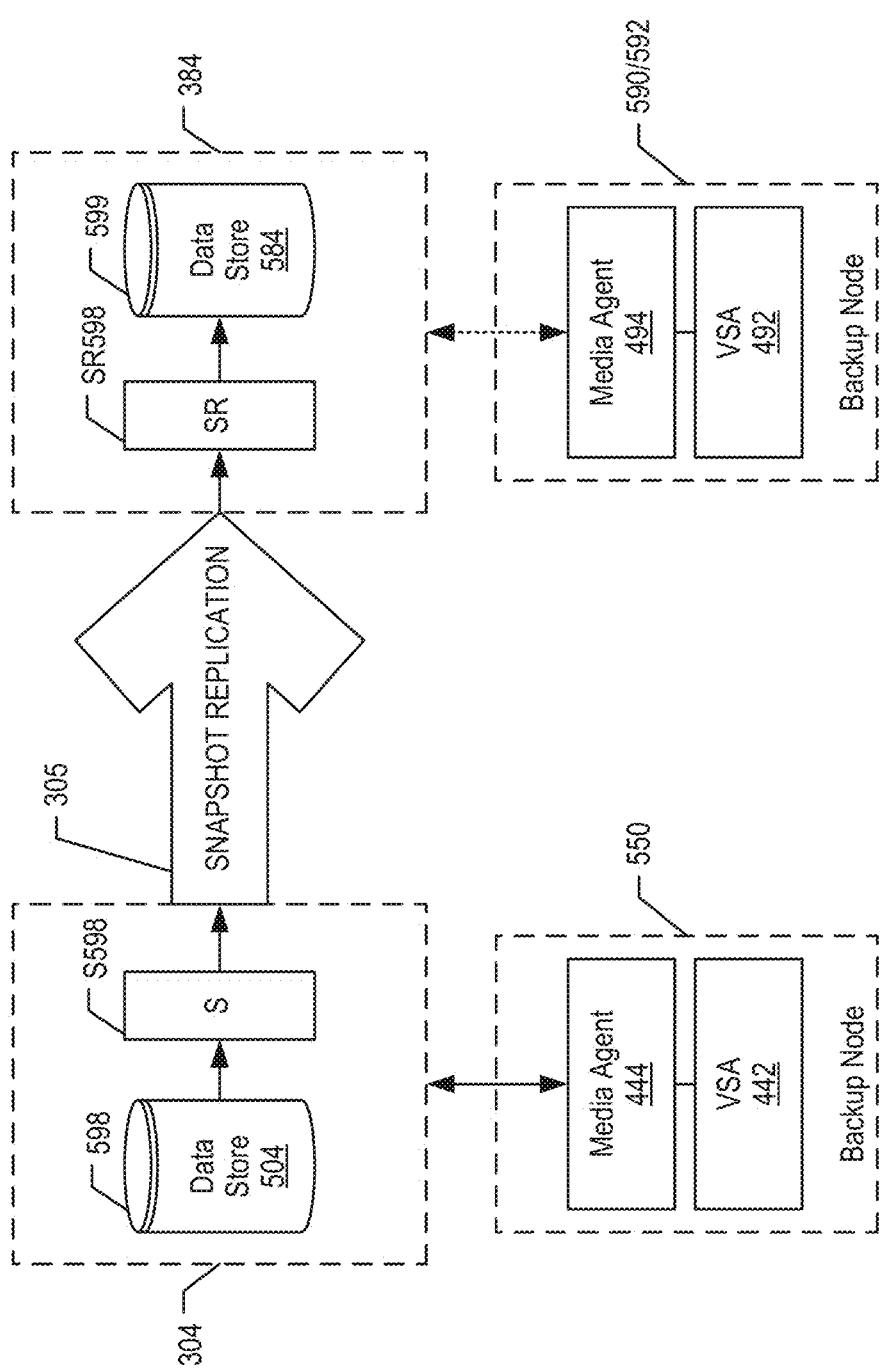
FIG. 5C is a block diagram illustrating come salient components involved in snap backup jobs and auxiliary copy jobs according to an illustrative embodiment.

FIG. 5C is a block diagram illustrating come salient components involved in snap backup jobs and auxiliary copy jobs according to an illustrative embodiment. FIG. 5C depicts: primary storage 304 comprising data store 504 configured in a data storage volume 598, and snapshot S598 taken from volume 598; failover storage 384 comprising replicated snapshot SR598, which is replicated from snapshot S598, and data storage volume 599 comprising data store 584; backup node 550 comprising VSA data agent 442 and media agent 444; and backup node 590/592 comprising VSA 492 and media agent 494.

Data storage volume 598 is a physical volume or a logical volume (e.g., implemented using a logical volume manager) implemented in primary data storage 304. Data storage volume 598 comprises one or more datastores 504, each data store 504 associated with a different source VM 302.

Snapshot S598 is a hardware snapshot of data storage volume 598 taken by primary storage 304 as directed by media agent 444, e.g., using APls, using custom scripts, etc. Snapshot S598 is taken in the course of a snap backup job managed by storage manager 440. Snapshot S598 is stored at primary storage 304.

Snapshot S598 is replicated by primary storage 304 to failover storage 384 as directed by media agent 444 in the course of an auxiliary copy job managed by storage manager 440. The auxiliary copy job generates a snapshot SR598 that is a replica of snapshot S598. Snapshot SR598 is stored at failover storage 384 in a data storage volume 599. At failover time, the DR orchestration job will create a relationship between data in snapshot SR598 and a failover VM 382 and will establish datastore 584 corresponding to the failover VM 382.

FIG. 6 is a flow chart that depicts some salient operations of a method 600 according to an illustrative embodiment. Method 600 is performed by one or more components of system 300, except as stated otherwise. Components of system 300 interoperate with each other and with other components described herein to successfully orchestrate DR failovers and failbacks using snap-based technologies.

At block 602, hardware components (e.g., VM hosts, virtualization managers, storage resources, backup nodes, storage manager, etc.) and networking are configured at source virtualized data center and at DR/failover site. This initial set-up is well known in the art.

At block 604, storage manager 440 configures storage policies for snap backup jobs and auxiliary copy jobs. The storage policies govern when snap backup and auxiliary copy jobs are to run and which media agent(s) (e.g., 444, 494) will be involved in each job, as well specifying the data sources for the jobs, e.g., datastore 504, data storage volume 598, snapshot S598, etc. The storage policies are illustratively stored in management database 146. See also FIG. 13.

At block 606, storage manager 440 configures parameters for the source data and the failover destination. A number of administrative entries are configured here, e.g., failover group, VM host mapping, network settings, domain & IP address customization for DR site, etc. For example, a failover group is defined, which specifies one or more source VMs 302 to be failed over by DR orchestration jobs, a mapping between source VM host 502 and DR VM host 552, and an indication that the failover is to be made using the illustrative snap-based DR orchestration approach. See also FIG. 11, FIG. 12. Customization ensures that appropriate IP addresses and domain names are used at the DR site. In effect, block 606 ensures that there is a complete plan for selecting source VMs 302 and failing them over to appropriate entities at the DR site. Thus, block 606 provides a font of information to be used by the DR orchestration job in order to have a successful failover event. Illustratively, all the administrative parameters configured at block 606 are stored in management database 146. Illustratively one or more of these administrative parameters are communicated as needed by storage manager 440 to media agents and data agents when initiating the DR orchestration job.

At block 608, system 300 performs snap backup jobs. For example, storage manager 440 instructs media agent 444 and VSA data agent 442 to launch a snap backup job for a certain source VM 302. VSA data agent 442 reports to media agent 444 an identity of where the VM's datastore is located, e.g., in a data storage volume 598. Media agent 444 instructs (e.g., using APIs, custom scripts, etc.) primary storage 304 to take a snapshot of data storage volume 598, resulting in snapshot S598 stored in primary storage 304. The successful generation of snapshot S598 is noted by media agent 444 and the snapshot is tracked in media agent index 153 at media agent 444. These snap backup jobs are performed according to a plan (e.g., RPO plan, opportunistic plan, etc.), schedule, and/or storage policies, one or more of which are administered at storage manager 440 and illustratively stored in management database 146. Job results and the location of media agent 153 are reported back to storage manager 440 for future reference.

At block 610, system 300 performs auxiliary copy jobs to replicate snapshots from primary storage 304 to failover storage 384 (e.g., array, filer, cloud). Accordingly, storage manager 440 initiates an auxiliary copy job by instructing media manager to replicate snapshot(s) in primary storage (e.g., snapshot S598) to failover storage 384. Media agent 444 in turn instructs primary storage 304 (e.g., using APIs, custom scripts, etc.) to begin an "array-to-array" snapshot replication operation. "Array-to-array" is used here as shorthand for hardware-to-hardware replication, which is handled by the storage resources themselves under the direction and instruction of media agent 444 as directed by storage manager 440. Thus, system 300 is responsible for the auxiliary copy job, even if the replication operation itself is performed by the storage resources. The replicated snapshot SR598 is stored at failover storage 384. Media agent(s) 494 and/or 444 note the completion of the snapshot replication and update media agent index 153 with information about replicated snapshot SR598. These auxiliary copy jobs are performed according to a plan (e.g., RPO plan, opportunistic plan, etc.), schedule, and/or storage policies, one or more of which are administered at storage manager 440 and illustratively stored in management database 146. Job results and the location of media agent 153 are reported back to storage manager 440 for future reference. From block 610, control passes to block 612, block 614, and/or block 616.

At block 612, system 300 performs an illustrative DR orchestration job to test the DR/failover site configuration, e.g., test clones. This operation is distinguishable from failover scenarios (blocks 614, 616), because a replicated snapshot at the failover site is cloned there for test purposes without actually failing over source VMs 302. More details are given in a subsequent figure. After block 612, method 600 may end or control may pass (not shown here) to block 608, 610, 612, 614, or 616, without limitation.

At block 614, system 300 performs an illustrative DR orchestration job to conduct a planned failover. This operation is distinguishable from unplanned failover scenarios (block 616), because it includes an on-demand snap backup job immediately followed by an auxiliary copy job to ensure that the latest source data from VMs 302 is captured in the planned failover. In contrast to the test clone scenario (block 612) a so-called "mirror relationship" between primary storage and failover storage is affirmatively broken in order to stop further replication operations and to enable the failover site to take over in a production (data generation) mode in placed of the original site. More details are given in a subsequent figure.

At block 616, system 300 performs an illustrative DR orchestration job to conduct an unplanned failover. This operation is distinguishable from planned failover scenarios (block 614), because it relies on preceding snap backup and auxiliary copy job(s) that generated replicated snapshot(s) SR598 at the failover storage. These previously generated replaced snapshots SR598 will become datastores for the failover VMs 382, thus capturing the most recently replicated data from source VMs 302, though not necessarily the most recently generated data from source VMs 302. In contrast to the test clone scenario (block 612) the unplanned failure at the source data center breaks a so-called "mirror relationship" between primary storage and failover storage, which disables further replication operations. More details are given in a subsequent figure.

At block 620, which follows a planned failover (block 614) and/or an unplanned failover (block 616), system 300 uses another DR orchestration job to perform a failback operation and optionally to integrate DR site data generated after failover back into the original data sources. This operation is described in more detail in a subsequent figure. After block 620, method 600 may end or control may pass (not shown here) to other blocks, e.g., 608, 610, 612, 614, 616, without limitation.

Figure 7:
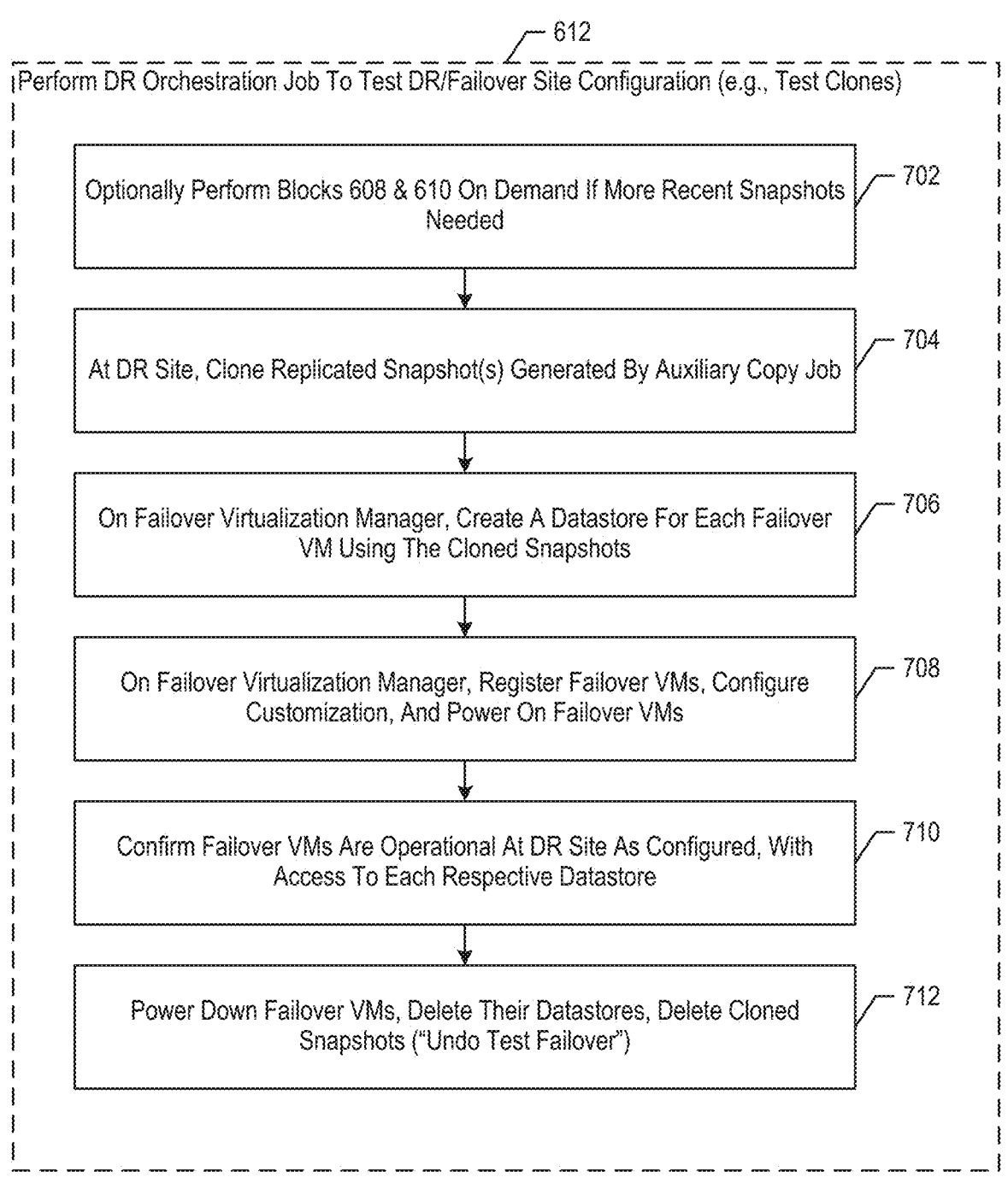
FIG. 7 depicts some salient operations of block 612 in method 600.

FIG. 7 depicts some salient operations of block 612 in method 600. Block 612 is generally directed to performing a DR orchestration job to test the DR/failover site (test clone scenario). The DR orchestration job is initiated and managed by storage manager 440 and involves one or more components of system 300, e.g., VSA data agent 442, media agent 444, data agent 492, and/or media agent 494 as described in more detail below.

At block 702, system 300 optionally performs blocks 608 and 610 on demand if more recent replicated snapshots SR598 are needed at the DR site for the test. In some cases, older replicated snapshots SR598 are readily available at the DR site from earlier snap backup and auxiliary copy jobs.

At block 704, system 300 clones replicated snapshot(s) SR598 into corresponding clone snapshots (not shown). Illustratively, the cloning operation is performed by failover storage 384 as instructed by media agent 494, under the direction of storage manager 440. Media agent 494 uses APIs, custom scripts, and/or other communication protocols to communicate with failover storage 384. The cloned snapshots are stored at failover storage 384.

At block 706, failover virtualization server 383 creates a datastore for each failover VM 382 using the cloned snapshots. Illustratively this operation is directed by VSA data agent 492. To properly direct manager 383, VSA data agent 492 receives certain administrative parameters from storage manager 440, e.g., mapping information administered for the failover group at block 606. See also FIG. 12. Information about the clone snapshots and the VM data therein (from source VMs 302) is obtained from media agent 494 and/or from storage manager 440. Accordingly, VSA data agent 492 instructs manager 383 to designate a datastore 584 for each failover VM 382, wherein datastore 584 comprises a certain clone snapshot generated at block 704.

At block 708, failover virtualization manager 383 registers failover VMs 382, configures customization, and powers on failover VMs 382. Illustratively, this operation is directed by VSA data agent 492. To properly direct manager 383, VSA data agent 492 receives certain administrative parameters from storage manager 440, e.g., network settings, mapping information, and/or IP addresses that were administered for the failover group at block 606. See also FIG. 12. At this point, failover VMs 382 are active with connectivity and access to their respective datastores 584.

Block 710 confirms that failover VMs 382 are operational at the DR site as configured with access to each respective datastore 584. Failover VMs 382 are up and running at the DR/failover site using the cloned snapshots as their datastores. Each failover VM 382 may read, write, change, and/or delete data in its respective/corresponding datastore 584. Automatic and/or manual operations are executed at this stage to verify that one or more failover VMs 382 are operational at the DR site as configured by pre-failover administration and using the cloned replicated snapshots (hence the "clone testing" moniker).

At block 712, system 300 powers down failover VMs 382, deletes their datastores, and deletes the cloned snapshots to "undo the test failover." This operation is also initiated by storage manager 440, which directs VSA data agent 492 to instruct failover virtualization manager 383 to power down failover VMs 382, de-register VMs 382, and sever the datastore relationship to the cloned snapshots. Storage manager 440 further directs media agent 494 to instructs failover storage 384 to delete the cloned snapshots. Block 612 ends.

Throughout block 612, source/production VMs 302 continue operating at the source site; snap backup jobs are performed; auxiliary copy jobs are also performed-unfettered by the test failover (clone testing) operations at the DR site.

FIG. 8 depicts some salient operations of block 614 in method 600. Block 614 is generally directed to performing a DR orchestration job for a planned failover to the DR site. The DR orchestration job is initiated and managed by storage manager 440 and involves one or more components of system 300, e.g., VSA data agent 442, media agent 444, data agent 492, and/or media agent 494 as described in more detail below. Based on storage policies and failover groups administered at storage manager 440, storage manager 440 selects one or more source VMs 302 for the present planned failover.

At block 802, at the source data center, system 300 powers off source VMs 302. Illustratively storage manager 440 directs VSA data agent 442 to instruct virtualization manager 303 to power off the selected one or more VMs 302. Manager 303 comprises features for causing VMs 302 to power off, e.g., commands to hypervisor 512, commands to VM host 502, etc., without limitation. This operation freezes any further data changes in the source VMs' datastores 504.

At block 804, at the source data center, system 300 performs an on-demand snap backup job to take snapshots S598 of datastores 504 corresponding to the one or more powered off source VMs. Snap backup jobs are described in more detail elsewhere herein, e.g., at block 608.

At block 806, system 300 performs an on-demand auxiliary copy job to replicate snapshots S598 to failover storage 384 at the DR site (e.g., array, filer, cloud), i.e., to generate replicates snapshot(s) SR598. Auxiliary copy jobs are described in more detail elsewhere herein, e.g., at block 610.

At block 808, system 300 breaks the so-called "mirror relationship" between primary storage 304 and failover storage 384, which was previously established to enable "array-to-array" (or equivalent) replication jobs therebetween. One of the features of the mirror relationship is that it maintains the replicated snapshots at the failover storage 384 in a read-only state to prevent replicated data from being changed at the DR site. By breaking the mirror relationship, the DR orchestration job enables the replicated snapshots SR598 to be activated into datastores for active failover VMs 382. Illustratively, media agent 444 and/or media agent 494, as directed by storage manager 440, cause the mirror relationship to break, e.g., by so instructing primary storage 304 and/or failover storage 384, respectively.

At block 810, system 300 brings data storage volumes 599 online at the DR site. Illustratively, media agent 494, as directed by storage manager 440, instructs failover storage 384 to bring online data storage volumes 599 comprising replicated snapshot(s) SR598. In contrast to the test clone scenario in block 612, where clones of the replicated snapshots were used as datastores, here the replicated snapshots themselves will become datastores for failover VMs 382.

At block 812, failover virtualization manager 383 creates a datastore for each VM to be failed over using the replicated snapshots in the volumes brought online in the preceding block. This block is similar to block 706, except that here the replicated snapshots SR598 become the failover datastores 584.

At block 814, which is analogous to block 708, failover virtualization manager 383 registers failover VMs 382, configures customization, and powers on failover VMs 382.

At block 816, failover VMs 382 are operational at the DR site using datastores comprising data that was replicated from the source data center. The planned failover operation has successfully completed. The failover VMs 382 are now operating "live" and the selected VMs 302 are not operational. System 300 now treats VMs 382 as source/production VMs for future storage operations. Appropriate updates are entered into media agent indexes 153 at media agent 444 and media agent 494 for tracking the various snapshots. VSA data agent 492 tracks the failover datastores 584 as data sources for future backups of failover VMs 382. Job completion is reported to storage manager 440 by data agents and media agents and the DR orchestration job ends here.

Figure 9:
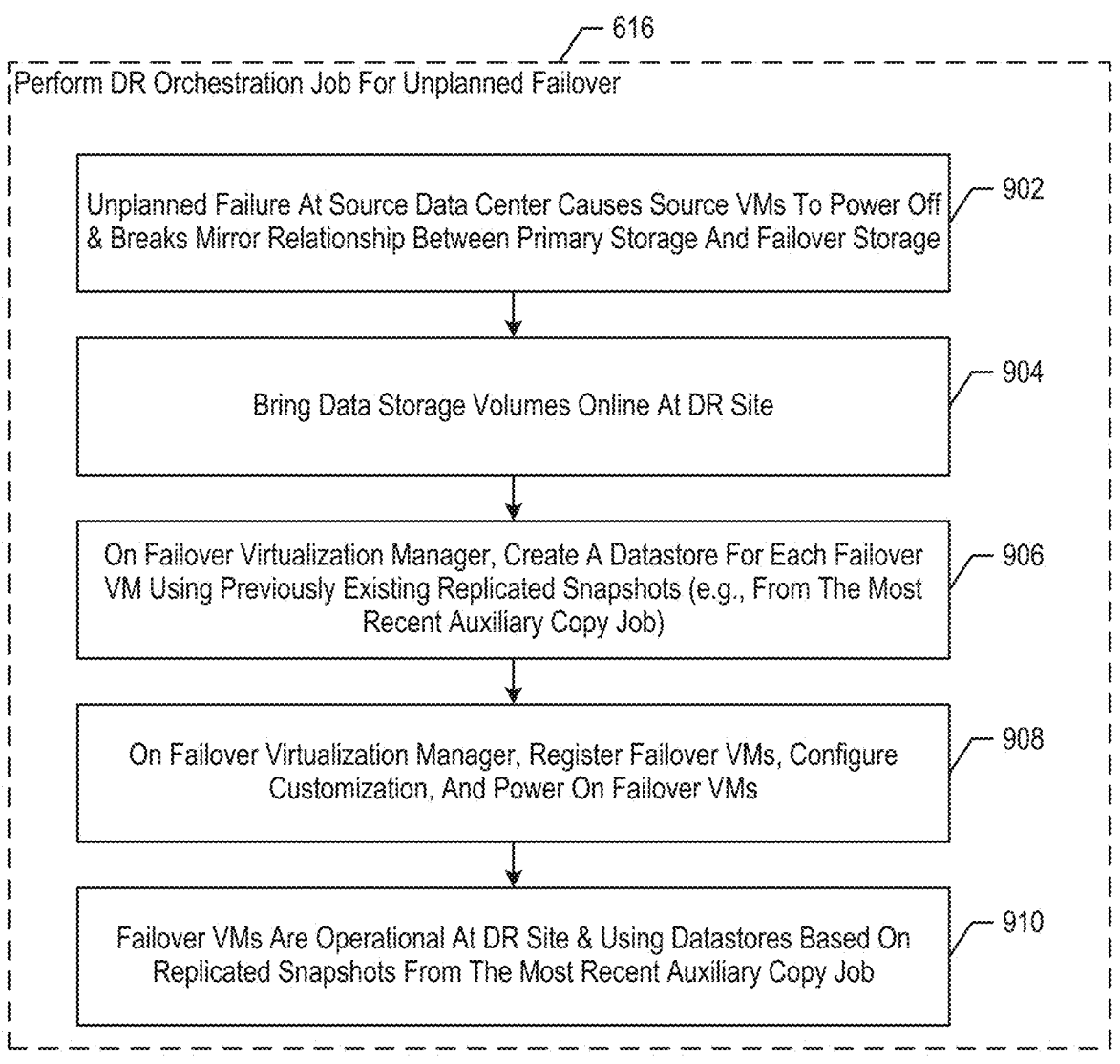
FIG. 9 depicts some salient operations of block 616 in method 600

FIG. 9 depicts some salient operations of block 616 in method 600. Block 616 is generally directed at performing a DR orchestration job for an unplanned VM failover. The DR orchestration job is initiated and managed by storage manager 440 and involves one or more components of system 300, e.g., VSA data agent 442, media agent 444, data agent 492, and/or media agent 494 as described in more detail below. Notably, only the source VMs 302 administered in one or more failover groups are subject to the DR orchestration job for the unplanned failover. Other failed source VMs 302 that are not in a failover group will not be failed over by the illustrative DR orchestration job. These other failed VMs may be restored in the future from a VM backup copy, but they are not protected/failed-over by the DR orchestration job.

At block 902, an unplanned failure at the source data center causes source VMs 302 to power off and causes a break in the mirror relationship to the DR site. The unplanned failure is detected by one or more operating components of system 300, which triggers a DR orchestra-tion job to be initiated for failover to the DR site. If the mirror relationship between primary storage and failover storage has not been broken by the unplanned failure, system 300 breaks it here according to block 808. The unplanned failover is made possible by all the operations performed by blocks 602-610 (and optionally 612), which set up all configurations and administration needed for the unplanned failover to succeed. As before, storage manager 440 initiates and manages the DR orchestration job for such source VMs 302 that are part of one or more failover groups set up for snap-based DR orchestration.

At block 904, which is analogous to block 810, data storage volumes are brought online at the DR site. Media agent 494 (using information in its media agent index 153) identifies the appropriate replicated snapshots SR598 (e.g., the most recently replicated) at failover storage 384 that are to made into datastores for the failover VMs. Failover storage 384 may comprise any number of replicated snapshots SR598 generated by countless auxiliary copy jobs, but the most recently created ones are most desirable for the present failover. Media agent 494 identifies the data storage volumes comprising these snapshots and instructs failover storage 384 to bring them online.

At block 906, which is similar to block 812, failover virtualization manager 383 creates a datastore for each VM to be failed over using the previously existing replicated snapshots SR 589.

At block 908, which is similar to block 814, failover virtualization manager 383 registers failover VMs 382, configures customization, and powers on failover VMs 382.

At block 910, which is analogous to block 816, failover VMs 382 are operational at the DR site using datastores comprising data that was replicated from the source data center, preferably by the most recent auxiliary copy job. The unplanned failover operation has successfully completed. The failover VMs 382 are now operating "live" and the failed source VMs 302 are not operational. System 300 now treats VMs 382 as source/production VMs for future storage operations. VSA data agent 492 tracks the failover datastores 584 as data sources for future backups of failover VMs 382. Job completion is reported to storage manager 440 by data agents and media agents and the DR orchestration job ends here.

Figure 10:
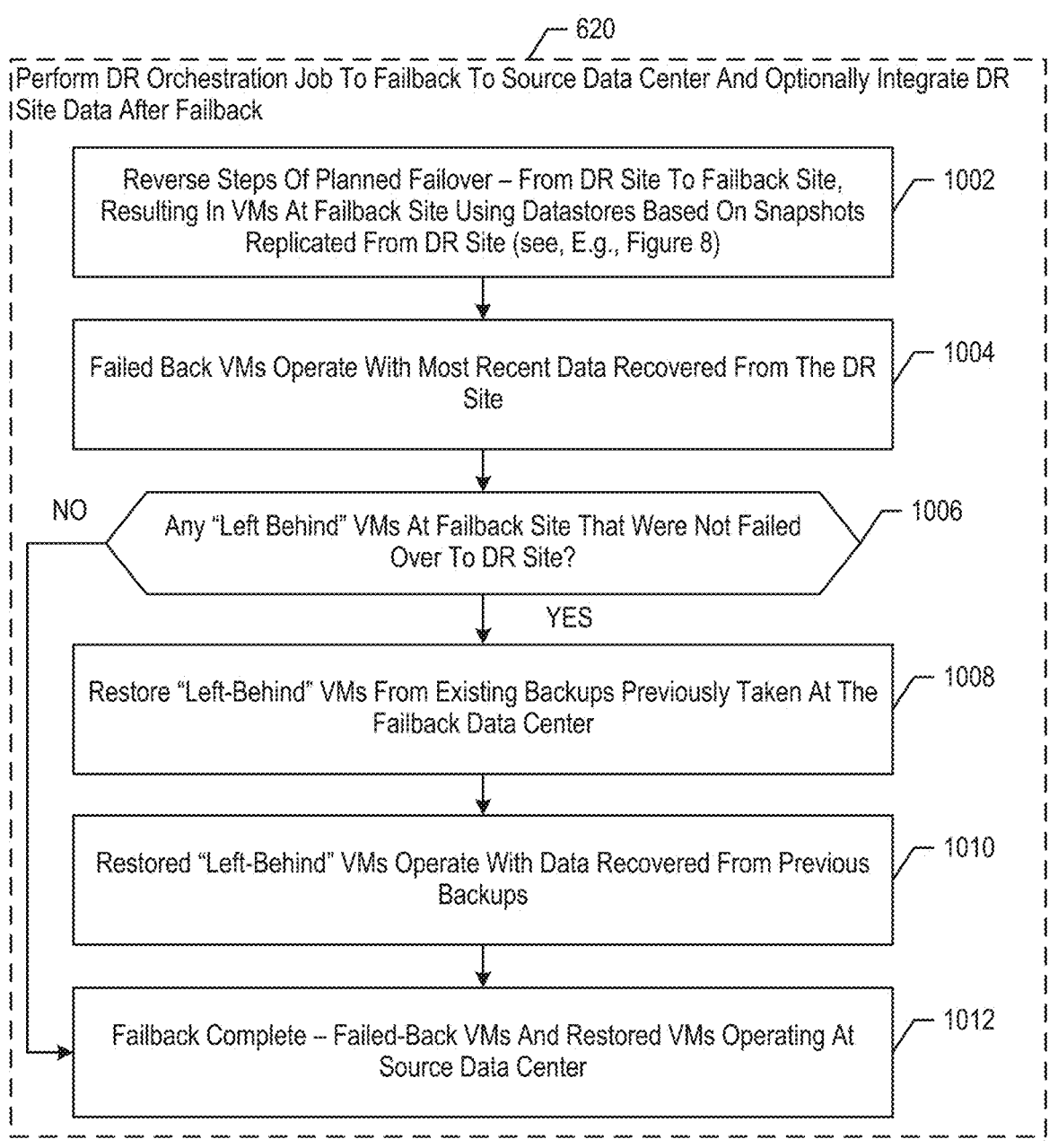
FIG. 10 depicts some salient operations of block 620 of method 600.

FIG. 10 depicts some salient operations of block 620 of method 600. Block 620 is generally directed at using a DR orchestration job to failback from a DR site and optionally integrate DR data back into the source data center. The DR orchestration job is initiated and managed by storage manager 440 and involves one or more components of system 300, e.g., VSA data agent 442, media agent 444, data agent 492, and/or media agent 494 as described in more detail below.

At block 1002, system 300 reverses steps of a planned failover—from DR site to failback site, resulting in VMs 302 at the failback site using datastores that are based on snapshots replicated from the DR site (see, e.g., FIG. 8). The failover VMs 382 are powered off and not operational.

At block 1004, as a result of block 1002, failed-back VMs 302 operate with the most recent data recovered from the DR site. The steps taken in block 1002 result in failed-back VMs 302 operating "live" at the failback site, which is the original source data center.

At block 1006, system 300 determines whether any VMs at the source/failback site were powered off or failed but were not failed-over to the DR site at block 614 or block 616 (VMs 302 that were "left-behind" by the failover orchestrated by the DR orchestration job). For example, VMs 302 that are not administered into a failover group will be "left behind" in planned or unplanned failover. If not, control passes to block 1020 (failback complete). If yes, control passes to block 1008. Illustratively, storage manager 440 consults management database 146 to determine failover status. Alternatively, failover status may be determined by storage manager 440 querying VSA data agent 442 or VSA data agent 492.

At block 1008, system 300 uses previously created backup copies to restore one or more left-behind VMs 302 at the source/failback site. For example, backup copies of these left-behind VMs 302 were created prior to the planned/ unplanned failover and the accompanying DR orchestration job. Such backup copies (e.g., 116) are governed by storage policies and schedules configured by storage manager 440 in management database 146. Such backup copies (e.g., 116) are stored locally at the source data center or elsewhere, without limitation. Such backup copies are well known in the art and are available at this point to be restored in order to re-activate the left-behind VMs 302. Accordingly, storage manager 440 initiates one or more restore operations to restore backup copies 116 previously made for left-behind VMs 302. VSA data agent 442 and media agent 444 (or another media agent 144 with access to storage media hosting backup copies 116) interoperate as directed by storage manager 440 to populate data storage volume(s). Virtualization manager 303 activates the data storage volume(s) into datastores for the left-behind VMs 302, registers said VMs 302, and powers up said VMs 302.

At block 1010, as a result of block 1008, the restored VMs 302 operate with data recovered from previous backup copies 116 alongside the failed-back VMs that were failed back using a DR orchestration job at block 1002.

At block 1012, the failback operation is complete and block 620 ends.

FIG. 11 depicts an illustrative screenshot of an administrative screen in system 300 for adding a failover group. One of the administrative options (1102) for the failover group is whether it will be subject to Live Sync or snap-based DR orchestration using "array based replication." The terms "array-to-array replication" and "array-based replication" are used here as shorthand even when the source and/or destination of the replication operation are virtualized storage resources, such as in a cloud computing environment. See, e.g., FIGS. 3B and 5B. As noted, the present screenshot depicts the distinction between Live Sync and snap-based DR orchestration for how system 300 will fail over a certain VM failover group. Because this option is administered at the granularity of a failover group, these options are not mutually exclusive within the same system 300.

Figure 12:
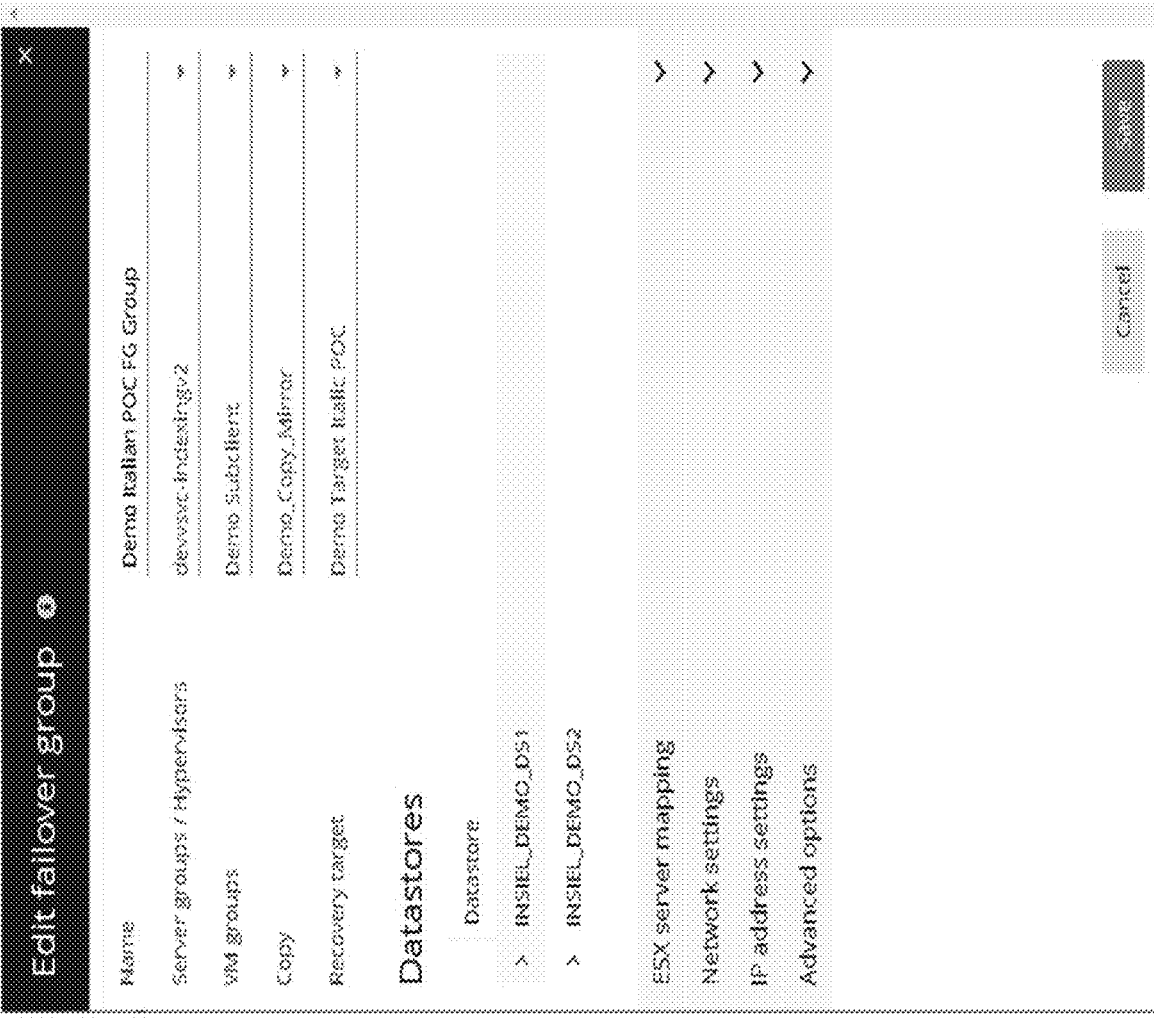
FIG. 12 depicts an illustrative screenshot of an administrative screen in system 300 for editing a failover group and adding customization details for mapping source to destination relationships.

FIG. 12 depicts an illustrative screenshot of an administrative screen in system 300 for editing a failover group and adding customization details for mapping source to destination relationships. A number of administrative parameters are entered here to help identify the source VMs 302, any VM groups they are part of, identify their respective datastores, map source to failover VM hosts, administer network settings and IP addresses, etc. without limitation. This information is used by the DR orchestration job for failing over the particular VMs in the failover group as described in more detail above.

Figure 13:
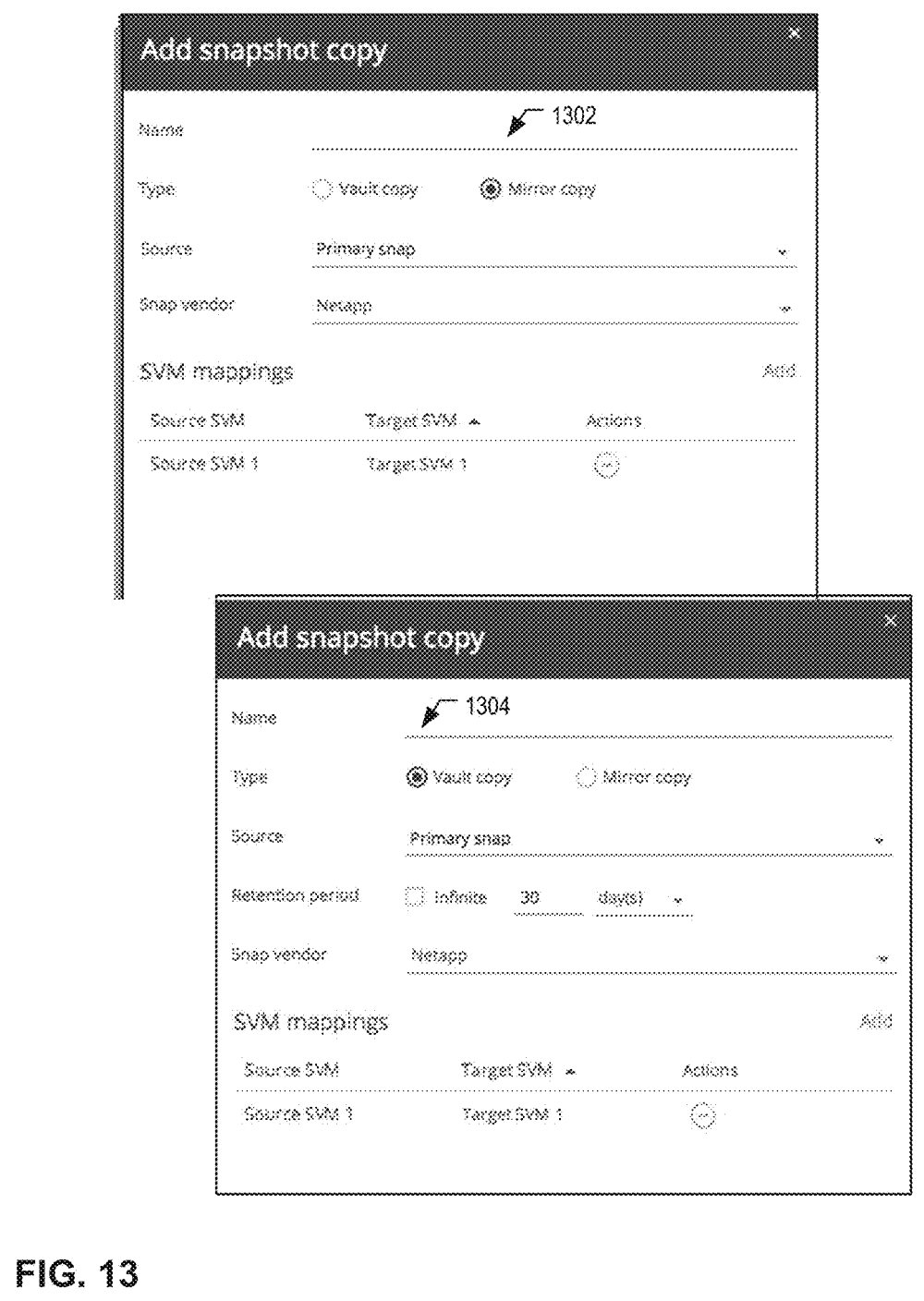

FIG. 13 depicts an illustrative screenshot of an administration screen for defining how snapshot copies are to be replicated, showing a mirror copy option and an alternative vault copy option. One of choices for the auxiliary copy jobs is what kind of "array-to-array" replication scheme to use. The illustrative "add snapshot copy" screen provides a choice of "mirror copy" (1302) or "vault copy" (1304) between source (304) and failover (384) NetApp arrays, without limitation. Again, the NetApp implementation is illustrative and not limiting.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation. The screenshots are merely illustrative to help with the reader's understanding and are not to be considered limiting.

EXAMPLE EMBODIMENTS

Some example enumerated embodiments of the present invention are recited in this section in the form of methods, systems, and non-transitory computer-readable media, without limitation.

According to an exemplary embodiment, data storage management system for orchestrating virtual machine failover, the system comprising: a first computing device comprising one or more hardware processors and computer memory; wherein the first computing is configured to: initiate a snapshot backup job by causing a primary data storage (i) to take a first snapshot of a first data storage volume hosting a first datastore for a first virtual machine, and (ii) to store the first snapshot at the primary data storage, wherein the first virtual machine executes on a first virtual machine host computing device comprising one or more hardware processors, computer memory, and a hypervisor; initiate an auxiliary copy job by causing the primary data storage to replicate the first snapshot to a failover data storage configured for disaster recovery, resulting in a second snapshot stored in a second data storage volume at the failover data storage, wherein the primary data storage and the failover data storage have a mirror-relationship that enables replication of snapshots therebetween; initiate a disaster recovery orchestration job for the first virtual machine to fail over to a second virtual machine that is currently powered off, wherein the first virtual machine is included in a failover group administered in the data storage management system, and wherein the failover group maps the first virtual machine to fail over to the second virtual machine, and wherein the first computing device is further configured to: cause a failover virtualization manager to create, for the second virtual machine, a second datastore based on the second snapshot in a second data storage volume at the failover data storage; cause the failover virtualization manager to cause a second virtual machine host computing device to power up the second virtual machine and to provide the second virtual machine with access to the second datastore at the failover storage, wherein the second virtual machine operates with data in the second datastore replicated from the first snapshot The above-recited system wherein the data storage management system is configured to create the second datastore and to power up the second virtual machine with access to the second datastore on-demand after initiating the disaster recovery orchestration job. The above-recited system wherein the snapshot-based disaster recovery (DR) job does not require that VMs or their corresponding datastores be actively operating at the DR site before the DR orchestration job is initiated, i.e., before failover, whether test clones, planned failover, or unplanned failover. The above-recited system wherein the disaster recovery orchestration job is for an unplanned failover of the first virtual machine to the second virtual machine, based on using administrative settings in a storage manager that executes on the first computing device.

The above-recited system wherein the disaster recovery orchestration job is initiated based on detecting a failure at one or more of the first virtual machine host computing device, the primary data storage, and a first virtualization manager associated with the first virtual machine host computing device. The above-recited system wherein as part of the disaster recovery orchestration job, the first computing device is further configured to activate, on-demand, a data agent associated with the failover virtualization manager and a media agent associated with the failover storage. The above-recited system wherein the first virtual machine executes in one of: a first virtualized data center and a first cloud computing environment; and wherein after the disaster recovery orchestration job, the second virtual machine executes in one of: another distinct virtualized data center configured for disaster recovery and another cloud computing environment configured for disaster recovery. The above-recited system wherein the first computing device is further configured to: initiate a second disaster recovery orchestration job that causes the second virtual machine to fail back to the first virtual machine, wherein the second disaster recovery job causes a first virtualization manager to re-activate the first virtual machine and establishes in the primary storage the first datastore of the re-activated first virtual machine based on a snapshot replicated from the failover storage. The above-recited system wherein the first computing device is further configured to, while performing the second disaster recovery orchestration job: determine that a third virtual machine not included in the failover group is powered off and did not fail over in the disaster recovery orchestration job for the first virtual machine; identify a backup copy of the third virtual machine; and initiate a restore job that restores the backup copy of the third virtual machine to a third datastore at the primary storage and cause the first virtualization manager to re-activate the third virtual machine with access to the third datastore.

The above-recited system wherein the first computing is further configured to, as part of the disaster recovery orchestration job for the first virtual machine: cause the failover storage to bring the second data storage volume online for access by the second virtual machine. The above-recited system wherein the first computing is further configured to, as part of the disaster recovery orchestration job for the first virtual machine: cause the failover virtualization manager to register the second virtual machine with the failover virtualization manager. The above-recited system wherein the system further comprises a second computing device that executes a first data agent that detects the failure at the first virtual machine host computing device. The above-recited system wherein the system further comprises a second computing device that executes a first data agent that detects the failure at the first virtual machine host computing device by way of a first virtualization manager. The above-recited system wherein the system further comprises a second computing device that executes a first media agent, and wherein, as part of the snapshot backup job, the first media agent instructs the primary data storage to take the first snapshot. The above-recited system wherein the system further comprises a second computing device that executes a first media agent, and wherein, as part of the auxiliary copy job, the first media agent instructs the primary data storage to replicate the first snapshot to the failover storage. The above-recited system wherein the system further comprises a second computing device that executes a first media agent that detects the failure at the primary data storage. The above-recited system wherein the system further comprises a second computing device that executes a first media agent that detects the failure at the primary data storage, and wherein the failure comprises a break in the mirror-relationship to the failover storage.

The above-recited system wherein the second data agent and the second media agent execute on a backup node that comprises one or more hardware processors and computer memory, and wherein the backup node is communicatively coupled to the failover data storage and to the failover virtualization manager. The above-recited system wherein the second data agent and the second media agent execute on backup node that comprises a virtual machine distinct from the second virtual machine, and wherein the backup node is communicatively coupled to the failover data storage and to the failover virtualization manager. The above-recited system wherein the second media agent instructs the failover data storage to bring the second data storage volume online for access by the second virtual machine. The above-recited system wherein the second data agent instructs the failover virtualization manager to create the second datastore. The above-recited system wherein the second data agent instructs the failover virtualization manager to power up the second virtual machine with access to the second datastore. The above-recited system wherein the first virtual machine executes in a first virtualized data center and wherein, after the disaster recovery orchestration job, the second virtual machine executes in another distinct virtualized data center configured for disaster recovery from the first virtualized data center. The above-recited system wherein the first virtual machine executes in a first virtualized data center and wherein, after the disaster recovery orchestration job, the second virtual machine executes in a cloud computing environment configured for disaster recovery from the first virtualized data center. The above-recited system wherein the first virtual machine executes in a cloud computing environment and wherein, after the disaster recovery orchestration job, the second virtual machine executes in a first virtualized data center configured for disaster recovery from the cloud computing environment. The above-recited system wherein the first virtual machine executes in a first cloud computing environment and wherein, after the disaster recovery orchestration job, the second virtual machine executes in executes in a second cloud computing environment configured for disaster recovery from the first cloud computing environment. The above-recited system wherein the system further comprises a second computing device that executes a first data agent associated with a first virtualization manager that manages the first virtual machine host computing device. The above-recited system, wherein the system further comprises a second computing device that executes a first media agent associated with the primary data storage. The above-recited system, wherein the system further comprises a second computing device that executes a second data agent associated with the failover virtualization manager. The above-recited system, wherein the system further comprises a second computing device that executes a second media agent associated with the failover storage.

According to another embodiment, a method for orchestrating virtual machine failover, the method comprising: by a data storage management system, initiating a disaster recovery orchestration job for a first virtual machine that is included in a failover group administered in the data storage management system, wherein the disaster recovery orchestration job comprises: powering off the first virtual machine having a corresponding first datastore in a primary data storage; causing the primary data storage (i) to take a first snapshot of a first data storage volume hosting the first datastore, and (ii) to store the first snapshot at the primary data storage; causing the primary data storage to replicate the first snapshot to a failover data storage configured for disaster recovery, resulting in a second snapshot stored in a second data storage volume at the failover data storage, wherein the primary data storage and the failover data storage have a mirror-relationship that enables replication of snapshots therebetween; causing the mirror-relationship to break; causing the failover storage to bring the second data storage volume online; causing a failover virtualization manager to create, for a second virtual machine that is powered off, a second datastore based on the second snapshot in the second data storage volume at the failover data storage; causing the failover virtualization manager to register the second virtual machine with the failover virtualization manager; causing the failover virtualization manager to cause a virtual machine host computing device to power up the second virtual machine and to provide the second virtual machine with access to the second datastore at the failover storage, wherein the second virtual machine operates with data in the second datastore replicated from the first snapshot; and wherein the data storage management system is configured to create the second datastore and to power up the second virtual machine with access to the second datastore on-demand after initiating the disaster recovery orchestration job.

The above-recited method wherein the disaster recovery orchestration job is for a planned failover of the first virtual machine to the second virtual machine, and wherein a storage manager initiates the disaster recovery orchestration job. The above-recited method wherein a first data agent instructs a first virtualization manager to power off the first virtual machine. The above-recited method, wherein a first media agent associated with the primary data storage instructs the primary data storage to break the mirror-relationship to the failover storage. The above-recited method, wherein as part of the disaster recovery orchestration job, a storage manager that manages storage operations in the data storage management system activates a second data agent associated with the failover virtualization manager and further activates a second media agent associated with the failover storage. The method above, wherein the second data agent and the second media agent execute on a backup node that comprises one or more hardware processors and computer memory, and wherein the backup node is communicatively coupled to the failover data storage and to the failover virtualization manager. The method above, wherein the second data agent and the second media agent execute on backup node that comprises a virtual machine distinct from the second virtual machine, and wherein the backup node is communicatively coupled to the failover data storage and to the failover virtualization manager. The above-recited method, wherein, as part of a snapshot backup job, a first media agent instructs the primary data storage to take the first snapshot. The above-recited method, wherein, as part of an auxiliary copy job, a first media agent instructs the primary data storage to replicate the first snapshot to the failover storage. The above-recited method wherein the second media agent instructs the failover data storage to bring the second data storage volume online for access by the second virtual machine. The above-recited method wherein the second data agent instructs the failover virtualization manager to create the second datastore. The above-recited method wherein the second data agent instructs the failover virtualization manager to power up the second virtual machine with access to the second datastore. The above-recited method, wherein the first virtual machine executes in a first virtualized data center and wherein, after the disaster recovery orchestration job, the second virtual machine executes in another distinct virtualized data center configured for disaster recovery from the first virtualized data center. The above-recited method, wherein the first virtual machine executes in a first virtualized data center and wherein, after the disaster recovery orchestration job, the second virtual machine executes in a cloud computing environment configured for disaster recovery from the first virtualized data center. The above-recited method, wherein the first virtual machine executes in a cloud computing environment and wherein, after the disaster recovery orchestration job, the second virtual machine executes in a first virtualized data center configured for disaster recovery from the cloud computing environment. The above-recited method, wherein the first virtual machine executes in a first cloud computing environment and wherein, after the disaster recovery orchestration job, the second virtual machine executes in executes in a second cloud computing environment configured for disaster recovery from the first cloud computing environment. The above-recited method, wherein the data storage management system comprises a storage manager that managers storage operations in the data storage management system, including the disaster recovery orchestration job, and wherein the storage manager executes on one of: a computing device comprising one or more hardware processors and computer memory, and a virtual machine, distinct from the first virtual machine and the second virtual machine, that executes on a computing device comprising one or more hardware processors and computer memory. The above-recited method, wherein the data storage management system comprises a first data agent associated with a first virtualization manager that powers off the first virtual machine. The above-recited method, wherein the data storage management system comprises a first media agent associated with the primary data storage. The above-recited method, wherein the data storage management system comprises a second data agent associated with the failover virtualization manager. The above-recited method, wherein the data storage management system comprises a second media agent associated with the failover storage. The above-recited method further comprising: by the data storage management system, initiating a second disaster recovery orchestration job that causes the second virtual machine to fail back to the first virtual machine, wherein the second disaster recovery job causes a first virtualization manager to re-activate the first virtual machine and establishes in the primary storage the first datastore of the re-activated first virtual machine based on a snapshot replicated from the failover storage. The above-recited method, wherein the second disaster recovery orchestration job comprises: determining that a third virtual machine not included in the failover group administered at the storage manager is powered off and did not fail over in the disaster recovery orchestration job for the first virtual machine; identifying a backup copy of the third virtual machine; and initiating a restore job that restores the backup copy of the third virtual machine to a third datastore at the primary storage and cause the first virtualization manager to re-activate the third virtual machine with access to the third datastore.

According to yet another exemplary embodiment, a method for orchestrating virtual machine failover, the method comprising: by a storage manager that manages storage operations in a data storage management system, initiating a disaster recovery orchestration job for a first virtual machine that is included in a failover group administered at the storage manager, wherein the disaster recovery orchestration job comprises: powering off the first virtual machine having a corresponding first datastore in a primary data storage; causing the primary data storage (i) to take a first snapshot of a first data storage volume hosting the first datastore, and (ii) to store the first snapshot at the primary data storage; causing the primary data storage to replicate the first snapshot to a failover data storage configured for disaster recovery, resulting in a second snapshot stored in a second data storage volume at the failover data storage, wherein the primary data storage and the failover data storage have a mirror-relationship that enables replication of snapshots therebetween; causing the mirror-relationship to break; causing the failover storage to bring the second data storage volume online; causing a failover virtualization manager to create, for a second virtual machine that is powered off, a second datastore based on the second snapshot in the second data storage volume at the failover data storage; causing the failover virtualization manager to register the second virtual machine with the failover virtualization manager; causing the failover virtualization manager to cause a virtual machine host computing device to power up the second virtual machine and to provide the second virtual machine with access to the second datastore at the failover storage, wherein the second virtual machine operates with data in the second datastore replicated from the first snapshot; and wherein the data storage management system is configured to create the second datastore and to power up the second virtual machine with access to the second datastore on-demand after initiating the disaster recovery orchestration job.

The above-recited method, wherein the disaster recovery orchestration job is for a planned failover of the first virtual machine to the second virtual machine, based on using administrative settings in the storage manager. The above-recited method, wherein as part of the disaster recovery orchestration job, the storage manager activates a second data agent associated with the failover virtualization manager and further activates a second media agent associated with the failover storage; wherein the second media agent instructs the failover data storage to bring the second data storage volume online for access by the second virtual machine; wherein the second data agent instructs the failover virtualization manager to create the second datastore; and wherein the second data agent further instructs the failover virtualization manager to power up the second virtual machine with access to the second datastore. The above-recited method, wherein the data storage management system comprises a first data agent associated with a first virtualization manager that powers off the first virtual machine; wherein the data storage management system comprises a first media agent associated with the primary data storage; wherein the data storage management system comprises a second data agent associated with the failover virtualization manager; and wherein the data storage management system comprises a second media agent associated with the failover storage. The above-recited method further comprising: by the storage manager, initiating a second disaster recovery orchestration job that causes the second virtual machine to fail back to the first virtual machine, wherein the second disaster recovery job causes a first virtualization manager to re-activate the first virtual machine and establishes in the primary storage the first datastore of the re-activated first virtual machine based on a snapshot replicated from the failover storage. The above-recited method, wherein the second disaster recovery orchestration job comprises: by the storage manager, determining that a third virtual machine not included in the failover group administered at the storage manager is powered off and did not fail over in the disaster recovery orchestration job for the first virtual machine; by the storage manager, identifying a backup copy of the third virtual machine; and by the storage manager, initiating a restore job that restores the backup copy of the third virtual machine to a third datastore at the primary storage and cause the first virtualization manager to re-activate the third virtual machine with access to the third datastore. The above-recited method, wherein a first data agent instructs a first virtualization manager to power off the first virtual machine. The above-recited method, wherein, as part of a snapshot backup job initiated by the storage manager, a first media agent instructs the primary data storage to take the first snapshot. The above-recited method, wherein, as part of an auxiliary copy job initiated by the storage manager, a first media agent instructs the primary data storage to replicate the first snapshot to the failover storage. The above-recited method, wherein a first media agent associated with the primary data storage instructs the primary data storage to break the mirror-relationship to the failover storage. The above-recited method, wherein as part of the disaster recovery orchestration job, the storage manager activates a second data agent associated with the failover virtualization manager and further activates a second media agent associated with the failover storage. The above-recited method, wherein the second data agent and the second media agent execute on a backup node that comprises one or more hardware processors and computer memory, and wherein the backup node is communicatively coupled to the failover data storage and to the failover virtualization manager. The above-recited method, wherein the second data agent and the second media agent execute on backup node that comprises a virtual machine distinct from the second virtual machine, and wherein the backup node is communicatively coupled to the failover data storage and to the failover virtualization manager. The above-recited method wherein the second media agent instructs the failover data storage to bring the second data storage volume online for access by the second virtual machine. The above-recited method wherein the second data agent instructs the failover virtualization manager to create the second datastore. The above-recited method wherein the second data agent instructs the failover virtualization manager to power up the second virtual machine with access to the second datastore. The above-recited method, wherein the first virtual machine executes in a first virtualized data center and wherein, after the disaster recovery orchestration job, the second virtual machine executes in another distinct virtualized data center configured for disaster recovery from the first virtualized data center. The above-recited method, wherein the first virtual machine executes in a first virtualized data center and wherein, after the disaster recovery orchestration job, the second virtual machine executes in a cloud computing environment configured for disaster recovery from the first virtualized data center. The above-recited method, wherein the first virtual machine executes in a cloud computing environment and wherein, after the disaster recovery orchestration job, the second virtual machine executes in a first virtualized data center configured for disaster recovery from the cloud computing environment. The above-recited method, wherein the first virtual machine executes in a first cloud computing environment and wherein, after the disaster recovery orchestration job, the second virtual machine executes in executes in a second cloud computing environment configured for disaster recovery from the first cloud computing environment. The above-recited method, wherein the data storage management system comprises a first data agent associated with a first virtualization manager that powers off the first virtual machine. The above-recited method, wherein the data storage management system comprises a first media agent associated with the primary data storage. The above-recited method, wherein the data storage management system comprises a second data agent associated with the failover virtualization manager. The above-recited method, wherein the data storage management system comprises a second media agent associated with the failover storage.

According to another illustrative embodiment, a method for orchestrating virtual machine failover, the method comprising: by a storage manager that manages storage operations in a data storage management system, initiating a snapshot backup job by causing a primary data storage (i) to take a first snapshot of a first data storage volume hosting a first datastore for a first virtual machine, and (ii) to store the first snapshot at the primary data storage, wherein the first virtual machine executes on a first virtual machine host computing device comprising one or more hardware processors, computer memory, and a hypervisor, and wherein the first virtual machine is included in a failover group administered at the storage manager; by the storage manager, initiating an auxiliary copy job by causing the primary data storage to replicate the first snapshot to a failover data storage configured for disaster recovery, resulting in a second snapshot stored in a second data storage volume at the failover data storage, wherein the primary data storage and the failover data storage have a mirror-relationship that enables replication of snapshots therebetween; based on a failure at one or more of the first virtual machine host computing device and the primary data storage, initiating, by the storage manager, a disaster recovery orchestration job for the first virtual machine to fail over to a second virtual machine that is currently powered off, wherein the disaster recovery orchestration job comprises: causing the failover storage to bring the second data storage volume online for access by the second virtual machine; causing a failover virtualization manager to create, for the second virtual machine, a second datastore based on the second snapshot in the second data storage volume at the failover data storage; causing the failover virtualization manager to register the second virtual machine with the failover virtualization manager; causing the failover virtualization manager to cause a second virtual machine host computing device to power up the second virtual machine and to provide the second virtual machine with access to the second datastore at the failover storage, wherein the second virtual machine operates with data in the second datastore replicated from the first snapshot; and wherein the data storage management system is configured to create the second datastore and to power up the second virtual machine with access to the second datastore on-demand after initiating the disaster recovery orchestration job.

The above-recited method, wherein the disaster recovery orchestration job is for an unplanned failover of the first virtual machine to the second virtual machine, based on using administrative settings in the storage manager. The above-recited method, wherein a first data agent detects the failure at the first virtual machine host computing device. The above-recited method, wherein a first data agent detects the failure at the first virtual machine host computing device by way of a first virtualization manager. The above-recited method, wherein, as part of the snapshot backup job initiated by the storage manager, a first media agent instructs the primary data storage to take the first snapshot. The above-recited method, wherein, as part of the auxiliary copy job initiated by the storage manager, a first media agent instructs the primary data storage to replicate the first snapshot to the failover storage. The above-recited method, wherein a first media agent detects the failure at the primary data storage. The above-recited method, wherein a first media agent detects the failure at the primary data storage, and wherein the failure comprises a break in the mirror-relationship to the failover storage. The above-recited method, wherein as part of the disaster recovery orchestration job, the storage manager activates a second data agent associated with the failover virtualization manager and further activates a second media agent associated with the failover storage. The above-recited method, wherein the second data agent and the second media agent execute on a backup node that comprises one or more hardware processors and computer memory, and wherein the backup node is communicatively coupled to the failover data storage and to the failover virtualization manager. The above-recited method, wherein the second data agent and the second media agent execute on backup node that comprises a virtual machine distinct from the second virtual machine, and wherein the backup node is communicatively coupled to the failover data storage and to the failover virtualization manager. The above-recited method wherein the second media agent instructs the failover data storage to bring the second data storage volume online for access by the second virtual machine. The above-recited method wherein the second data agent instructs the failover virtualization manager to create the second datastore. The above-recited method wherein the second data agent instructs the failover virtualization manager to power up the second virtual machine with access to the second datastore. The above-recited method, wherein the first virtual machine executes in a first virtualized data center and wherein, after the disaster recovery orchestration job, the second virtual machine executes in another distinct virtualized data center configured for disaster recovery from the first virtualized data center. The above-recited method, wherein the first virtual machine executes in a first virtualized data center and wherein, after the disaster recovery orchestration job, the second virtual machine executes in a cloud computing environment configured for disaster recovery from the first virtualized data center. The above-recited method, wherein the first virtual machine executes in a cloud computing environment and wherein, after the disaster recovery orchestration job, the second virtual machine executes in a first virtualized data center configured for disaster recovery from the cloud computing environment. The above-recited method, wherein the first virtual machine executes in a first cloud computing environment and wherein, after the disaster recovery orchestration job, the second virtual machine executes in executes in a second cloud computing environment configured for disaster recovery from the first cloud computing environment. The above-recited method, wherein the data storage management system comprises a first data agent associated with a first virtualization manager that manages the first virtual machine host computing device. The above-recited method, wherein the data storage management system comprises a first media agent associated with the primary data storage. The above-recited method, wherein the data storage management system comprises a second data agent associated with the failover virtualization manager. The above-recited method, wherein the data storage management system comprises a second media agent associated with the failover storage. The above-recited method further comprising: by the storage manager, initiating a second disaster recovery orchestration job that causes the second virtual machine to fail back to the first virtual machine, wherein the second disaster recovery job causes a first virtualization manager to re-activate the first virtual machine and establishes in the primary storage the first datastore of the re-activated first virtual machine based on a snapshot replicated from the failover storage. The above-recited method, wherein the second disaster recovery orchestration job comprises: by the storage manager, determining that a third virtual machine not included in the failover group administered at the storage manager is powered off and did not fail over in the disaster recovery orchestration job for the first virtual machine; by the storage manager, identifying a backup copy of the third virtual machine; and by the storage manager, initiating a restore job that restores the backup copy of the third virtual machine to a third datastore at the primary storage and cause the first virtualization manager to re-activate the third virtual machine with access to the third datastore.

According to yet another illustrative embodiment, a data storage management system for orchestrating virtual machine failover, the system comprising: a first computing device comprising one or more hardware processors and computer memory, wherein a storage manager executes on the first computing device; wherein the first computing device executing the storage manager is configured to: initiate a snapshot backup job by causing a primary data storage (i) to take a first snapshot of a first data storage volume hosting a first datastore for a first virtual machine, and (ii) to store the first snapshot at the primary data storage, wherein the first virtual machine executes on a first virtual machine host computing device comprising one or more hardware processors, computer memory, and a hypervisor, and wherein the first virtual machine is included in a failover group administered at the storage manager; initiate an auxiliary copy job by causing the primary data storage to replicate the first snapshot to a failover data storage configured for disaster recovery, resulting in a second snapshot stored in a second data storage volume at the failover data storage, wherein the primary data storage and the failover data storage have a mirror-relationship that enables replication of snapshots therebetween; initiate a disaster recovery orchestration job for the first virtual machine to fail over to a second virtual machine that is currently powered off, wherein the first computing device executing the storage manager is further configured to: cause the failover storage to bring the second data storage volume online for access by the second virtual machine; cause a failover virtualization manager to create, for the second virtual machine, a second datastore based on the second snapshot in the second data storage volume at the failover data storage; cause the failover virtualization manager to register the second virtual machine with the failover virtualization manager; cause the failover virtualization manager to cause a second virtual machine host computing device to power up the second virtual machine and to provide the second virtual machine with access to the second datastore at the failover storage, wherein the second virtual machine operates with data in the second datastore replicated from the first snapshot; and wherein the data storage management system is configured to create the second datastore and to power up the second virtual machine with access to the second datastore on-demand after initiating the disaster recovery orchestration job.

The above-recited system wherein the disaster recovery orchestration job is for an unplanned failover of the first virtual machine to the second virtual machine, based on using administrative settings in the storage manager. The above-recited system The above-recited system, wherein the disaster recovery orchestration job is initiated based on detecting a failure at one or more of the first virtual machine host computing device, the primary data storage, and a first virtualization manager associated with the first virtual machine host computing device. The above-recited system, wherein the system further comprises a second computing device that executes a first data agent that detects the failure at the first virtual machine host computing device. The above-recited system, wherein the system further comprises a second computing device that executes a first data agent that detects the failure at the first virtual machine host computing device by way of a first virtualization manager. The above-recited system, wherein the system further comprises a second computing device that executes a first media agent, and wherein, as part of the snapshot backup job initiated by the storage manager, the first media agent instructs the primary data storage to take the first snapshot. The above-recited system, wherein the system further comprises a second computing device that executes a first media agent, and wherein, as part of the auxiliary copy job initiated by the storage manager, the first media agent instructs the primary data storage to replicate the first snapshot to the failover storage. The above-recited system, wherein the system further comprises a second computing device that executes a first media agent that detects the failure at the primary data storage. The above-recited system, wherein the system further comprises a second computing device that executes a first media agent that detects the failure at the primary data storage, and wherein the failure comprises a break in the mirror-relationship to the failover storage. The above-recited system, wherein as part of the disaster recovery orchestration job, the storage manager activates a second data agent associated with the failover virtualization manager and further activates a second media agent associated with the failover storage. The above-recited system, wherein the second data agent and the second media agent execute on a backup node that comprises one or more hardware processors and computer memory, and wherein the backup node is communicatively coupled to the failover data storage and to the failover virtualization manager. The above-recited system, wherein the second data agent and the second media agent execute on backup node that comprises a virtual machine distinct from the second virtual machine, and wherein the backup node is communicatively coupled to the failover data storage and to the failover virtualization manager. The above-recited system wherein the second media agent instructs the failover data storage to bring the second data storage volume online for access by the second virtual machine. The above-recited system wherein the second data agent instructs the failover virtualization manager to create the second datastore. The above-recited system wherein the second data agent instructs the failover virtualization manager to power up the second virtual machine with access to the second datastore. The above-recited system, wherein the first virtual machine executes in a first virtualized data center and wherein, after the disaster recovery orchestration job, the second virtual machine executes in another distinct virtualized data center configured for disaster recovery from the first virtualized data center. The above-recited system, wherein the first virtual machine executes in a first virtualized data center and wherein, after the disaster recovery orchestration job, the second virtual machine executes in a cloud computing environment configured for disaster recovery from the first virtualized data center. The above-recited system, wherein the first virtual machine executes in a cloud computing environment and wherein, after the disaster recovery orchestration job, the second virtual machine executes in a first virtualized data center configured for disaster recovery from the cloud computing environment. The above-recited system, wherein the first virtual machine executes in a first cloud computing environment and wherein, after the disaster recovery orchestration job, the second virtual machine executes in executes in a second cloud computing environment configured for disaster recovery from the first cloud computing environment. The above-recited system, wherein the system further comprises a second computing device that executes a first data agent associated with a first virtualization manager that manages the first virtual machine host computing device. The above-recited system, wherein the system further comprises a second computing device that executes a first media agent associated with the primary data storage. The above-recited system, wherein the system further comprises a second computing device that executes a second data agent associated with the failover virtualization manager. The above-recited system, wherein the system further comprises a second computing device that executes a second media agent associated with the failover storage. The above-recited system wherein the first computing device executing the storage manager is further configured to: initiate a second disaster recovery orchestration job that causes the second virtual machine to fail back to the first virtual machine, wherein the second disaster recovery job causes a first virtualization manager to re-activate the first virtual machine and establishes in the primary storage the first datastore of the re-activated first virtual machine based on a snapshot replicated from the failover storage. The above-recited system, wherein the first computing device executing the storage manager is further configured to, while performing the second disaster recovery orchestration job: determine that a third virtual machine not included in the failover group administered at the storage manager is powered off and did not fail over in the disaster recovery orchestration job for the first virtual machine; identify a backup copy of the third virtual machine; and initiate a restore job that restores the backup copy of the third virtual machine to a third datastore at the primary storage and cause the first virtualization manager to re-activate the third virtual machine with access to the third datastore.

In other embodiments, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware.

While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A data storage management system comprising one or more non-transitory computer-readable media having computer-executable instructions stored thereon; and one or more hardware processors that, having executed the computer-executable instructions, configure the data storage management system to:

perform a first orchestration job comprising:

one or more of: detect that a first virtual machine has failed, and cause the first virtual machine to be powered off, wherein a first datastore of the first virtual machine is configured in a first data storage volume of a primary data storage;

cause the primary data storage (i) to take a first snapshot of the first data storage volume, and (ii) to store the first snapshot at the primary data storage;

cause data captured by the first snapshot to be replicated from the primary data storage to a second data storage volume that is configured in a failover data storage that is distinct from the primary data storage, wherein the primary data storage and the failover data storage have a mirror-relationship that enables replication of data therebetween;

cause a failover virtualization manager to cause a virtual machine host computing device to power up a second virtual machine and to provide the second virtual machine with access to the second data storage volume as a second datastore of the second virtual machine, wherein the second datastore comprises the data captured by the first snapshot, and wherein the second datastore is created, and the second virtual machine is powered up, on-demand by the first orchestration job.

2. The data storage management system of claim 1, wherein the computer-executable instructions further cause the data storage management system to initiate the first orchestration job for a planned failover of the first virtual machine to the second virtual machine.

3. The data storage management system of claim 1, wherein the first virtual machine has failed due to one or more of: (a) a failure at a first virtual machine host computing device that hosts the first virtual machine, (b) a failure at the primary data storage, and (c) a failure at a first virtualization manager associated with the first virtual machine host computing device.

4. The data storage management system of claim 1, wherein the first virtual machine executes in one of: a first virtualized data center and a first cloud computing environment; and wherein after the first orchestration job, the second virtual machine executes in a second virtualized data center.

5. The data storage management system of claim 1, wherein the first virtual machine executes in one of: a first virtualized data center and a first cloud computing environment; and wherein after the first orchestration job, the second virtual machine executes in a second cloud computing environment.

6. The data storage management system of claim 1, wherein the computer-executable instructions further cause the data storage management system to perform a second first orchestration job that causes the second virtual machine to fail back to the first virtual machine, wherein the second first orchestration job causes a first virtualization manager to re-activate the first virtual machine and establishes in the primary data storage the first datastore of the re-activated first virtual machine based on a second snapshot of the second data storage volume.

7. The data storage management system of claim 6, wherein the computer-executable instructions further cause the data storage management system to:

determine that a third virtual machine is not included in a failover group that comprises the first virtual machine;

determine that the third virtual machine is powered off and did not fail over in the first orchestration job;

identify a backup copy of the third virtual machine;

perform a restore job that restores the backup copy of the third virtual machine to a third data storage volume at the primary data storage; and cause the first virtualization manager to re-activate the third virtual machine with access to the third data storage volume as a third datastore of the third virtual machine.

8. The data storage management system of claim 1, wherein the first virtual machine and the second virtual machine are part of a failover group defined in administrative settings of the data storage management system.

9. The data storage management system of claim 1, wherein the computer-executable instructions further cause the data storage management system to instruct a data agent to cause a first virtualization manager to power off the first virtual machine.

10. The data storage management system of claim 1, wherein the first orchestration job comprises an auxiliary copy job that causes the data captured by the first snapshot to be replicated from the primary data storage to the second data storage volume.

11. A non-transitory computer-readable medium comprising computer-executable instructions that, when executed by a first computing device comprising one or more hardware processors, cause the first computing device to:

initiate a disaster recovery orchestration job for a first virtual machine, wherein the disaster recovery orchestration job comprises:

one or more of: detect that the first virtual machine has failed, and cause the first virtual machine to be powered off, wherein a first datastore of the first virtual machine is configured in a first data storage volume of a primary data storage;

cause the primary data storage (i) to take a first snapshot of the first data storage volume, and (ii) to store the first snapshot at the primary data storage;

cause an auxiliary copy job to replicate data captured by the first snapshot at a second data storage volume in a failover data storage that is distinct from the primary data storage, wherein the primary data storage and the failover data storage have a mirror-relationship that enables replication of data therebetween;

cause a failover virtualization manager to cause a virtual machine host computing device to power up a second virtual machine and to provide the second virtual machine with access to the second data storage volume as a second datastore of the second virtual machine, wherein the second datastore comprises the data captured by the first snapshot, and wherein the second datastore is created, and the second virtual machine is powered up, on-demand by the disaster recovery orchestration job.

12. The non-transitory computer-readable medium of claim 11, wherein the computer-executable instructions further cause the first computing device to initiate the disaster recovery orchestration job for a planned failover of the first virtual machine to the second virtual machine.

13. The non-transitory computer-readable medium of claim 11, wherein the first virtual machine has failed due to one or more of: (a) a failure at a first virtual machine host computing device that hosts the first virtual machine, (b) a failure at the primary data storage, and (c) a failure at a first virtualization manager associated with the first virtual machine host computing device.

14. The non-transitory computer-readable medium of claim 11, wherein the computer-executable instructions further cause the first computing device to activate, on-demand, a data agent associated with the failover virtualization manager.

15. The non-transitory computer-readable medium of claim 11, wherein the first virtual machine executes in one of: a first virtualized data center and a first cloud computing environment; and wherein after the disaster recovery orchestration job, the second virtual machine executes in one of: another distinct virtualized data center and another cloud computing environment.

16. The non-transitory computer-readable medium of claim 11, wherein the computer-executable instructions further cause the first computing device to initiate a second disaster recovery orchestration job that causes the second virtual machine to fail back to the first virtual machine, wherein the second disaster recovery orchestration job causes a first virtualization manager to re-activate the first virtual machine and establishes in the primary data storage the first datastore of the re-activated first virtual machine based on a second snapshot of the second data storage volume.

17. The non-transitory computer-readable medium of claim 16, wherein the computer-executable instructions further cause the first computing device to:

determine that a third virtual machine is not included in a failover group that comprises the first virtual machine;

determine that the third virtual machine is powered off and did not fail over in the disaster recovery orchestration job;

identify a backup copy of the third virtual machine;

initiate a restore job that restores the backup copy of the third virtual machine to a third data storage volume at the primary data storage; and cause the first virtualization manager to re-activate the third virtual machine with access to the third data storage volume as a third datastore of the third virtual machine.

18. The non-transitory computer-readable medium of claim 11, wherein the first virtual machine and the second virtual machine are part of a failover group defined in administrative settings.

19. The non-transitory computer-readable medium of claim 11, wherein the computer-executable instructions further cause the first computing device to control storage operations in a data storage management system.

20. The non-transitory computer-readable medium of claim 11, wherein the computer-executable instructions further cause the first computing device to instruct a data agent to cause a first virtualization manager to power off the first virtual machine.

* * * * *